(12) United States Patent
Northrup et al.

(10) Patent No.: US 10,274,287 B2
(45) Date of Patent: Apr. 30, 2019

(54) SYSTEM AND METHOD FOR MARKSMANSHIP TRAINING

(71) Applicant: Shooting Simulator, LLC, Dallas, TX (US)

(72) Inventors: James L. Northrup, Dallas, TX (US); Robert P. Northrup, Dallas, TX (US); Peter F. Blakeley, Yantis, TX (US)

(73) Assignee: Shooting Simulator, LLC, Dallas, TX (US)

(*) Notice: Subject to any disclaimer, the term of this patent is extended or adjusted under 35 U.S.C. 154(b) by 158 days.

(21) Appl. No.: 15/589,603

(22) Filed: May 8, 2017

(65) Prior Publication Data
US 2017/0307333 A1  Oct. 26, 2017

Related U.S. Application Data

(63) Continuation-in-part of application No. 14/969,302, filed on Dec. 15, 2015, which is a
(Continued)

(51) Int. Cl.
| | | |
|---|---|---|
| *F41G 3/26* | (2006.01) | |
| *F41A 33/00* | (2006.01) | |
| *G06F 3/01* | (2006.01) | |

(52) U.S. Cl.
CPC ............ *F41G 3/2633* (2013.01); *F41A 33/00* (2013.01); *F41G 3/26* (2013.01); *F41G 3/2655* (2013.01); *G06F 3/011* (2013.01)

(58) Field of Classification Search
CPC .......... F41A 33/00; F41A 33/02; F41A 33/04; F41A 33/06; F41J 5/10; F41J 5/14; F41J 5/18; G06F 3/011
See application file for complete search history.

(56) References Cited

U.S. PATENT DOCUMENTS 2,023,497 A   12/1935   Trammell
3,748,751 A    7/1973   Breglia et al.
(Continued)

FOREIGN PATENT DOCUMENTS

CA   2745701 A1   6/2010
EP   1218687      7/2003
(Continued)

OTHER PUBLICATIONS accurateshooter.com, "New Wind-Reading LIDAR LaserScope", website, (undated), www.accurateshooter.com/optics/new-wind-reading-lidar-laserscope/.
(Continued)

*Primary Examiner* — Timothy A Musselman
(74) *Attorney, Agent, or Firm* — Schultz & Associates, P.C.

(57) ABSTRACT

A system and method for simulating lead of a target includes a network, a simulation administrator and a user device connected to the network, a database connected to the simulation administrator, and a set of position trackers positioned at a simulator site. The user device includes a virtual reality unit and a computer connected to the set of virtual reality unit and to the network. A generated target is simulated. The target and the user are tracked to generate a phantom target and a phantom halo. The phantom target and the phantom halo are displayed on the virtual reality unit at a lead distance and a drop distance from the target as viewed through the virtual reality unit.

34 Claims, 49 Drawing Sheets

Related U.S. Application Data continuation-in-part of application No. 14/686,398, filed on Apr. 14, 2015, now Pat. No. 10,030,937, which is a continuation-in-part of application No. 14/149,418, filed on Jan. 7, 2014, now Pat. No. 9,261,332, which is a continuation-in-part of application No. 13/890,997, filed on May 9, 2013, now Pat. No. 9,267,762.

(56) References Cited

U.S. PATENT DOCUMENTS

| | | |
|---|---|---|
| 3,811,204 A | 5/1974 | Marshall et al. |
| 3,904,204 A | 9/1975 | Yokol |
| 3,945,133 A | 3/1976 | Mohon et al. |
| 3,995,376 A | 12/1976 | Kimble et al. |
| 4,079,525 A | 3/1978 | Linton et al. |
| 4,102,059 A | 7/1978 | Kimble et al. |
| 4,223,454 A | 9/1980 | Mohon et al. |
| 4,317,651 A | 3/1982 | Marshall et al. |
| 4,457,715 A | 7/1984 | Knight et al. |
| 4,583,950 A | 4/1986 | Schroeder |
| 4,824,374 A | 4/1989 | Hendry et al. |
| 5,194,006 A | 3/1993 | Zaenglien, Jr. |
| 5,591,032 A | 1/1997 | Powell et al. |
| 5,641,288 A | 6/1997 | Zaenglein, Jr. |
| 5,991,043 A | 11/1999 | Andersson et al. |
| 6,322,365 B1 | 11/2001 | Shechter et al. |
| 6,780,014 B1 | 8/2004 | Hull et al. |
| 6,942,486 B2 | 9/2005 | Lvovskiy |
| RE38,877 E | 11/2005 | Trabut |
| 6,997,716 B2 | 2/2006 | Skala et al. |
| 7,188,444 B2 | 3/2007 | Danner et al. |
| 7,329,127 B2 | 2/2008 | Kendir et al. |
| 7,810,273 B2 | 10/2010 | Koch et al. |
| 8,016,594 B2 | 9/2011 | Ferris et al. |
| 8,267,691 B1 | 9/2012 | Ferris et al. |
| 8,646,201 B2 | 2/2014 | Hughes et al. |
| 8,734,156 B2 | 5/2014 | Uhr |
| 8,827,706 B2 | 9/2014 | Hogan, Jr. |
| 8,926,444 B2 | 1/2015 | Kato et al. |
| 8,944,940 B2 | 2/2015 | Mettler |
| 9,200,870 B1 | 12/2015 | Theel |
| 2002/0012898 A1 | 1/2002 | Shechter et al. |
| 2003/0109298 A1 | 6/2003 | Oishi et al. |
| 2004/0031184 A1 | 2/2004 | Hope |
| 2006/0158910 A1 | 7/2006 | Hunt et al. |
| 2007/0032318 A1 | 2/2007 | Nishimura et al. |
| 2007/0254266 A1 | 11/2007 | Galanis et al. |
| 2008/0108021 A1 | 5/2008 | Slayton et al. |
| 2009/0155747 A1 | 6/2009 | Cornett et al. |
| 2009/0325699 A1 | 12/2009 | Delgiannidis |
| 2010/0141225 A1 | 6/2010 | Isham et al. |
| 2010/0173686 A1 | 7/2010 | Grant et al. |
| 2010/0201620 A1 | 8/2010 | Sargent |
| 2011/0111374 A1 | 5/2011 | Charles et al. |
| 2011/0207089 A1 | 8/2011 | Lagettie et al. |
| 2011/0244975 A1 | 10/2011 | Farmer et al. |
| 2011/0283586 A1 | 11/2011 | Scallie et al. |
| 2012/0015332 A1 | 1/2012 | Stutz |
| 2012/0183931 A1 | 7/2012 | Galanis et al. |
| 2012/0270186 A1 | 10/2012 | Singh |
| 2012/0297654 A1 | 11/2012 | Williams et al. |
| 2013/0040268 A1 | 2/2013 | Van der Walt et al. |
| 2013/0130205 A1 | 5/2013 | Matthews et al. |
| 2013/0344461 A1 | 12/2013 | Tello |
| 2014/0038136 A1 | 2/2014 | Hamilton et al. |
| 2014/0206481 A1 | 7/2014 | Zuger |
| 2014/0295380 A1 | 10/2014 | Amis et al. |
| 2015/0010887 A1 | 1/2015 | Foege |

FOREIGN PATENT DOCUMENTS

| | | |
|---|---|---|
| EP | 944809 | 10/2003 |
| TW | 201241396 | 10/2012 |
| WO | 2010065124 | 6/2010 |

OTHER PUBLICATIONS accurateshooter.com, "SCATT Aim-Tracking IR Training System", website, (undated), http://www.accurateshooter.com/optics/scatt-aim-tracking-ir-training-system/.

Avenger Advantage, LLC, "Delta Six: The Ultimate First Person Shooter Controller", website, (undated), http://www.thedeltasix.com/.

Brewster, Signe, "Hands on with the HTC Valve Vive virtual reality headset", Gigaom, website, May 7, 2015, https://gigaom.com/2015/03/07/hands-on-with-the-htc-valve-vive-virtual-reality-headset/.

Bushnell, "Yardage Pro Riflescope", website, (undated), http://www.bushnell.com/all-products/laser-rangefinders/yardage-pro-riflescope.

Fove, "The World's First Eye Tracking Virtual Reality Headset", May 19, 2015, http://kickstarter.com/projects/fove/fove-the-worlds-first-eye-tracking-virtual-reality/?utm_source=road-to-vr&utm_medium=display&utm_content=banner-ad&utm_campaign=launch-announcement-preorder.

Control VR, "The Future of Virtual Reality, Animation & more", video, (undated), https://www.youtube.com/watch?v=UCIUkL24oMc.

Davies, Alex, "Hands-on With the HTC Vive", Tom's Hardware, website, Mar. 30, 2015, http://www.tomshardware.com/reviews/htc-vive-virtualy-reality-hands-on,4102.html.

Eotech, Inc., "EOTech Weapon Accessories", website, (undated), http://www.eotechinc.com.

Eotech, Inc., "Pro Staffer: Craig Foster", website, (undated), http://www.eotechinc.com/pro-staffer-craig-foster.

Freeze HD, "Top 5 Virtual Reality gadgets of the future", video, (undated), https://www.youtube.com/watch?v=9yplHQhaVXU.

"Image Stabilization", Wikipedia, website, (undated), http://en.wikipedia.org/wiki/Image_stabilization#Digital_image_stabilization.

Tracking Point, Inc., "How It Works", website, (undated), http://tracking-point.com/how-it-works.

"US Patent Issued to Vitra Systems on Sep. 18 for Threat Fire Simulation and Training System" (Arizona Inventors), HighBeam Research, website, Sep. 19, 2012, http://www.highbeam.com/doc/1P3-2764873051.html.

Van Camp, Jeffrey, "Hands on: HTC Vive VR Headset", DigitalTrends, website, Mar. 4, 2015, http://www.digitaltrends.com/vr-headset-reviews/htc-vive-hands-on/2/.

Vanguard, "Smart gun: A test bed for the army's next-generation rifle", website, May 6, 2015, http://www.vanguardcanada.com/2015/05/06/smart-gun-a-test-bed-for-the-armys-next-generation-rifle/.

Virtra, Inc., "Firearms Training Simulators", website, (undated), http://www.virtra.com/.

Virtra, Inc., "Patent Information", website, (undated), http://www.virtra.com/patent-related/.

Virtra, "VirTra on CNN Anderson Cooper 360", video, (updated), https://vimeo.com/117621064.

Wawro, Alex, "TrackingPoint's sensor-packed smart gun redefines the term 'point and shoot'", TechHive, website, Jul. 31, 2013, http://www.techhive.com/article/2045080/trackingpoints-sensor-packed-smart-gun-redefines-the-term-point-and-shool.html.

Zant, Cal, "How Do Rangefinders Work?", Precision Rifle Blog, website, Oct. 29, 2013, http://precisionrifleblog.com/2013/10/29/how-do-rangefinders-work/.

Zant, Cal, "Rangefinder Binoculars Reviews & Field Tests: Overall Results Summary", Precision Rifle Blog, website, Dec. 3, 2013, http://precisionrifleblog.com/2013/12/03/rangefinder-binoculars-reviews-field-tests-overall-results-summary/.

"10 Forthcoming Augmented Reality & Smart Glasses You Can Buy.pdf", http://www.hongkiat.com/blog/augmented-reality-smart-glasses/, accessed on Apr. 26, 2017.

"Augmented Reality Using Unity3D, Vuforia and Arduino", http://www.instructables.com/id/Augmented-Reality-using-Unity3D-Vuforia-and-Arduin/, accessed on Apr. 26, 2017.

"Bushnell 50 Caliber to 12-Gauge Expandable Arbor", https://www.amazon.com/Bushnell-Caliber-12-Gauge-Expandable-Arbor/dp/B0002LWWBM/ref=pd_sim_200_1?_encoding=UTF8&pd_rd_i=B0002LWWBM&pd_rd_r=B91VNN5NMQF3PGM9ZG2T&pd_rd_

(56) References Cited

OTHER PUBLICATIONS w=0SqtJ&pd_rd_wg=0syk9&psc=1&refRID= B91VNN5NMQF3PGM9ZG2T, accessed on Apr. 26, 2017.
"Custom Single Zone Force Sensing Resistors", http://www.sensitronics.com/products-fsr.php, accessed on Apr. 26, 2017.
"Force Sensing Linear Potentiometers", http://www.sensitronics.com/products-force-sensing-linear-potentiometers.php, accessed on Apr. 26, 2017.
"Go Beyond Your VR Controllers", https://www.vive.com/us/vive-tracker/, accessed on Apr. 26, 2017.
"Intro to Unity3D and AR (Augmented Reality)", http://www.rivellomultimediaconsulting.com/unity3d-augmented-reality/, accessed on Apr. 26, 2017.
"Laser Training Cartridges Gen2", http://www.g-sight.com/training-lasers/, accessed on Apr. 26, 2017.
"Magic Leaps Augmented Reality FPS Demo Is Unbelievable", http://www.cinemablend.com/games/Magic-Leap-Augmented-Reality-FPS-Demo-Unbelievable-70816.html, accessed on Apr. 26, 2017.
"MeshLab", http://www.meshlab.net/, accessed on Apr. 26, 2017.
"Quick Release Pipe Clamp", https://www.amazon.com/Grifiti-Threaded-Microphone-Diameter-Motorcycles/dp/B00E5M39AW/ref=pd_rhf_dp_s_cp_5?_encoding=UTF8&pd_rd_i=B00E5M39AW&pd_rd_r=QQB0M0FYBZ1QBQ65V7WG&pd_rd_w=iE5RV&pd_rd_wg=ZFRKc&psc=1&refRID=QQB0M0FYBZ1QBQ65V7WG, accessed on Apr. 26, 2017.
"Shotgun pattern measurement & analysis", http://www.shotgun-insight.com/intro.html, accessed on Apr. 26, 2017.
"Super photo clamp", https://www.manfrotto.us/super-photo-clamp-without-stud-aluminium, accessed on Apr. 26, 2017.
"Tipton Snap Cap Pistol ACP 5 Pack", http://www.opticsplanet.com/tipton-snap-cap-pistol-5-pack.html, accessed on Apr. 26, 2017.
"Vive Tracker Includes USB Add-on to Connect the Additional Accessory", https://uploadvr.com/vive-tracker-includes-usb-add-connect-wireless-accessories/, accessed on Apr. 26, 2017.
"Voice-activated control for your PC games and apps", https://voiceattack.com/, accessed on Apr. 26, 2017.
ANSAR, "Registration for augmented reality" Abstract, http://repository.upenn.edu/dissertations/AAI3031635/, accessed on Apr. 26, 2017.
ARC4 True Augmented Reality, https://www.ara.com/sites/default/files/docs/ARC4_Brochure_Commercial.pdf, accessed on Apr. 26, 2017.

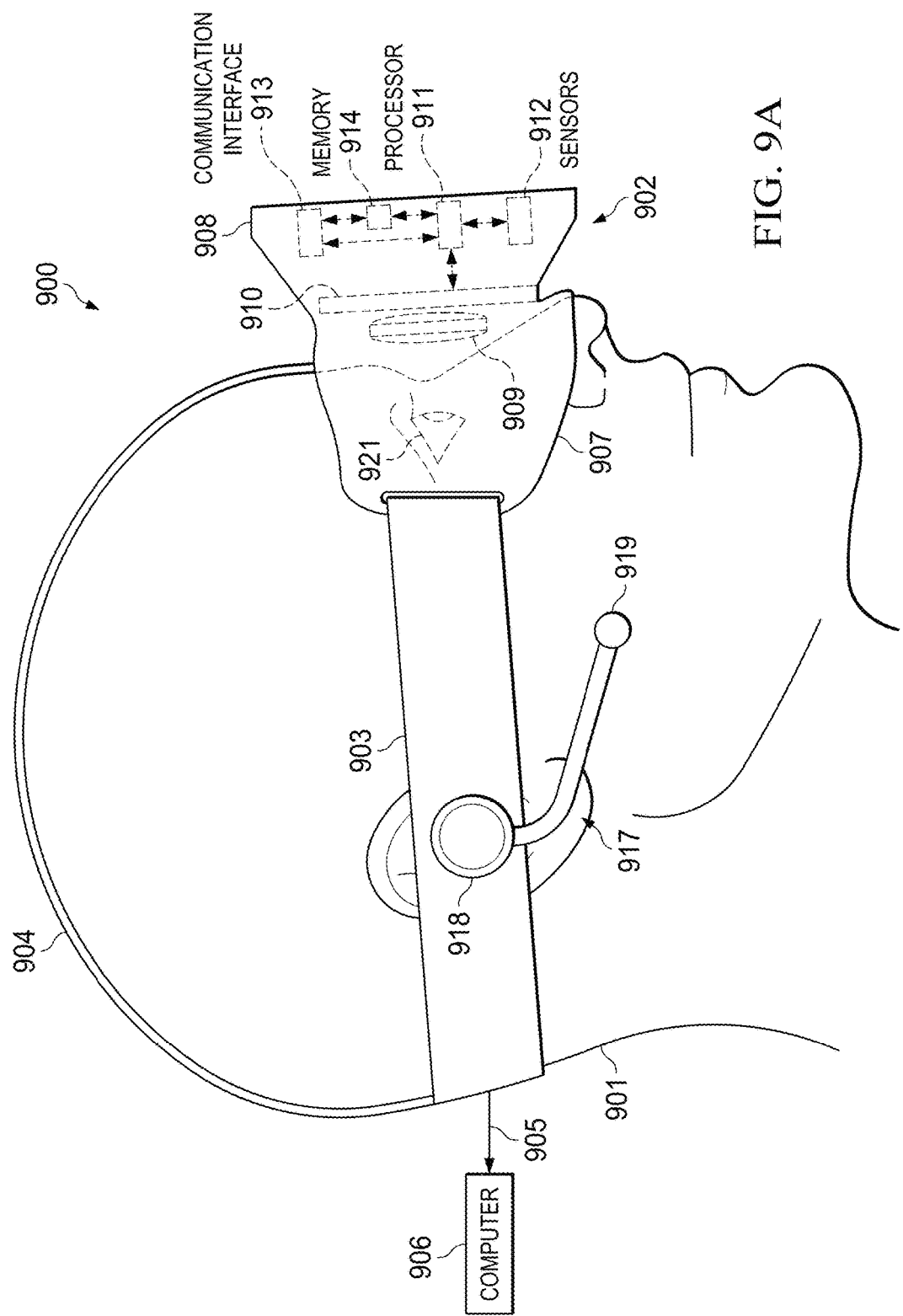

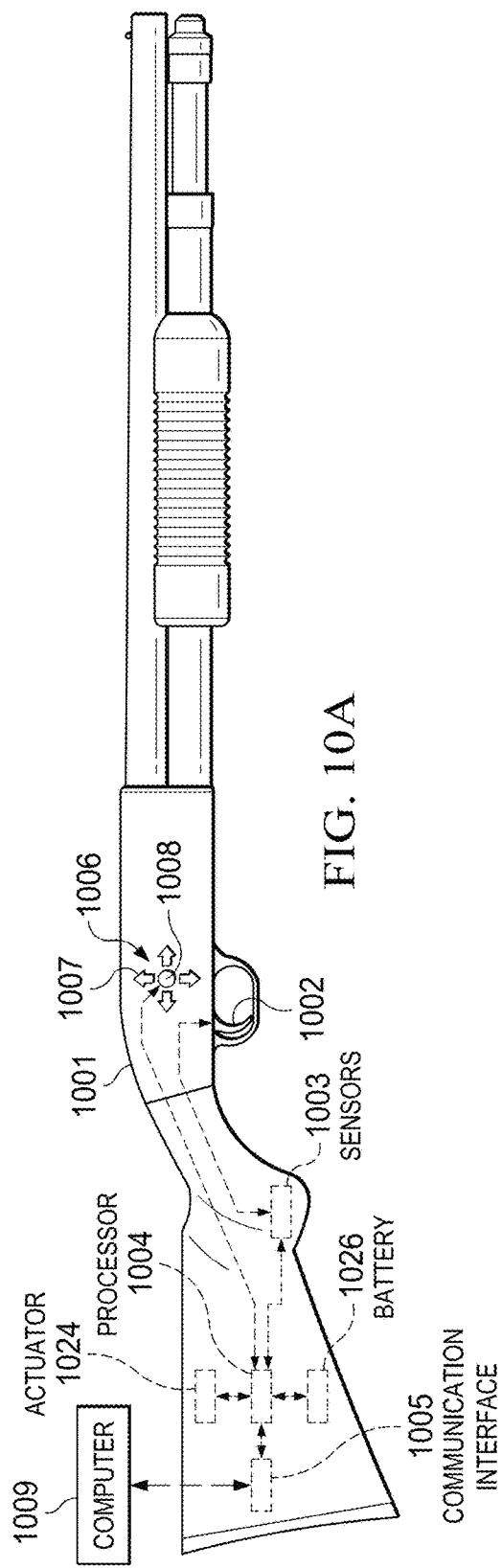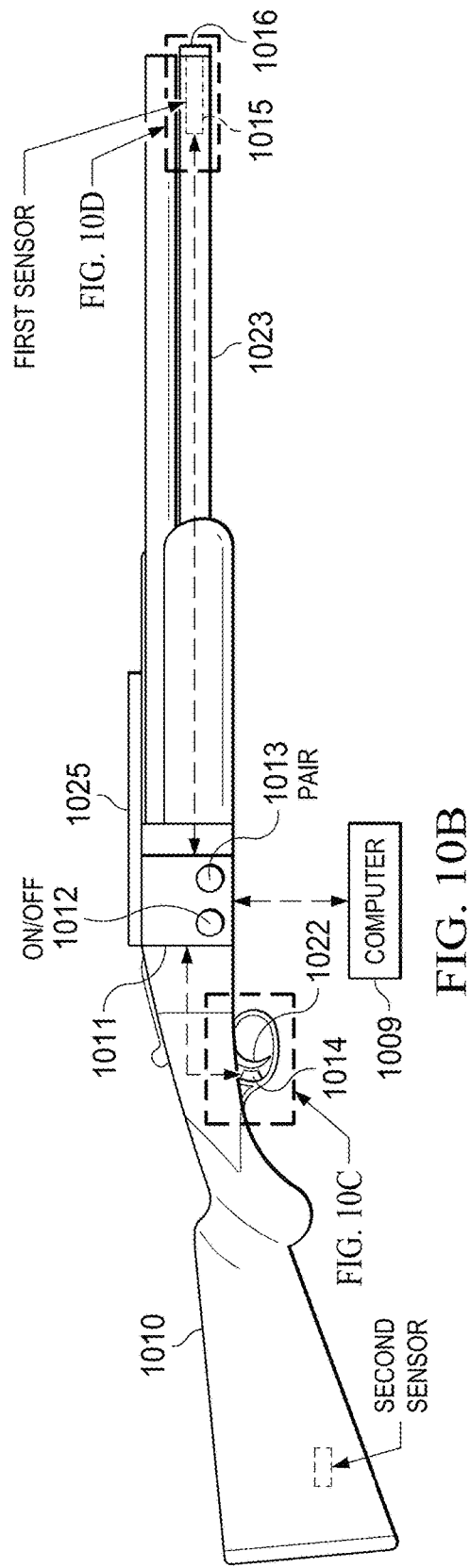

SYSTEM AND METHOD FOR MARKSMANSHIP TRAINING

CROSS REFERENCE TO RELATED APPLICATIONS

This application is a continuation in part of U.S. patent application Ser. No. 14/969,302 filed Dec. 15, 2015, which is a continuation in part of U.S. patent application Ser. No. 14/686,398 filed Apr. 14, 2015, which is a continuation in part of U.S. patent application Ser. No. 14/149,418 filed Jan. 7, 2014, granted as U.S. Pat. No. 9,261,332 on Feb. 16, 2016, which is a continuation in part of U.S. patent application Ser. No. 13/890,997 filed May 9, 2013, granted as U.S. Pat. No. 9,267,762 on Feb. 23, 2016. Each of the patent applications identified above is incorporated herein by reference in its entirety to provide continuity of disclosure.

FIELD OF THE INVENTION

The present invention relates to devices for teaching marksmen how to properly lead a moving target with a weapon. More particularly, the invention relates to optical projection systems to monitor and simulate trap, skeet, and sporting clay shooting.

BACKGROUND OF THE INVENTION

Marksmen typically train and hone their shooting skills by engaging in skeet, trap or sporting clay shooting at a shooting range. The objective for a marksman is to successfully hit a moving target by tracking at various distances and angles and anticipating the delay time between the shot and the impact. In order to hit the moving target, the marksman must aim the weapon ahead of and above the moving target by a distance sufficient to allow a projectile fired from the weapon sufficient time to reach the moving target. The process of aiming the weapon ahead of the moving target is known in the art as "leading the target." "Lead" is defined as the distance between the moving target and the aiming point. The correct lead distance is critical to successfully hit the moving target. Further, the correct lead distance is increasingly important as the distance of the marksman to the moving target increases, the speed of the moving target increases, and the direction of movement becomes more oblique.

Trap shooting range 200 comprises firing lanes 201 and trap house 202. Stations 203, 204, 205, 206, and 207 are positioned along radius 214 from center 218 of trap house 202. Radius 214 is distance 216 from center 218. Distance 216 is 48 feet. Each of stations 203, 204, 205, 206, and 207 is positioned at radius 214 at equal arc lengths. Arc length 213 is 9 feet. Stations 208, 209, 210, 211, and 212 are positioned along radius 215 from center 218. Radius 215 is distance 217 from center 218. Distance 217 is 81 feet. Each of stations 208, 209, 210, 211, and 212 is positioned at radius 215 at equal arc lengths. Arc length 227 is 12 feet. Field 226 has length 221 from center 218 along center line 220 of trap house 202 to point 219. Length 221 is 150 feet. Boundary line 222 extends 150 feet from center 218 at angle 224 from center line 220. Boundary line 223 extends 150 feet from center 218 at angle 225 from center line 220. Angles 224 and 225 are each 22° from center line 220. Trap house 202 launches clay targets at various trajectories within field 226. Marksman 228 positioned at any of stations 203, 204, 205, 206, 207, 208, 209, 210, 211, and 212 attempts to shoot and break the launched clay targets.

FIGS. 3A, 3B, 3C, and 3D depict examples of target paths and associated projectile paths illustrating the wide range of lead distances and distances required of the marksman. The term "projectile," as used in this application, means any projectile fired from a weapon but more typically a shotgun round comprised of pellets of various sizes. For example, FIG. 3A shows a left to right trajectory 303 of target 301 and left to right intercept trajectory 304 for projectile 302. In this example, the intercept path is oblique, requiring the lead to be a greater distance along the positive X axis. FIG. 3B shows a left to right trajectory 307 of target 305 and intercept trajectory 308 for projectile 306. In this example, the intercept path is acute, requiring the lead to be a lesser distance in the positive X direction. FIG. 3C shows a right to left trajectory 311 of target 309 and intercepting trajectory 312 for projectile 310. In this example, the intercept path is oblique and requires a greater lead in the negative X direction. FIG. 3D shows a proximal to distal and right to left trajectory 315 of target 313 and intercept trajectory 316 for projectile 314. In this example, the intercept path is acute and requires a lesser lead in the negative X direction.

FIGS. 4A and 4B depict a range of paths of a clay target and an associated intercept projectile. The most typical projectile used in skeet and trap shooting is a shotgun round, such as a 12-gauge round or a 20 gauge round. When fired, the pellets of the round spread out into a "shot string" having a generally circular cross-section. The cross-section increases as the flight time of the pellets increases. Referring to FIG. 4A, clay target 401 moves along path 402. Shot string 403 intercepts clay target 401. Path 402 is an ideal path, in that no variables are considered that may alter path 402 of clay target 401 once clay target 401 is launched.

Referring to FIG. 4B, path range 404 depicts a range of potential flight paths for a clay target after being released on a shooting range. The flight path of the clay target is affected by several variables. Variables include mass, wind, drag, lift force, altitude, humidity, and temperature, resulting in a range of probable flight paths, path range 404. Path range 404 has upper limit 405 and lower limit 406. Path range 404 from launch angle θ is extrapolated using:

$$x = x_o + v_{xo}t + \frac{1}{2}a_x t^2 + C_x \qquad \text{Eq. 1}$$

$$y = y_o + v_{yo}t + \frac{1}{2}a_y t^2 + C_y \qquad \text{Eq. 2}$$

where x is the clay position along the x-axis, $x_o$ is the initial position of the clay target along the x-axis, $v_{xo}$ is the initial velocity along the x-axis, $a_x$ is the acceleration along the x-axis, t is time, and $C_x$ is the drag and lift variable along the x-axis, y is the clay position along the y-axis, $y_o$ is the initial position of the clay target along the y-axis, $v_{yo}$ is the initial velocity along the y-axis, $a_y$ is the acceleration along the y-axis, t is time, and $C_y$ is the drag and lift variable along the x-axis. Upper limit 405 is a maximum distance along the x-axis with $C_x$ at a maximum and a maximum along the y-axis with $C_y$ at a maximum. Lower limit 406 is a minimum distance along the x-axis with $C_x$ at a minimum and a minimum along the y-axis with $C_y$ at a minimum. Drag and lift are given by:

$$F_{drag} = \frac{1}{2}\rho v^2 C_D A \qquad \text{Eq. 3}$$

where $F_{drag}$ is the drag force, ρ is the density of the air, v is $v_o$, A is the cross-sectional area, and $C_D$ is the drag coefficient;

$$F_{lift} = \frac{1}{2}\rho v^2 C_L A \qquad \text{Eq. 4}$$

where $F_{lift}$ is the lift force, ρ is the density of the air, v is $v_o$, A is the planform area, and $C_L$ is the lift coefficient.

Referring to FIG. 5, an example of lead from the perspective of the marksman is described. Marksman 501 aims weapon 502 at clay target 503 moving along path 504 left to right. In order to hit clay target 503, marksman 501 must anticipate the time delay for a projectile fired from weapon 502 to intercept clay target 503 by aiming weapon 502 ahead of clay target 503 at aim point 505. Aim point 505 is lead distance 506 ahead of clay target 503 along path 504. Marksman 501 must anticipate and adjust aim point 505 according to a best guess at the anticipated path of the target.

Clay target 503 has initial trajectory angles γ and β, positional coordinates $x_1$, $y_1$ and a velocity $v_1$. Aim point 505 has coordinates $x_2$, $y_2$. Lead distance 506 has x-component 507 and y-component 508. X-component 507 and y-component 508 are calculated by:

$$\Delta x = x_2 - x_1 \qquad \text{Eq. 5}$$

$$\Delta y = y_2 - y_1 \qquad \text{Eq. 6}$$

where Δx is x component 507 and Δy is y component 508. As γ increases, Δy must increase. As γ increases, Δx must increase. As β increases, Δy must increase.

The prior art has attempted to address the problems of teaching proper lead distance with limited success. For example, U.S. Pat. No. 3,748,751 to Breglia, et al. discloses a laser, automatic fire weapon simulator. The simulator includes a display screen, a projector for projecting a motion picture on the display screen. A housing attaches to the barrel of the weapon. A camera with a narrow band-pass filter positioned to view the display screen detects and records the laser light and the target shown on the display screen. However, the simulator requires the marksman to aim at an invisible object, thereby making the learning process of leading a target difficult and time-consuming.

U.S. Pat. No. 3,940,204 to Yokoi discloses a clay shooting simulation system. The system includes a screen, a first projector providing a visible mark on the screen, a second projector providing an infrared mark on the screen, a mirror adapted to reflect the visible mark and the infrared mark to the screen, and a mechanical apparatus for moving the mirror in three dimensions to move the two marks on the screen such that the infrared mark leads the visible mark to simulate a lead-sighting point in actual clay shooting. A light receiver receives the reflected infrared light. However, the system in Yokoi requires a complex mechanical device to project and move the target on the screen, which leads to frequent failure and increased maintenance.

U.S. Pat. No. 3,945,133 to Mohon, et al. discloses a weapons training simulator utilizing polarized light. The simulator includes a screen and a projector projecting a two-layer film. The two-layer film is formed of a normal film and a polarized film. The normal film shows a background scene with a target with non-polarized light. The polarized film shows a leading target with polarized light. The polarized film is layered on top of the normal non-polarized film. A polarized light sensor is mounted on the barrel of a gun. However, the weapons training simulator requires two cameras and two types of film to produce the two-layered film making the simulator expensive and time-consuming to build and operate.

U.S. Pat. No. 5,194,006 to Zaenglein, Jr. discloses a shooting simulator. The simulator includes a screen, a projector for displaying a moving target image on the screen, and a weapon connected to the projector. When a marksman pulls the trigger a beam of infrared light is emitted from the weapon. A delay is introduced between the time the trigger is pulled and the beam is emitted. An infrared light sensor detects the beam of infrared light. However, the training device in Zaenglein, Jr. requires the marksman to aim at an invisible object, thereby making the learning process of leading a target difficult and time-consuming.

U.S. Patent Publication No. 2010/0201620 to Sargent discloses a firearm training system for moving targets. The system includes a firearm, two cameras mounted on the firearm, a processor, and a display. The two cameras capture a set of stereo images of the moving target along the moving target's path when the trigger is pulled. However, the system requires the marksman to aim at an invisible object, thereby making the learning process of leading a target difficult and time-consuming. Further, the system requires two cameras mounted on the firearm making the firearm heavy and difficult to manipulate leading to inaccurate aiming and firing by the marksman when firing live ammunition without the mounted cameras.

The prior art fails to disclose or suggest a system and method for simulating a lead for a moving target using generated images of targets projected at the same scale as viewed in the field and a phantom target positioned ahead of the targets having a variable contrast. The prior art further fails to disclose or suggest a system and method for simulating lead in a virtual reality system. Therefore, there is a need in the art for a shooting simulator that recreates moving targets at the same visual scale as seen in the field with a phantom target to teach proper lead of a moving target in a virtual reality platform.

SUMMARY

A system and method for simulating lead of a target includes a network, a simulation administrator connected to the network, a database connected to the simulation administrator, and a user device connected to the network. The user device includes a set of virtual reality unit, and a computer connected to the virtual reality unit and to the network. A set of position trackers are connected to the computer.

In a preferred embodiment, a target is simulated. In one embodiment, a simulated weapon is provided. In another embodiment, a set of sensors is attached to a real weapon. In another embodiment, a set of gloves having a set of sensors is worn by a user. The system generates a simulated target and displays the simulated target upon launch of the generated target. The computer tracks the position of the generated target and the position of the virtual reality unit and the weapon to generate a phantom target and a phantom halo. The generated phantom target and the generated phantom halo are displayed on the virtual reality unit at a lead distance and a drop distance from the live target as viewed through the virtual reality unit. The computer determines a hit or a miss of the generated target using the weapon, the phantom target, and the phantom halo. In one embodiment, the disclosed system and method is implemented in a two-dimensional video game.

The present disclosure provides a system which embodies significantly more than an abstract idea including technical advancements in the field of data processing and a transformation of data which is directly related to real world objects and situations. The disclosed embodiments create and transform imagery in hardware, for example, a weapon peripheral and a sensor attachment to a real weapon.

BRIEF DESCRIPTION OF THE DRAWINGS

The disclosed embodiments will be described with reference to the accompanying drawings.

FIG. 9A is a side view of a user device of a virtual reality simulator system of a preferred embodiment.

FIG. 10A is a side view of a simulated weapon for a virtual reality system of a preferred embodiment.

FIG. 10B is a side view of a real weapon with a set of sensors attached for a virtual reality system of a preferred embodiment.

DETAILED DESCRIPTION

Figure 1:
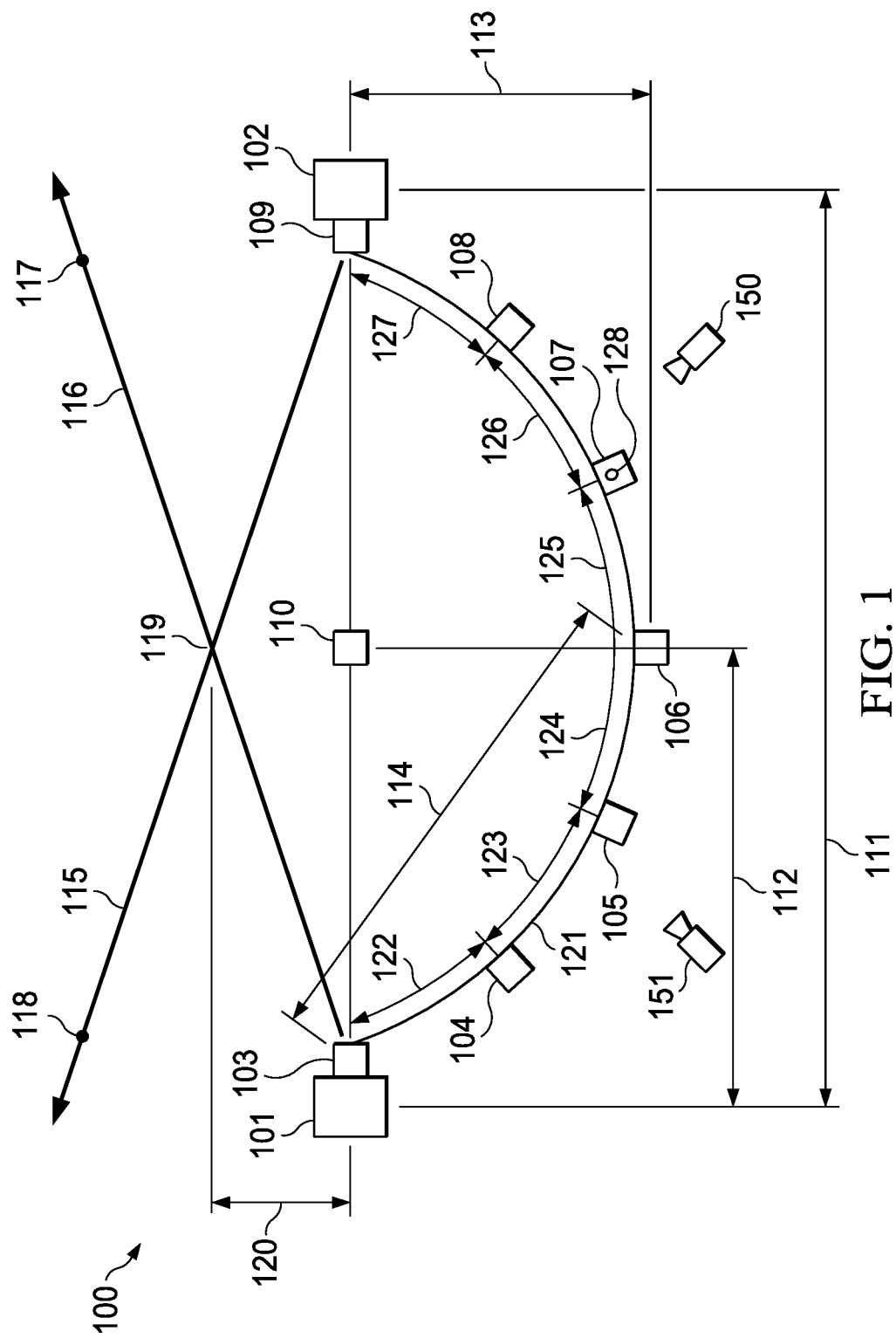
FIG. 1 is a plan view of a skeet shooting range.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 6:
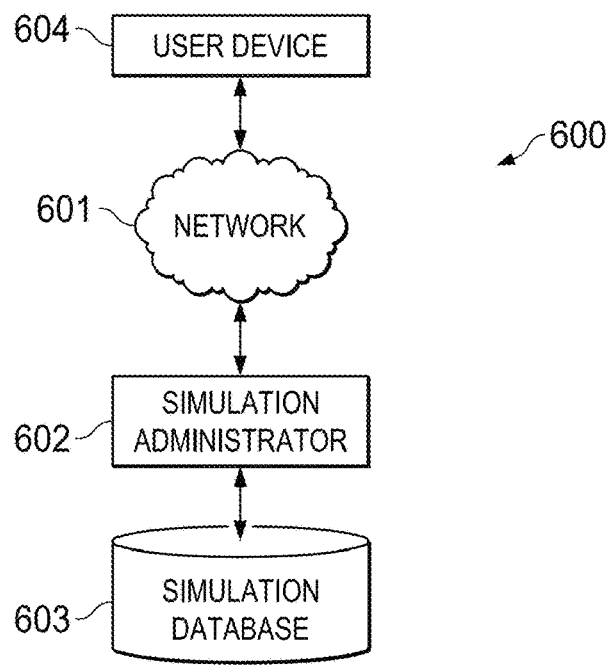
FIG. 6 is a schematic of a simulator system of a preferred embodiment.

Referring to FIG. 6, system 600 includes network 601, simulation administrator 602 connected to network 601, and user device 604 connected to network 601. Simulation administrator 602 is further connected to simulation database 603 for storage of relevant data. For example, data includes a set of target data, a set of weapon data, and a set of environment data.

In one embodiment, network 601 is a local area network. In another embodiment, network 601 is a wide area network, such as the internet. In other embodiments, network 601 includes a combination of wide area networks and local area networks, includes cellular networks.

In a preferred embodiment, user device 604 communicates with simulation administrator 602 to simulation database 603 to generate and project a simulation that includes a target, a phantom, and a phantom halo adjacent to the target as will be further described below.

In another embodiment, simulation administrator 602 generates a simulation that includes a target, a phantom, a phantom halo adjacent to the target, and a weapon image as will be further described below and sends the simulation to user device for projection.

FIG. 1 depicts the general dimensions of a skeet shooting range. Skeet shooting range 100 is a skeet field that includes eight shooter positions with 2 launcher locations. Cameras 150 and 151 are located in positions to view houses 101 and 102 and launchers 103 and 109. Skeet shooting range 100 has high house 101 and low house 102 separated by distance 111. Distance 111 is about 120 feet. Launcher 103 is adjacent high house 101. Launcher 109 is adjacent low house 102. Station 110 is equidistant from high house 101 and low house 102 at distance 112. Distance 112 is about 60 feet. Station 106 is equidistant from high house 101 and low house 102 and generally perpendicular to distance 111 at distance 113. Distance 113 is 45 feet. Station 106 is distance 114 from launcher 103. Distance 114 is about 75 feet. Stations 104 and 105 are positioned along arc 121 between launcher 103 and station 106 at equal arc lengths. Each of arc lengths 122, 123, and 124 is about 27 feet. Stations 107 and 108 are positioned along arc 121 between station 106 and launcher 109 at equal arc lengths. Each of arc lengths 125, 126, and 127 is 26 feet, 8⅜ inches.

Target flight path 116 extends from high house 101 to marker 117. Marker 117 is positioned about 130 feet from high house 101 along target flight path 115. Target flight path 115 extends from low house 102 to marker 118. Marker 118 is about 130 feet from low house 102 along target flight path 116. Target flight paths 115 and 116 intersect at target crossing point 119. Target crossing point 119 is positioned distance 120 from station 110 and is 15 feet above the ground. Distance 120 is 18 feet. Clay targets are launched from high house 101 and low house 102 along target flight paths 115 and 116, respectively. Marksman 128 positioned at any of stations 104, 105, 106, 107, 108, and 110 and launchers 103 and 109 attempts to shoot and break the launched clay targets.

Figure 2:
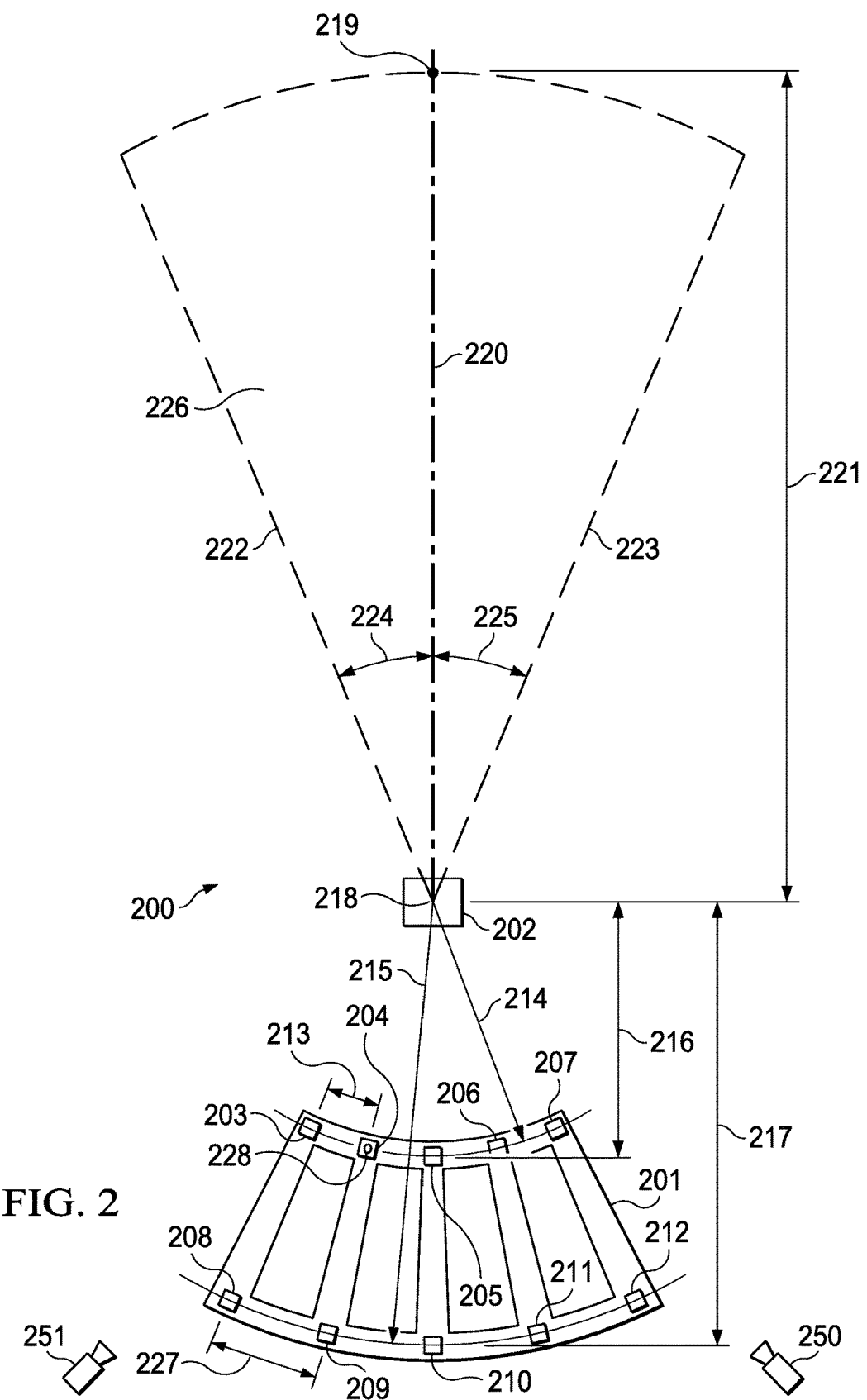
FIG. 2 is a plan view of a trap shooting range.
Figure 3A:
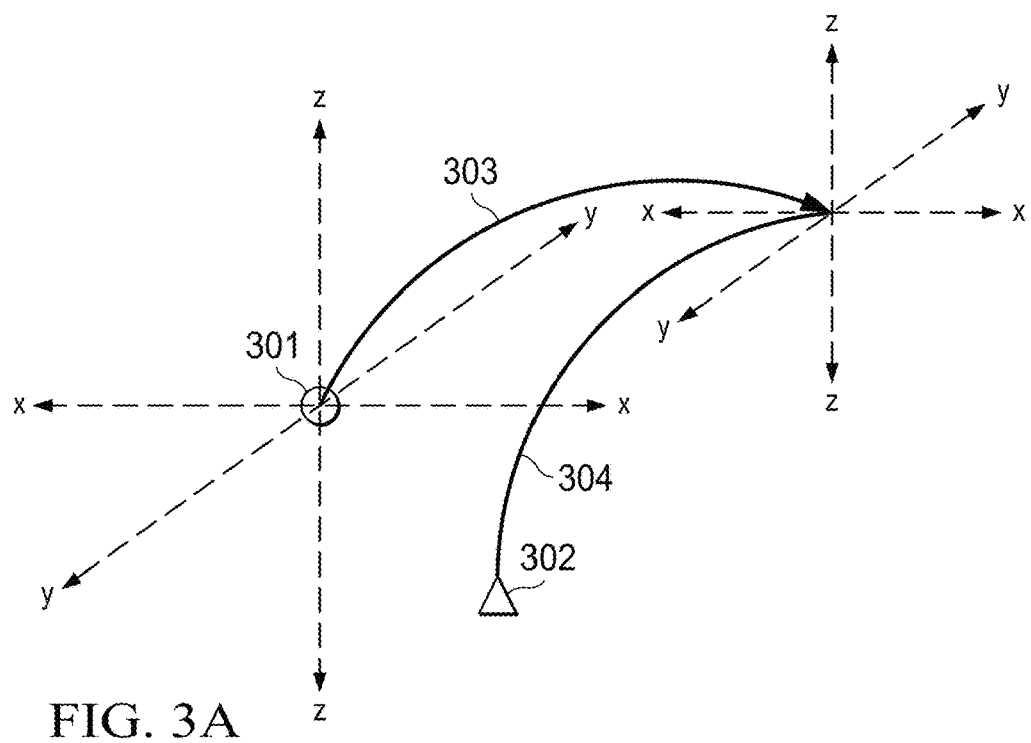
FIG. 3A is a target path and an associated projectile path.
Figure 3B:
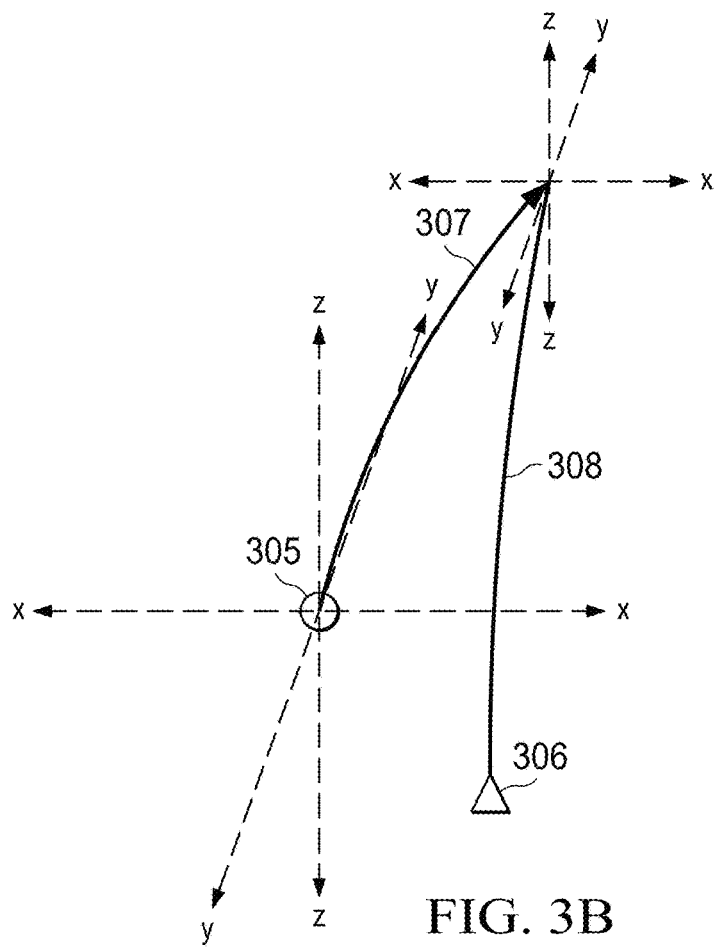
FIG. 3B is a target path and an associated projectile path.
Figure 3C:
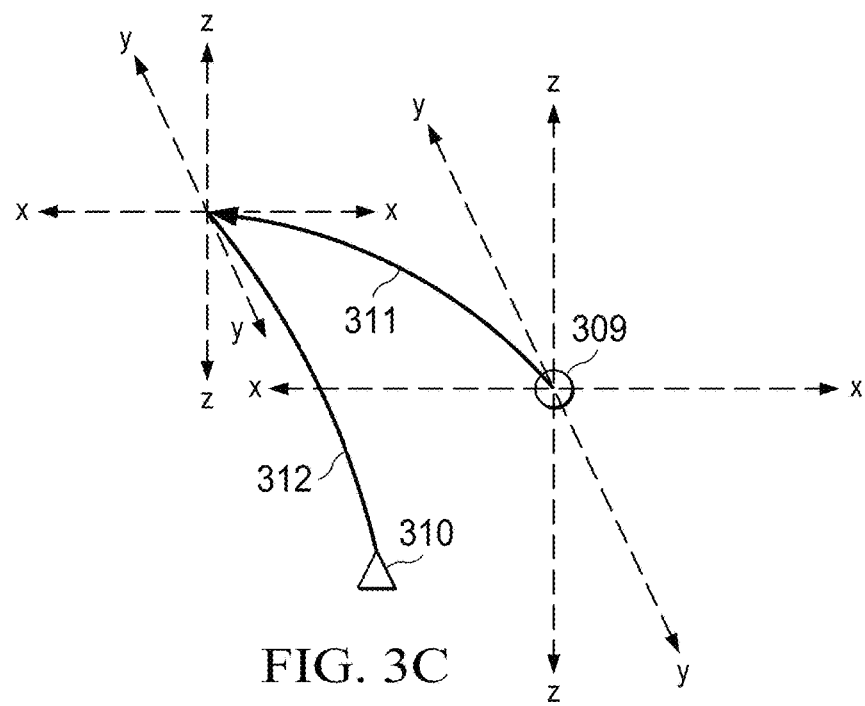
FIG. 3C is a target path and an associated projectile path.
Figure 3D:
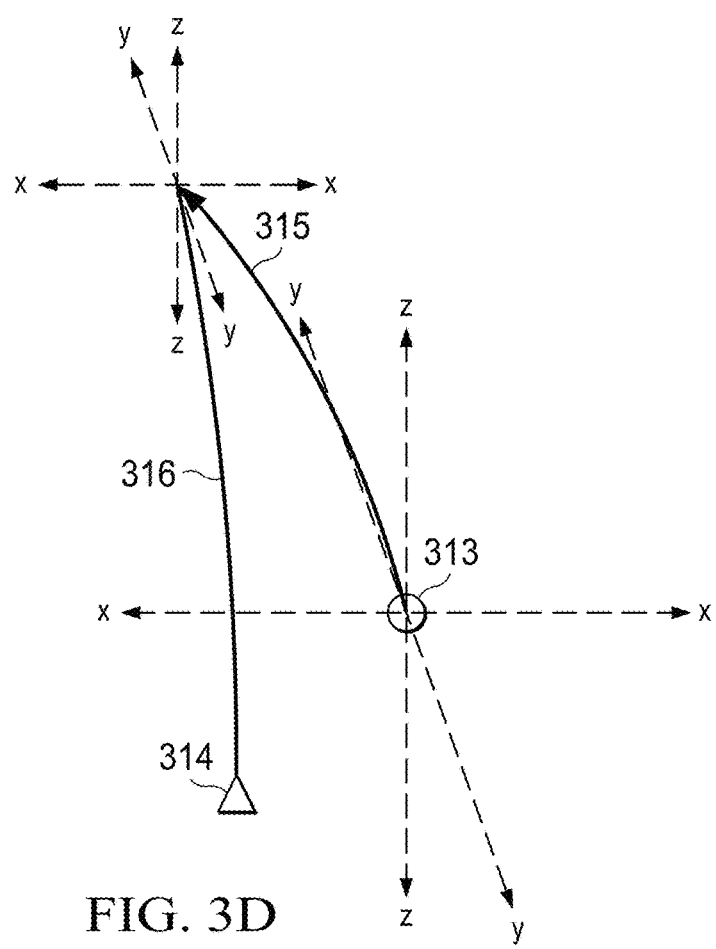
FIG. 3D is a target path and an associated projectile path.
Figure 4A:
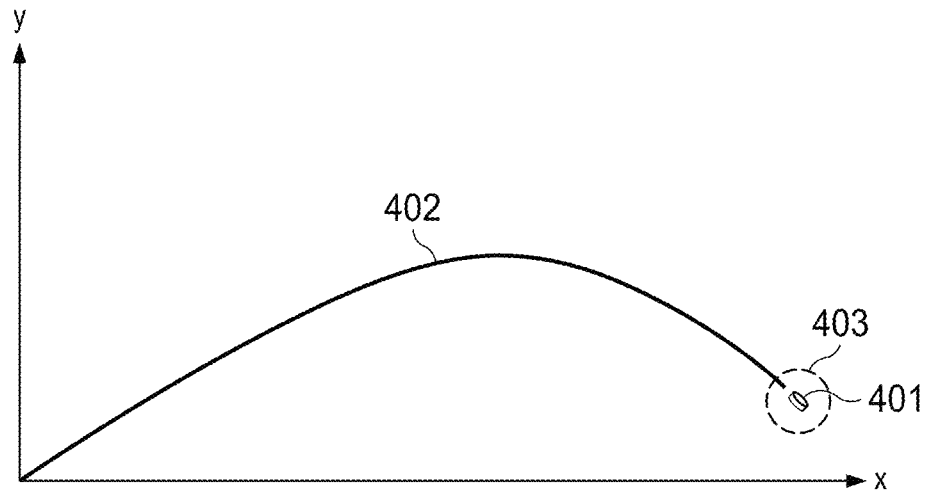
FIG. 4A is an ideal path of a moving target.
Figure 4B:
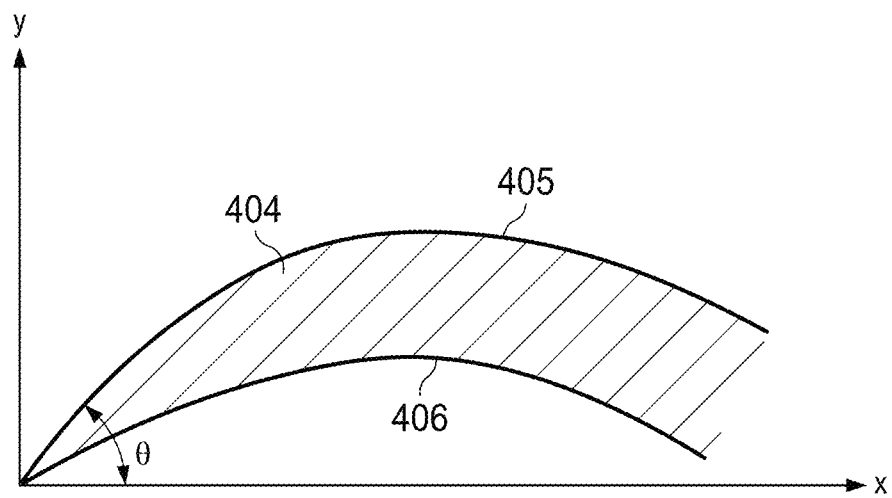
FIG. 4B is a range of probable flight paths of a target.
Figure 5:
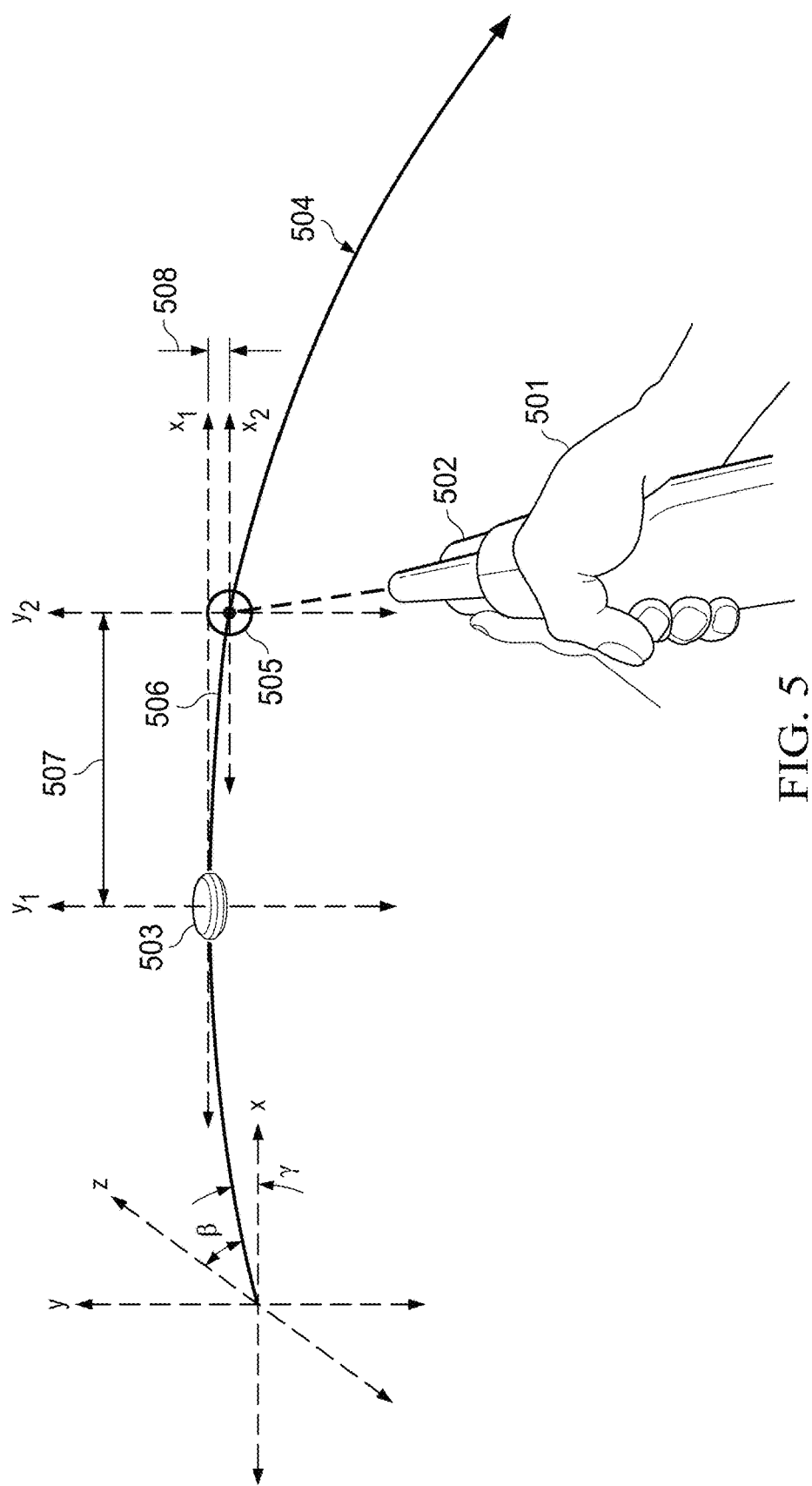
FIG. 5 is a perspective view of a marksman aiming at a moving target.

FIG. 2 depicts the general dimensions of a trap shooting range. Trap shooting range 200 is a trap field that includes five shooter locations with one launcher location. Cameras 250 and 251 are located in positions to view trap house 202. Once all of the coordinates are set and the field dimensions are known, one good video at a normal lens setting at 60 frames per second (fps) of one trajectory can be used to recreate a trajectory and phantom position from any point of view (POV).

Figure 7:
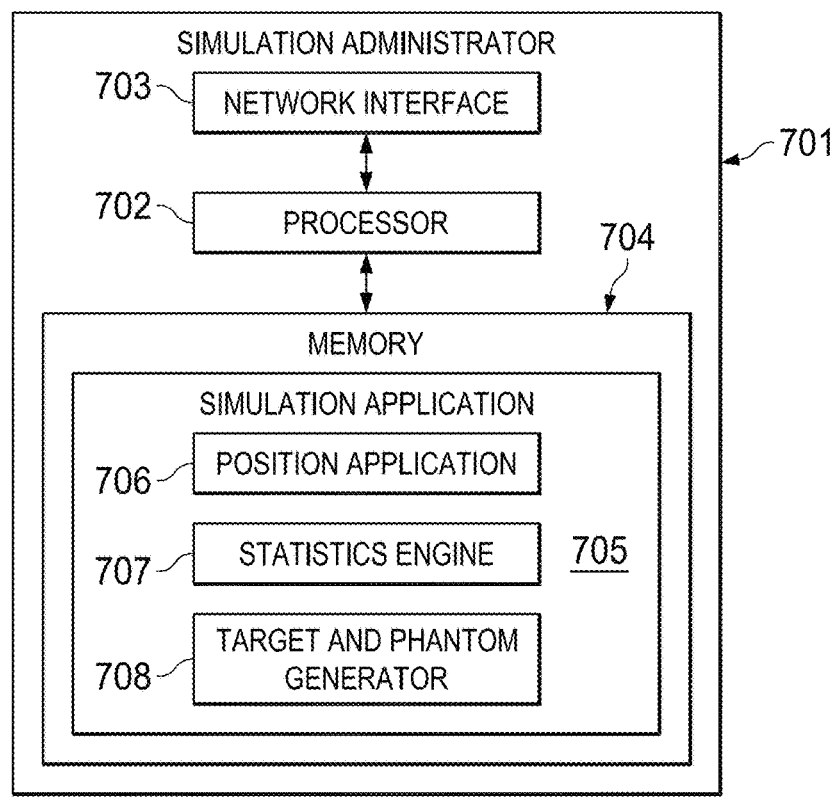
FIG. 7 is a schematic of a simulation administrator of a preferred embodiment.

Referring to FIG. 7, simulation administrator 701 includes processor 702, network interface 703 connected to processor 702, and memory 704 connected to processor 702. Simulation application 705 is stored in memory 704 and executed by processor 702. Simulation application 705 includes position application 706, statistics engine 707, and target and phantom generator 708.

In a preferred embodiment, simulation administrator 701 is a PowerEdge C6100 server and includes a PowerEdge C410x PCIe Expansion Chassis available from Dell Inc. Other suitable servers, server arrangements, and computing devices known in the art may be employed.

In one embodiment, position application 706 communicates with a position tracker connected to the user device to detect the position of the user device for simulation application 705. Statistics engine 707 communicates with a database to retrieve relevant data and generate renderings according desired simulation criteria, such as desired weapons, environments, and target types for simulation application 705. Target and phantom generator 708 calculates and generates a target along a target path, a phantom target, and a phantom halo for the desired target along a phantom path for simulation application, as will be further described below.

Figure 8:
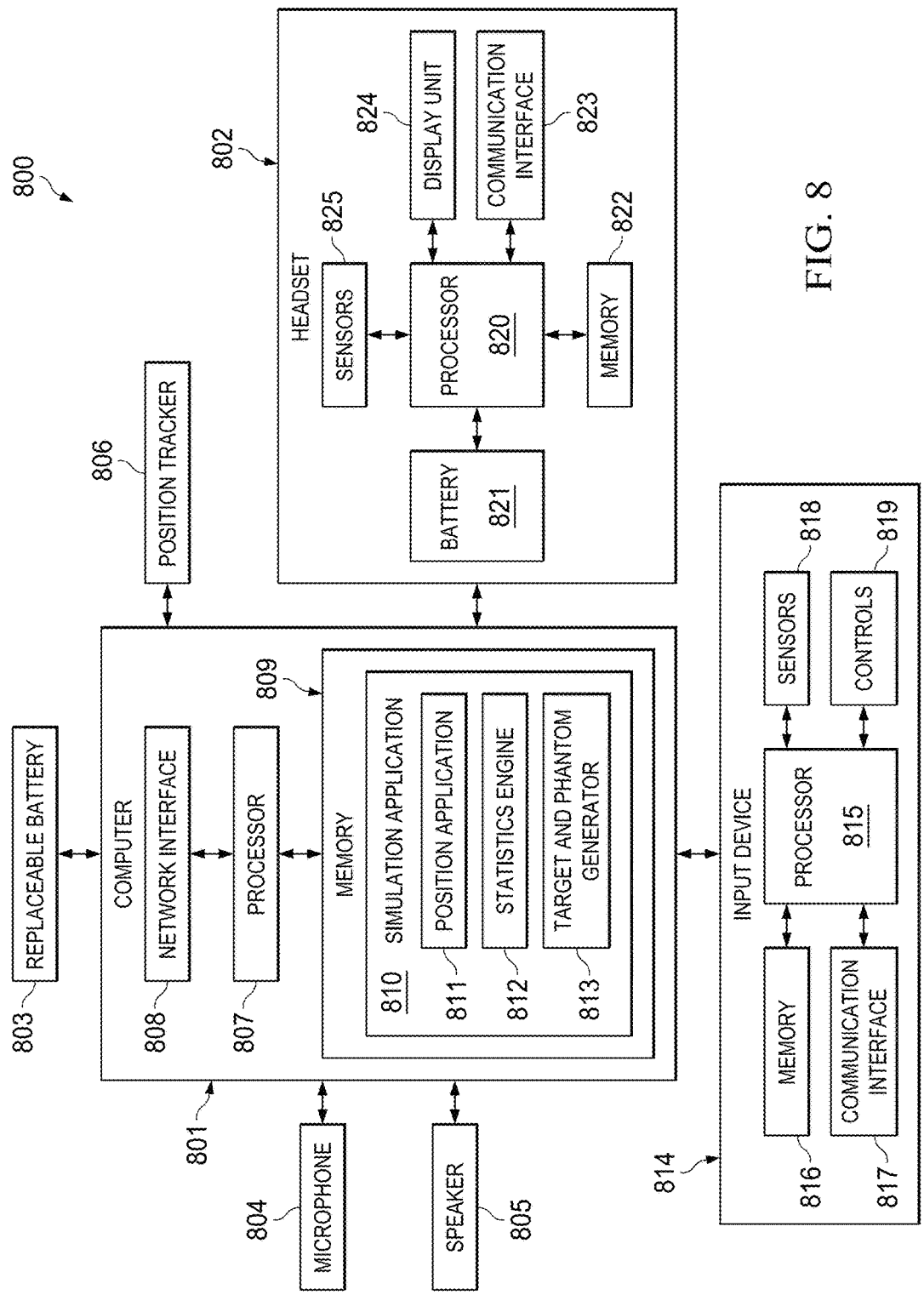
FIG. 8 is a schematic of a user device of a simulator system of a preferred embodiment.

Referring to FIG. 8, user device 800 includes computer 801 connected to headset 802. Computer 801 is further connected to replaceable battery 803, microphone 804, speaker 805, and position tracker 806.

Computer 801 includes processor 807, memory 809 connected to processor 807, and network interface 808 connected to processor 807. Simulation application 810 is stored in memory 809 and executed by processor 807. Simulation application 810 includes position application 811, statistics engine 812, and target and phantom generator 813. In a preferred embodiment, position application 811 communicates with position tracker 806 to detect the position of headset 802 for simulation application 810. Statistics engine 812 communicates with a database to retrieve relevant data and generate renderings according desired simulation criteria, such as desired weapons, environments, and target types for simulation application 810. Target and phantom generator 813 calculates and generates a target along a target path, a phantom target, and a phantom halo for the desired target along a phantom path for simulation application 810, as will be further described below.

Input device 814 is connected to computer 801. Input device 814 includes processor 815, memory 816 connected to processor 815, communication interface 817 connected to processor 815, a set of sensors 818 connected to processor 815, and a set of controls 819 connected to processor 815.

In one embodiment, input device 814 is a simulated weapon, such as a shot gun, a rifle, or a handgun. In another embodiment, input device 814 is a set of sensors connected to a disabled real weapon, such as a shot gun, a rifle, or a handgun, to detect movement and actions of the real weapon. In another embodiment, input device 814 is a glove having a set of sensors worn by a user to detect positions and movements of a hand of a user.

Headset 802 includes processor 820, battery 821 connected to processor 820, memory 822 connected to processor 820, communication interface 823 connected to processor 820, display unit 824 connected to processor 820, and a set of sensors 825 connected to processor 820.

Figure 9B:
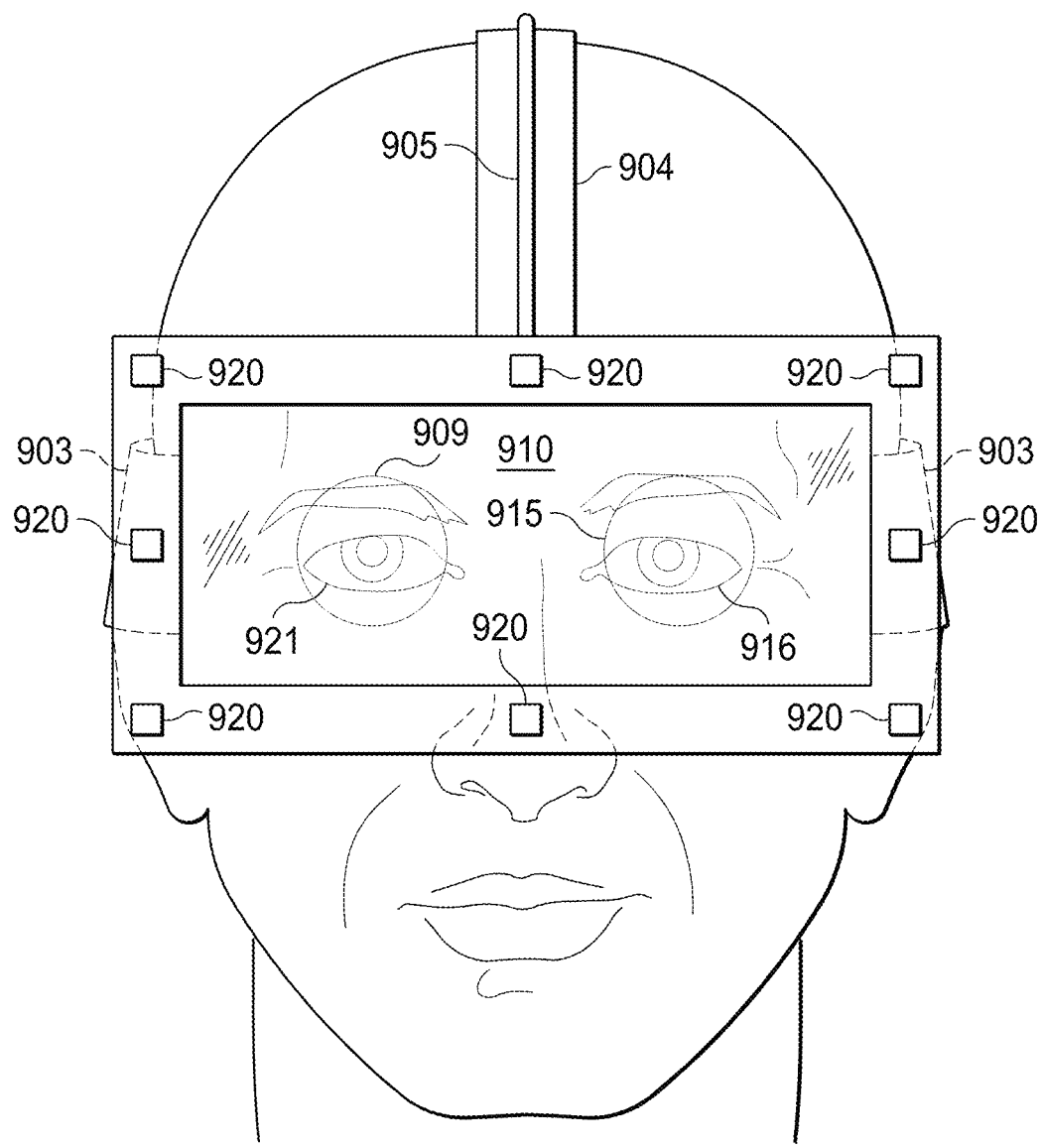
FIG. 9B is a front view of a user device of a virtual reality simulator system of a preferred embodiment.

Referring to FIGS. 9A and 9B, a preferred implementation of user device 800 is described as user device 900. User 901 wears virtual reality unit 902 having straps 903 and 904. Virtual reality unit 902 is connected to computer 906 via connection 905. Computer 906 is preferably a portable computing device, such as a laptop or tablet computer, worn by user 901. In other embodiments, computer 906 is a desktop computer or a server, not worn by the user. Any suitable computing device known in the art may be employed. Connection 905 provides a data and power connection from computer 906 to virtual reality unit 902.

Virtual reality unit 902 includes skirt 907 attached to straps 903 and 904 and display portion 908 attached to skirt 907. Skirt 907 covers eyes 921 and 916 of user 901. Display portion 908 includes processor 911, display unit 910 connected to processor 911, a set of sensors 912 connected to processor 911, communication interface 913 connected to processor 911, and memory 914 connected to processor 911. Lens 909 is positioned adjacent to display unit 910 and eye 921 of user 901. Lens 915 is positioned adjacent to display unit 910 and eye 916 of user 901. Virtual reality unit 902 provides a stereoscopic three-dimensional view of images to user 901.

User 901 wears communication device 917. Communication device 917 includes earpiece speaker 918 and microphone 919. Communication device 917 is preferably connected to computer 906 via a wireless connection such as a Bluetooth connection. In other embodiments, other wireless or wired connections are employed. Communication device 917 enables voice activation and voice control of a simulation application stored in the computer 906 by user 901.

In one embodiment, virtual reality unit 902 is the Oculus Rift headset available from Oculus VR, LLC. In another embodiment, virtual reality unit 902 is the HTC Vive headset available from HTC Corporation. In this embodiment, a set of laser position sensors 920 is attached to an external surface virtual reality unit 902 to provide position data of virtual reality unit 902. Any suitable virtual reality unit known in the art may be employed.

In certain embodiments, set of sensors 912 include sensors related to eye tracking. When the sensors related to eye tracking are based on infrared optical tracking, the set of sensors 912 includes one or more infrared light sources and one or more infrared cameras. Light from the infrared light sources is reflected from one or more surfaces of the user eye and is received by the infrared cameras. The reflected light is reduced to a digital signal which is representative of the positions of the user eye. These signals are transmitted to the computer. Computer 906 and processor 911 then determine the positioning and direction of the eyes of the user and record eye tracking data. With the eye tracking data, computer 906 determines whether the user is focusing on the simulated target or on the phantom target; how quickly a user focusses on the simulated target or phantom target; how long it takes for the user to aim the weapon after focusing on the simulated target or phantom target; how long the user focusses on the simulated target or phantom target before pulling the trigger; how long it takes the user to see and focus on the next target; whether the user's eyes were shut or closed before, during, or after the pull of the trigger; and so on. Computer 906 also determines eye training statistics based on the eye training data and the eye tracking data collected over multiple shots and rounds of the simulation. Feedback is given to the user that includes and is based on the eye tracking data, the eye training data, and the eye training statistics.

In certain embodiments, the laser position sensors 920 are light emitting diodes (LEDs) that act as markers that can be seen or sensed by one or more cameras or sensors. Data from the cameras or sensors is processed to derive the location and orientation of virtual reality unit 902 based on the LEDs. Each LED emits light using particular transmission characteristics, such as phase, frequency, amplitude, and duty cycle. The differences in the phase, frequency, amplitude, and duty cycle of the light emitted by the LEDs allows for a sensor to identify each LED by the LED's transmission characteristics. In certain embodiments, the LEDs on virtual reality unit 902 are spaced with placement characteristics so that there is a unique distance between any two LEDs, which gives the appearance of a slightly randomized placement on virtual reality unit 902. The transmission characteristics along with placement characteristics of the LEDs on virtual reality unit 902 allows the simulation system to determine the location and orientation of virtual reality unit 902 by sensing as few as three LEDs with a camera or other sensor.

In a preferred embodiment, a simulation environment that includes a target is generated by computer 906. Computer 906 further generates a phantom target and a phantom halo in front of the generated target based on a generated target flight path. The simulation environment including the generated target, the phantom target, and the phantom halo are transmitted from computer 906 to virtual reality unit 902 for viewing adjacent eyes 916 and 921 of user 901, as will be further described below. The user aims a weapon at the phantom target to attempt to shoot the generated target.

Referring FIG. 10A in one embodiment, simulated weapon 1001 includes trigger 1002 connected to set of sensors 1003, which is connected to processor 1004. Communication interface 1005 is connected to processor 1004 and to computer 1009. Battery 1026 is connected to processor 1004. Simulated weapon 1001 further includes a set of controls 1006 attached to an external surface of simulated weapon 1001 and connected to processor 1004. Set of controls 1006 includes directional pad 1007 and selection button 1008. Battery 1026 is connected to processor 1004. Actuator 1024 is connected to processor 1004 to provide haptic feedback.

In a preferred embodiment, simulated weapon 1001 is a shotgun. It will be appreciated by those skilled in the art that other weapon types may be employed.

In one embodiment, simulated weapon 1001 is a Delta Six first person shooter controller available from Avenger Advantage, LLC. In another embodiment, simulated weapon 1001 is an airsoft weapon or air gun replica of a real weapon. In another embodiment, simulated weapon 1001 is a firearm simulator that is an inert detailed replica of an actual weapons, such as "blueguns" from Ring's Manufacturing. Other suitable simulated weapons known in the art may be employed.

In a preferred embodiment, set of sensors 1003 includes a position sensor for trigger 1002 and a set of motion sensors to detect an orientation of simulated weapon 1001.

In a preferred embodiment, the position sensor is a Hall Effect sensor. In this embodiment, a magnet is attached to trigger 1002. Other types of Hall Effect sensor or any other suitable sensor type known in the art may be employed.

In a preferred embodiment, the set of motion sensors is a 9-axis motion tracking system-in-package package sensor, model no. MP11-9150 available from InverSense®, Inc. In this embodiment, the 9-axis sensor combines a 3-axis gyroscope, a 3-axis accelerometer, an on-board digital motion processor, and a 3-axis digital compass. In other embodiments, other suitable sensors and/or suitable combinations of sensors may be employed.

Figure 10C:
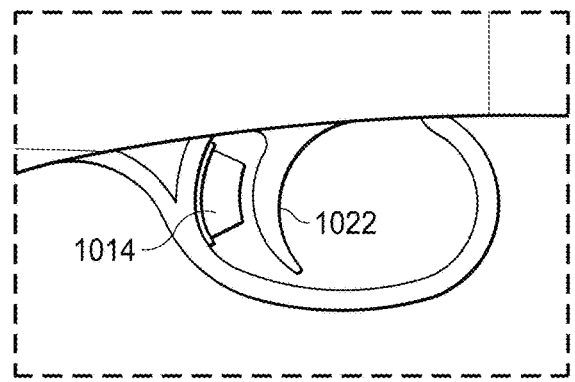
FIG. 10C is a detail view of a trigger sensor of a preferred embodiment.
Figure 10D:
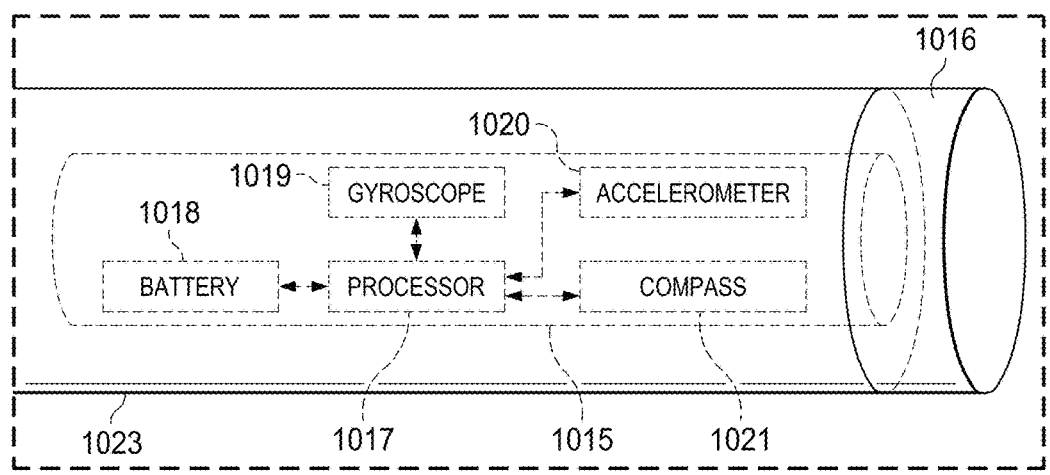
FIG. 10D is a detail view of a set of muzzle sensors of a preferred embodiment.

Referring to FIGS. 10B, 10C, and 10D in another embodiment, weapon 1010 includes simulation attachment 1011 removably attached to its stock. Simulation attachment 1011 includes on-off switch 1012 and pair button 1013 to communicate with computer 1009 via Bluetooth connection. Any suitable wireless connection may be employed. Trigger sensor 1014 is removably attached to trigger 1022 and in communication with simulation attachment 1011. A set of muzzle sensors 1015 is attached to a removable plug 1016 which is removable inserted into barrel 1023 of weapon 1010. Set of muzzle sensors 1015 include a processor 1017, battery 1018 connected to processor 1017, gyroscope 1019 connected to processor, accelerometer 1020 connected to processor 1017, and compass 1021 connected to processor 1017.

In one embodiment, set of muzzle sensors 1015 and removable plug 1016 are positioned partially protruding outside of barrel 1023 of weapon 1010.

In one embodiment, weapon 1010 includes rail 1025 attached to its stock in any position. In this embodiment, set of muzzle sensors 1015 is mounted to rail 1025.

In one embodiment, weapon 1010 fires blanks to provide live recoil to a user.

It will be appreciated by those skilled in the art that any weapon may be employed as weapon 1010, including any rifle or handgun. It will be further appreciated by those skilled in the art that rail 1025 is optionally mounted to any type of weapon. Set of muzzle sensors 1015 may be mounted in any position on weapon 1010. Any type of mounting means known in the art may be employed.

Figure 10E:
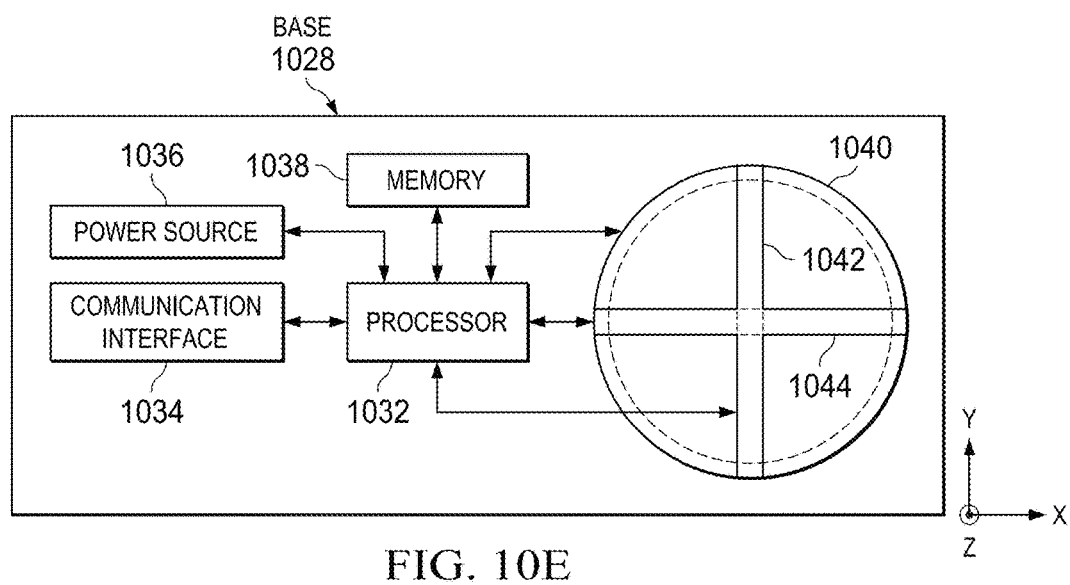
FIG. 10E is a detail view of a set of a transmitter base of a preferred embodiment.
Figure 10F:
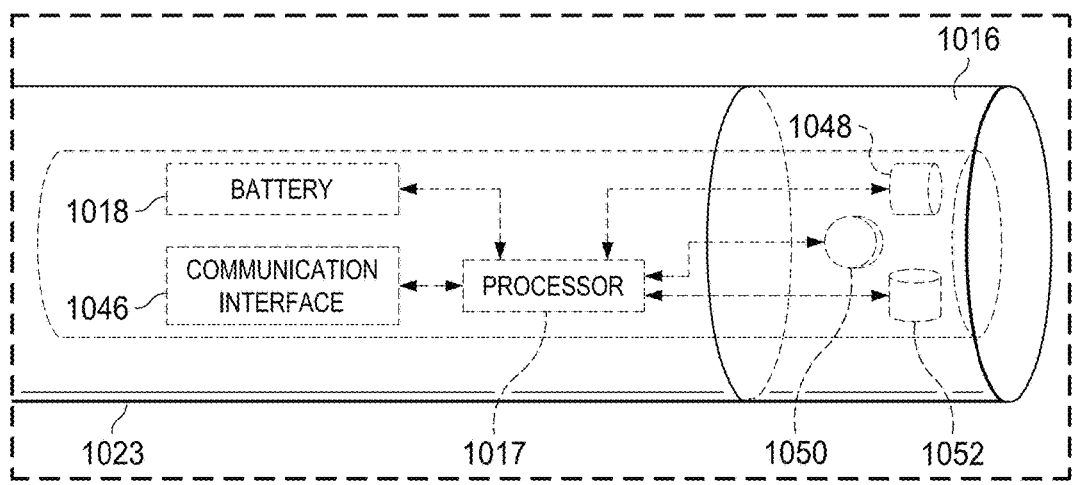
FIG. 10F is a detail view of a set of muzzle sensors used with the transmitter base of FIG. 10E of a preferred embodiment.

Referring to FIG. 10E, base 1028 comprises a sensor system that includes a magnetic field detector used to determine the location and orientation of a weapon, such as weapon 1010 with removable plug 1016 shown in FIG. 10F. Base 1028 includes processor 1032, which is connected to communication interface 1034, power source 1036, memory 1038, first coil 1040, second coil 1042, and third coil 1044. First coil 1040, second coil 1042, and third coil 1044 form the magnetic field detector of the sensor system of base 1028.

Processor 1032 of base 1028 receives positioning signals via first coil 1040, second coil 1042, and third coil 1044 that are used to determine the position and orientation of a weapon used in the simulation system. In a preferred embodiment, each of the positioning signals received via first coil 1040, second coil 1042, and third coil 1044 can be differentiated from one another by one or more of each positioning signal's phase, frequency, amplitude, and duty cycle so that each positioning signal transmitted by each coil is distinct. The differences in the positioning signals allow base 1028 to determine the position of a transmitting device, such as removable plug 1016 of FIG. 10F, based on the positioning signals that indicates the relative position between base 1028 and the transmitting device.

Referring to FIG. 10F, removable plug 1016 is inserted into an under barrel of weapon 1010 and transmits positioning signals used to determine the location an orientation of removable plug 1016 and the weapon removable plug 1016 is connected to. Removable plug 1016 includes processor 1017, which is connected to battery 1018, communication interface 1046, first coil 1048, second coil 1050, and third coil 1052. First coil 1048, second coil 1050, and third coil 1052 form magnetic field transmitters of a sensor system of removable plug 1016. The magnetic fields generated and transmitted by first coil 1048, second coil 1050, and third coil 1052 are positioning signals used to determine the location and orientation of removable plug 1016, for example, by base 1028 of FIG. 10E.

Processor 1017 transmits positioning signals from first coil 1048, second coil 1050, and third coil 1052 that are received by processor 1032 of base 1028. From the transmitted positioning signals, the relative location and orientation between removable plug 1016 and base 1028 is determined so that the precise location of removable plug 1016 with respect to base 1028 is derived. The determinations and derivations may be performed by one or more of processor 1032 of base 1028, processor 1017 of removable plug 1016, and a processor of another computer of the simulation system, such as computer 1009. Once the position of removable plug 1016 is known, the position and orientation of weapon 1010 is determined based on the location and orientation of removable plug 1016, the geometry of removable plug 1016, the geometry of weapon 1010, and the placement of removable plug 1016 on weapon 1010. With the position and orientation of weapon 1010, the simulation application can display a simulated version of weapon 1010, calculate the proper position of a phantom target, and provide suggested adjustments to improve a user's marksmanship.

In an alternative embodiment, the sensor system of base 1028 includes the magnetic field transmitter and the sensor system of removable plug 1016 includes the magnetic field detector. In alternative embodiments, removable plug 1016 includes threading that corresponds to threading with the barrel of the weapon that is commonly used for a shotgun choke and removable plug 1016 is fitted and secured to the barrel of the weapon via the threading.

Figure 10G:
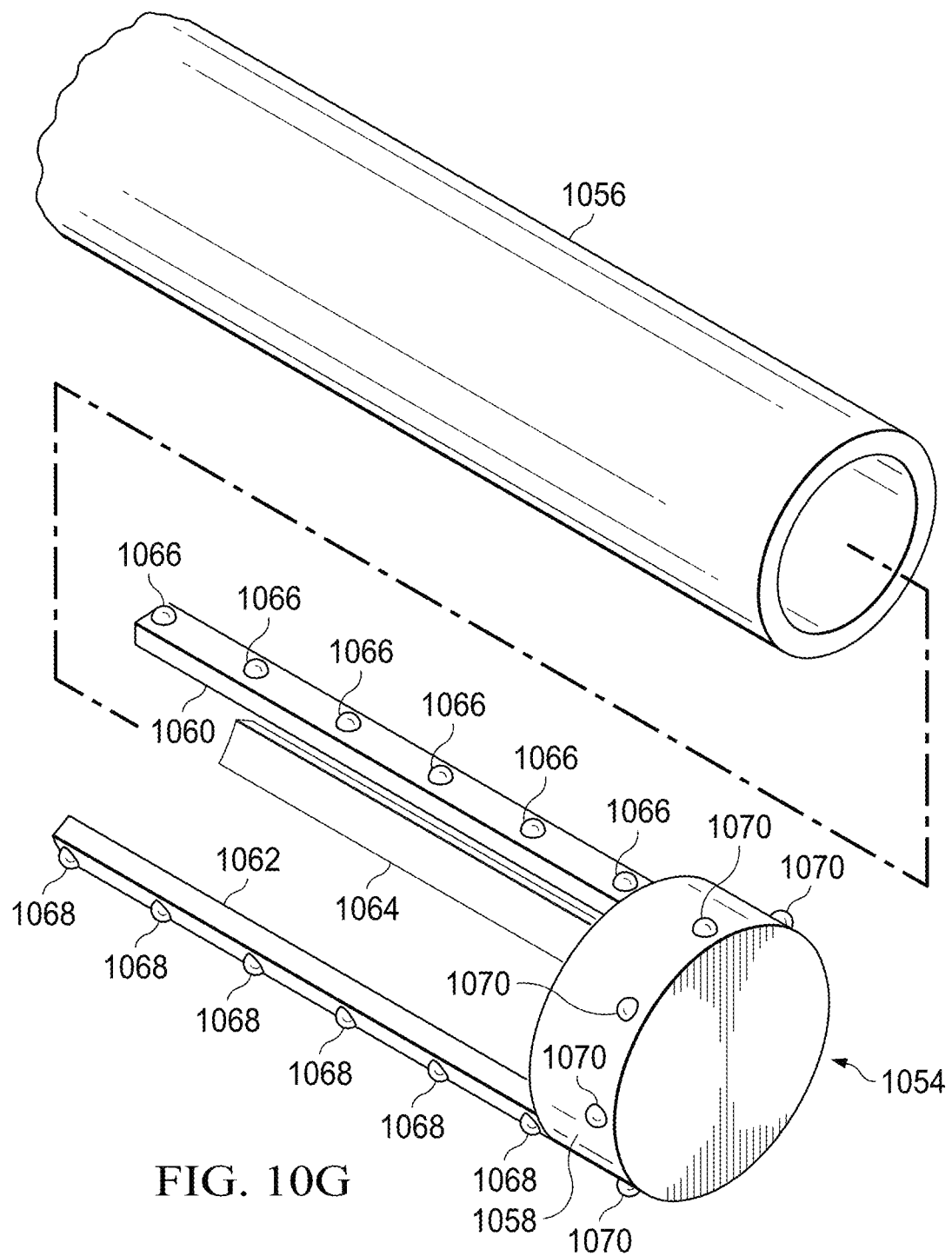
FIG. 10G is a detail view of a removable plug with light emitting diodes for a weapon of a preferred embodiment.

Referring to FIG. 10G, removable collar 1054 fits onto barrel 1056 of a weapon, such as weapon 1010 of FIG. 10B. Removable collar 1054 includes tip 1058 and three members 1060, 1062, and 1064. Members 1060, 1062, and 1064 extend from a first side of tip 1058 that touches barrel 1056 when removable collar 1054 is fitted to barrel 1056. Removable collar 1054 includes light emitting diodes (LEDs), such as LEDs 1066 on member 1060, LEDs 1068 on member 1062, and LEDs on member 1064, and LEDs 1070 on tip 1058. Removable collar 1054 includes additional LEDs that are occluded on FIG. 10G, such as on member 1064 and on tip 1058. The LEDs on removable collar 1054 may emit infrared light to be invisible to a user or may emit light in the visible spectrum. Removable collar 1054 acts as a marker from which the location and orientation of the weapon can be derived.

The LEDs on removable collar 1054 each emit light using particular transmission characteristics, such as phase, frequency, amplitude, and duty cycle. The differences in the phase, frequency, amplitude, and duty cycle of the light emitted by the LEDs allows for a sensor to identify each LED on removable collar 1054 by the LED's transmission characteristics. The LEDs on removable collar 1054 are spaced with placement characteristics so that there is a unique distance between any two LEDs, which gives the appearance of a slightly randomized placement on removable collar 1054. The transmission characteristics along with placement characteristics of the LEDs on removable collar 1054 allows the simulation system to determine the location and orientation of the removable plug by sensing as few as three LEDs with a camera or other sensor. Once the location and orientation of removable collar 1054 is determined, the location and orientation of the weapon to which removable collar 1054 is attached is derived based on the known geometries of removable collar 1054 and the weapon, which are stored in a database.

Figure 10H:
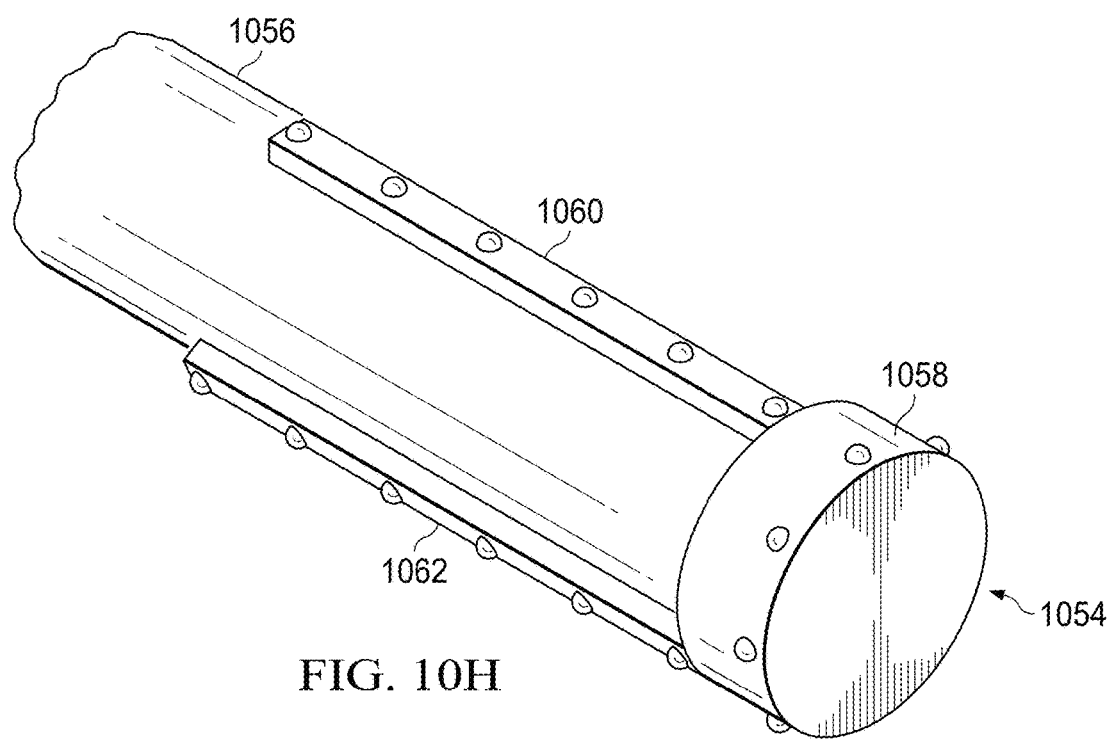
FIG. 10H is a detail view of a removable plug with light emitting diodes attached to a weapon of a preferred embodiment.

Referring to FIG. 10H, removable collar 1054 is fitted onto barrel 1056 of a weapon. Inner portions of members 1060-1064 are rubberized and may contain an adhesive to prevent movement of removable collar 1054 with respect to the weapon it is attached to. After removable collar 1054 is installed for the first time to a weapon, the simulation system is calibrated to associate the location and orientation, including a roll angle, of removable collar 1054 to the location and orientation of the weapon.

In alternative embodiments, the portion of removable collar 1054 that fits against the barrel of the weapon is shaped to fit with only one orientation with respect to the weapon. The removable collar 1054 may include additional members that fit around the iron sight of the weapon so that there is only one possible fitment of removable collar 1054 to the weapon and the process of calibration can be reduced or eliminated.

Figure 10I:
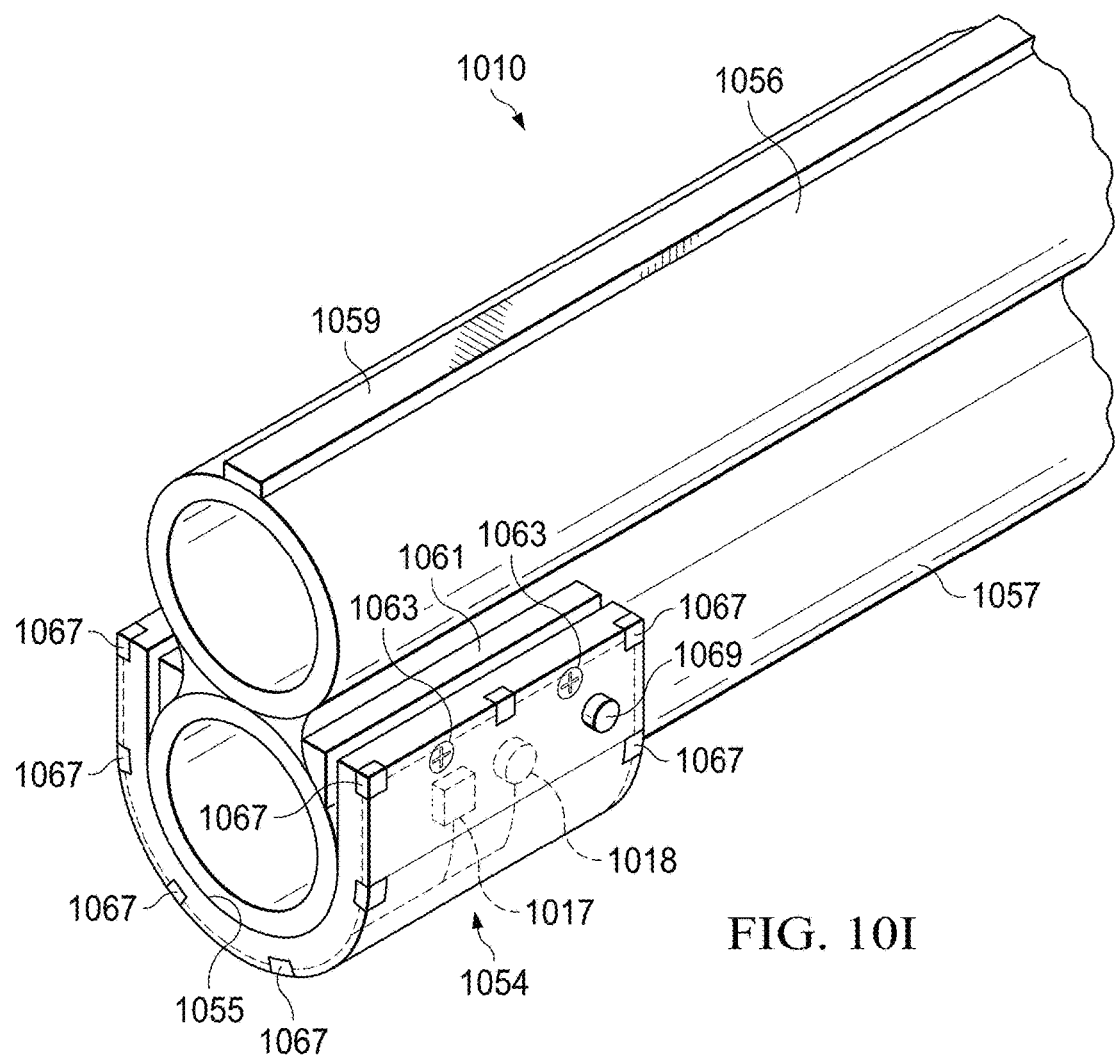
FIG. 10I is a detail view of a removable collar with light emitting diodes attached to a weapon of a preferred embodiment.

Referring to FIG. 10I, removable collar 1054 is fitted to weapon 1010. Weapon 1010 is an over-under shotgun with over barrel 1056, under barrel 1057, and top rail 1059. Removable collar 1054 comprises a hollow portion 1055 that allows for the discharge of live or blank rounds of ammunition during the simulation. A front surface of removable collar 1054 is flush with the front surfaces of barrel 1057 so that the position of removable collar 1054 with respect to each of barrels 1056 and 1057 is known and the trajectory of shots from weapon 1010 can be properly simulated. Removable collar 1054 includes hollow portion 1055, member 1061, mounting screws 1063, battery 1018, processor 1017, and LEDs 1067. Removable collar 1054 is customized to the particular shape of weapon 1010, which may include additional iron sights. Removable collar 1054 does not interfere with the sights of weapon 1010 so that weapon 1010 can be aimed normally while removable collar 1054 is fitted to weapon 1010.

Member 1061 is a flat elongated member that allows for removable collar 1054 to be precisely and tightly fitted to the end of barrel 1057 of weapon 1010 after removable collar 1054 is slid onto the end of barrel 1057. Member 1061 with mounting screws 1063 operate similar to a C-clamp with mounting screws 1063 pressing into member 1061 and thereby securing removable collar 1054 to the end of barrel 1057 with sufficient force so that the position and orientation of removable collar 1054 with respect to weapon 1010 is not altered by the firing of live rounds or blank rounds of ammunition with weapon 1010.

Battery 1018 is connected to and powers the electrical components within removable collar 1054 including processor 1017 and LEDs 1067. Processor 1017 controls LEDs 1067. In additional embodiments removable collar 1054 includes one or more, accelerometers, gyroscopes, compasses, and communication interfaces connected to processor 1017. The sensor data from the accelerometers, gyroscopes, and compasses is sent from removable collar 1054 to computer 1009 via the communication interface. Removable collar 1054 includes button 1069 to turn on, turn off, and initiate the pairing of removable collar 1054.

LEDs 1067 emit light that is sensed by one or more cameras or sensors, from which the locations and orientations of removable collar 1054 and weapon 1010 can be determined. The locations and orientations are determined from the transmission characteristics of the light emitted from LEDs 1067, and the placement characteristics of LEDs 1067.

Weapon 1010, to which removable collar 1054 is fitted, is loaded with one or more live or blank rounds of ammunition that discharge through the hollow portion 1055 of removable collar 1054 when a trigger of weapon 1010 is pulled so that blank rounds or live rounds of ammunition can be used in conjunction with the simulation. Using blank rounds or live rounds with the simulation allows for a more accurate and realistic simulation of the shooting experience, including the experience of re-aiming weapon 1010 for a second shot after feeling the kickback from the discharge of a blank or live round from a first shot.

In alternative embodiments, the weapon is a multiple shot weapon, such as an automatic rifle, a semi-automatic shotgun, or a revolver. With a multiple shot weapon the simulation experience includes the feeling of the transition between shots, such as the cycling of the receiver of a semi-automatic shotgun. When the weapon comprises an automatic or semi-automatic receiver, the simulation displays the ejection of a spent shell casing that may not correspond to the actual path or trajectory of the actual spent shell casing. Additional embodiments track the location of the spent shell casing as it is ejected and match the location and trajectory of the simulated shell casing to the location and trajectory of the spent shell casing. Additional embodiments also include one or more additional sensors, electronics, and power supplies embedded within the housing of removable collar 1054.

Figure 10J:
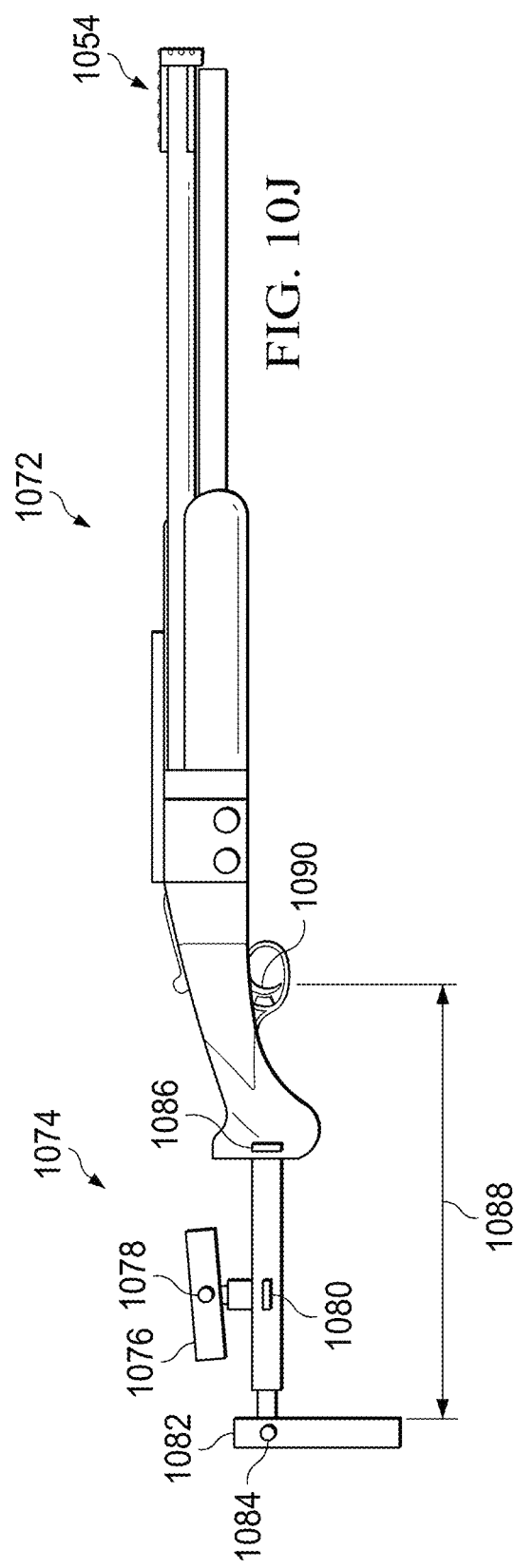
FIG. 10J is a side view of a weapon with an adjustable stock for a virtual reality simulator system of a preferred embodiment.

Referring to FIG. 10J, weapon 1072 is adapted for use in a simulation by the fitment of removable collar 1054 to the barrel of weapon 1072. Weapon 1072 is a try gun that includes a stock 1074 with adjustable components to fit users of different heights and statures. Each component may include electronic sensors that measure the length, angle, or position of the component so that weapon 1072 can be properly displayed in a simulation.

Stock 1074 of weapon 1072 includes comb 1076 with comb angle adjuster 1078 and comb height adjuster 1080. Comb 1076 rests against a cheek of a user to improve stability of weapon 1072 during use. The height of comb 1076 is adjustable via manipulation of comb height adjuster 1080. The angle of comb 1076 is adjustable via manipulation of comb angle adjuster 1078.

Stock 1074 of weapon 1072 also includes butt plate 1082 with butt plate angle adjuster 1084 and trigger length adjuster 1086. Trigger length 1088 is the length from trigger 1090 to butt plate 1082. Butt plate 1082 rests against a shoulder of a user to improve stability of weapon 1072 during use. Trigger length 1088 from butt plate 1082 to trigger 1090 is adjustable via manipulation of trigger length adjuster 1086. The angle of butt plate 1082 is adjustable via manipulation of butt plate angle adjuster 1084.

When weapon 1072 used in a virtual reality simulation system with removable collar 1054, suggested adjustments to comb 1076 and butt plate 1082 are optionally provided. If shots are consistently to the right or left of an ideal shot placement for a right handed shooter, it may be suggested to increase or decrease trigger length 1088, respectively. If shots are consistently above or below the ideal shot placement, it may be suggested to decrease or increase the height of comb 1076, respectively.

Figure 10K:
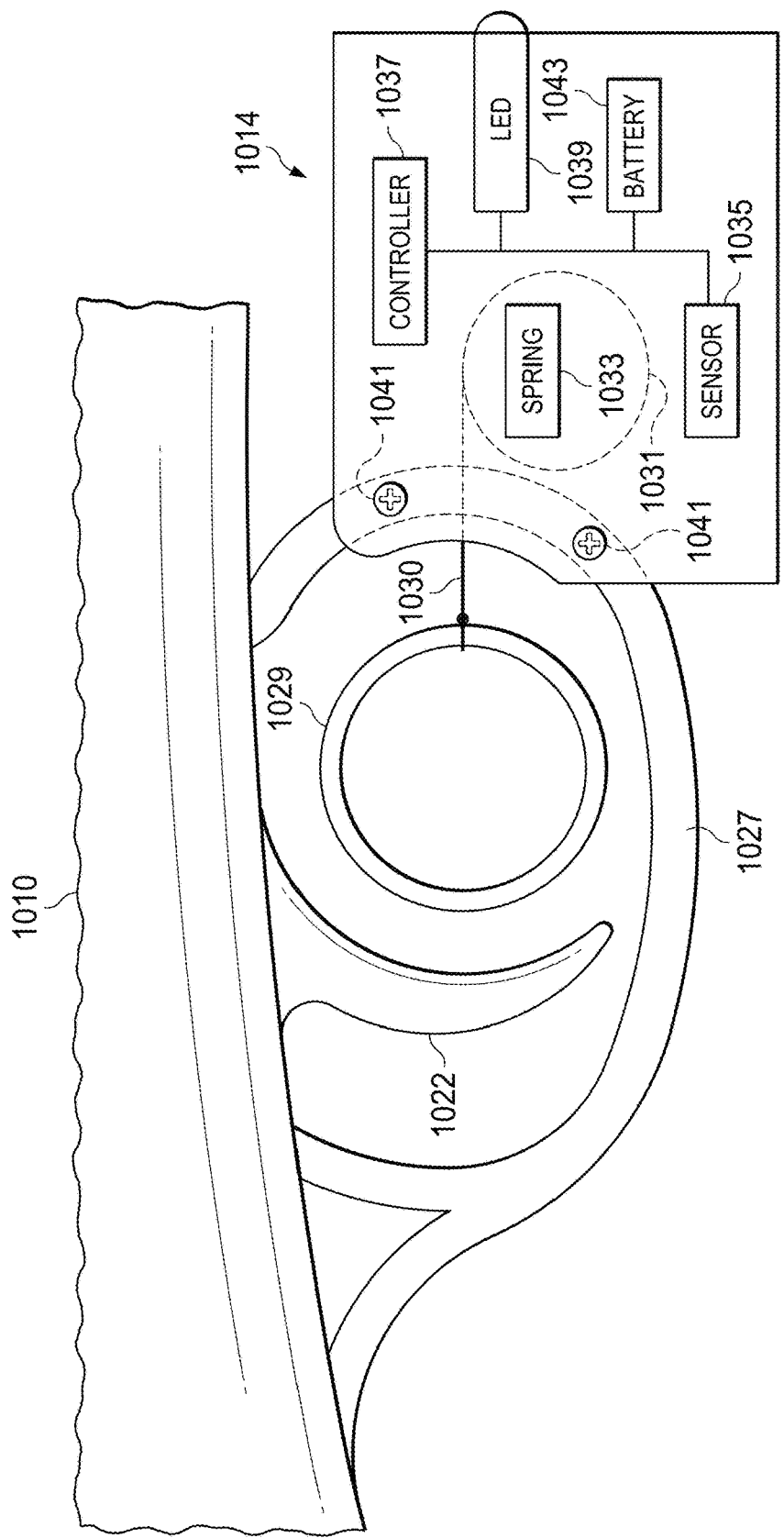
FIG. 10K is a detail view of a trigger sensor of a preferred embodiment.

Referring to FIG. 10K, an alternative embodiment of trigger sensor 1014 is shown. Weapon 1010 includes trigger 1022 and trigger guard 1027. Trigger sensor 1014 is specially shaped and contoured to fit securely to the front of trigger guard 1027. Once trigger sensor 1014 is slid onto trigger guard 1027, screws 1041 are tightened to further secure trigger sensor 1014 to trigger guard 1027 and weapon 1010.

Pull ring 1029 is connected to string 1030, which winds upon spindle 1031. Spindle 1031 includes spring 1033, which keeps tension on string 1030 and biases pull ring 1029 to be pulled away from trigger 1022 and towards trigger guard 1027 and trigger sensor 1014. In the resting state, there is no slack in string 1030 and pull ring 1029 rests against trigger sensor 1014.

Sensor 1035 provides data indicative of the rotation and/or position of spindle 1031. In one preferred embodiment, sensor 1035 is a potentiometer that is connected to and turns with spindle 1031, where a voltage of the potentiometer indicates the position of spindle 1031 and a change in voltage indicates a rotation of spindle 1031. In another preferred embodiment, sensor 1035 includes one or more photo emitters and photo detectors that surround an optical encoder wheel that is attached to spindle 1031, where light from the photo emitters passes through the encoder wheel to activate certain photo detectors to indicate the position of spindle 1031.

Controller 1037 receives data from sensor 1035 to determine the state of trigger sensor 1014 and communicates the state of trigger sensor 1014 by controlling the output of LED 1039 to create a coded signal that corresponds to the state of trigger sensor 1014. In a preferred embodiment, the states of trigger sensor 1014 include: pull ring not engaged, pull ring engaged but trigger not pulled, pull ring engaged and trigger is pulled. Controller 1037, LED 1039, and sensor 1035 are powered by battery 1043.

The state of trigger sensor 1014 is communicated by controlling the output LED 1039 with controller 1037. The output of LED 1039 forms a coded signal to indicate the state of trigger sensor 1014 and can also be used to aid in the determination of the position and orientation of weapon 1010 when the position of trigger sensor 1014 with respect to weapon 1010 and the geometry of weapon 1010 are known. The output of LED 1039 is cycled on and off to flash with a particular phase, frequency, amplitude, and duty cycle that form a set of output characteristics. Different output characteristics are used to indicate different states of trigger sensor 1014. A first set of output characteristics or first code is used to indicate the pull ring not engaged state, a second set of output characteristics or second code is used to indicate the pull ring engaged but trigger not pulled state, and a third set of output characteristics or third code is used to indicate the pull ring engaged and trigger is pulled state. In one embodiment, the pull ring not engaged state is indicated by a set of output characteristics where the duty cycle is 0% and/or the amplitude is 0 so that LED 1039 does not turn on. An external sensor or camera, such as one of position trackers 1205, 1206, and 1215 can be used to determine the state of trigger sensor 1014 by detecting the output from LED 1039 and decoding the output characteristics to determine which state trigger sensor 1014 is in.

In an alternative embodiment, pull ring 1029 and string 1030 each include conductive material, trigger sensor 1014 includes a pull-up resistor connected to an input of controller 1037, and controller 1037 is electrically grounded to trigger guard 1027. When trigger 1022 and trigger guard 1027 are electrically connected and conductive pull ring 1029 is touched to trigger 1022, the pull-up resister is grounded to change the state of the input of controller 1037 so that controller 1037 can determine whether pull ring 1029 is touching trigger 1022. Assuming that the user only touches pull ring 1029 to trigger 1022 when attempting to pull trigger 1022, the determination of whether pull ring 1029 is touching trigger 1022 can be used to indicate that the trigger has been pulled, which is communicated by changing the output coding of LED 1039.

Figure 11A:
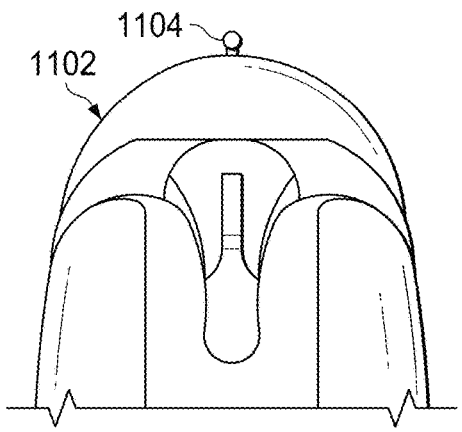
FIG. 11A is a simulation view of a weapon having an iron sight of a preferred embodiment.
Figure 11B:
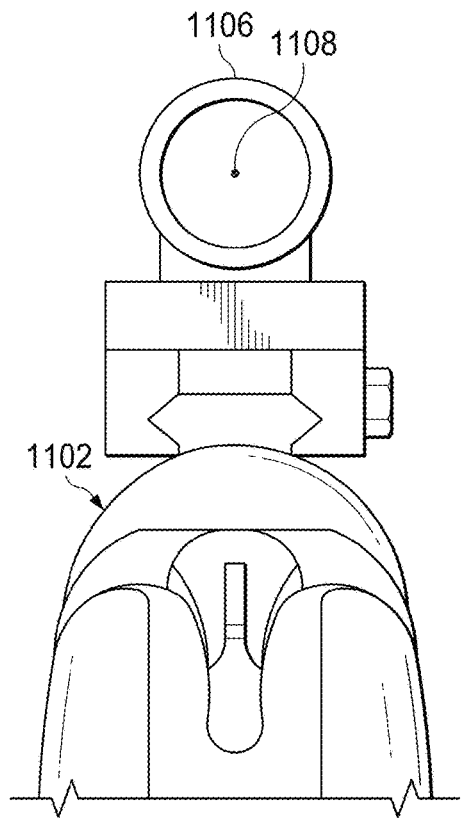
FIG. 11B is a simulation view of a weapon having a reflex sight of a preferred embodiment.
Figure 11C:
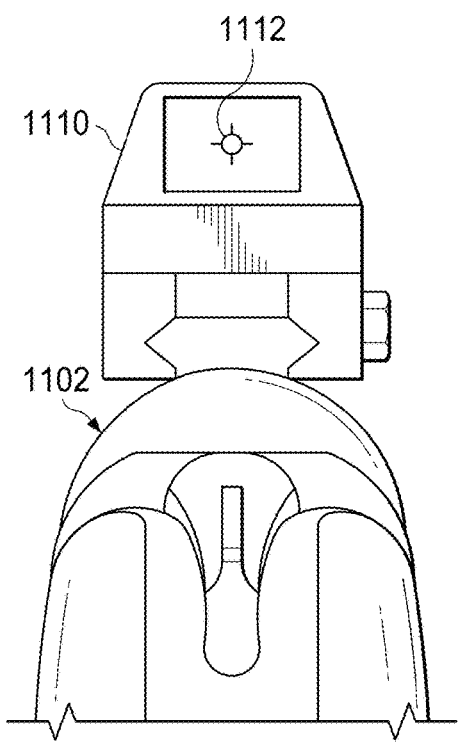
FIG. 11C is a simulation view of a weapon having a holographic sight of a preferred embodiment.

Referring to FIGS. 11A, 11B, and 11C, different types and styles of sights may be used on weapons used with the simulation. Additionally, the simulation may display a sight on a weapon that is different from the sight actually on the weapon to allow different types of sights to be tested. In alternative embodiments, the halo around the phantom target can be adjusted to match or include the sight profile of the sight being used on the weapon.

In FIG. 11A, weapon 1102 includes iron sight 1104. Iron sight 1104 comprises two components, one proximate to the tip of the barrel of weapon 1102 and one distal to the tip of weapon 1102, that when aligned indicate the orientation of weapon 1102 to a user of weapon 1102.

In FIG. 11B, weapon 1102 includes reflex sight 1106, also referred to as a red-dot sight, which may be in addition to an iron sight on weapon 1102. Reflex sight 1106 is mounted on the barrel of weapon 1102 and includes sight profile 1108 shown as a dot. Sight profile 1108 may take any size, shape, color, or geometry and may include additional dots, lines, curves, and shapes of one or more colors. A user can only see the sight profile 1108 when the head of the user is properly positioned with respect to reflex sight 1106.

In FIG. 11C, weapon 1102 includes holographic sight 1110, which may be in addition to an iron sight. Holographic sight 1110 is mounted to the receiver of weapon 1102 and includes sight profile 1112 shown as a combination circle with dashes. Sight profile 1112 may take any size, shape, color, or geometry and may include additional dots, lines, curves, and shapes of one or more colors. A user can only see the sight profile 1112 when the head of the user is properly positioned with respect to holographic sight 1110.

Figure 12:
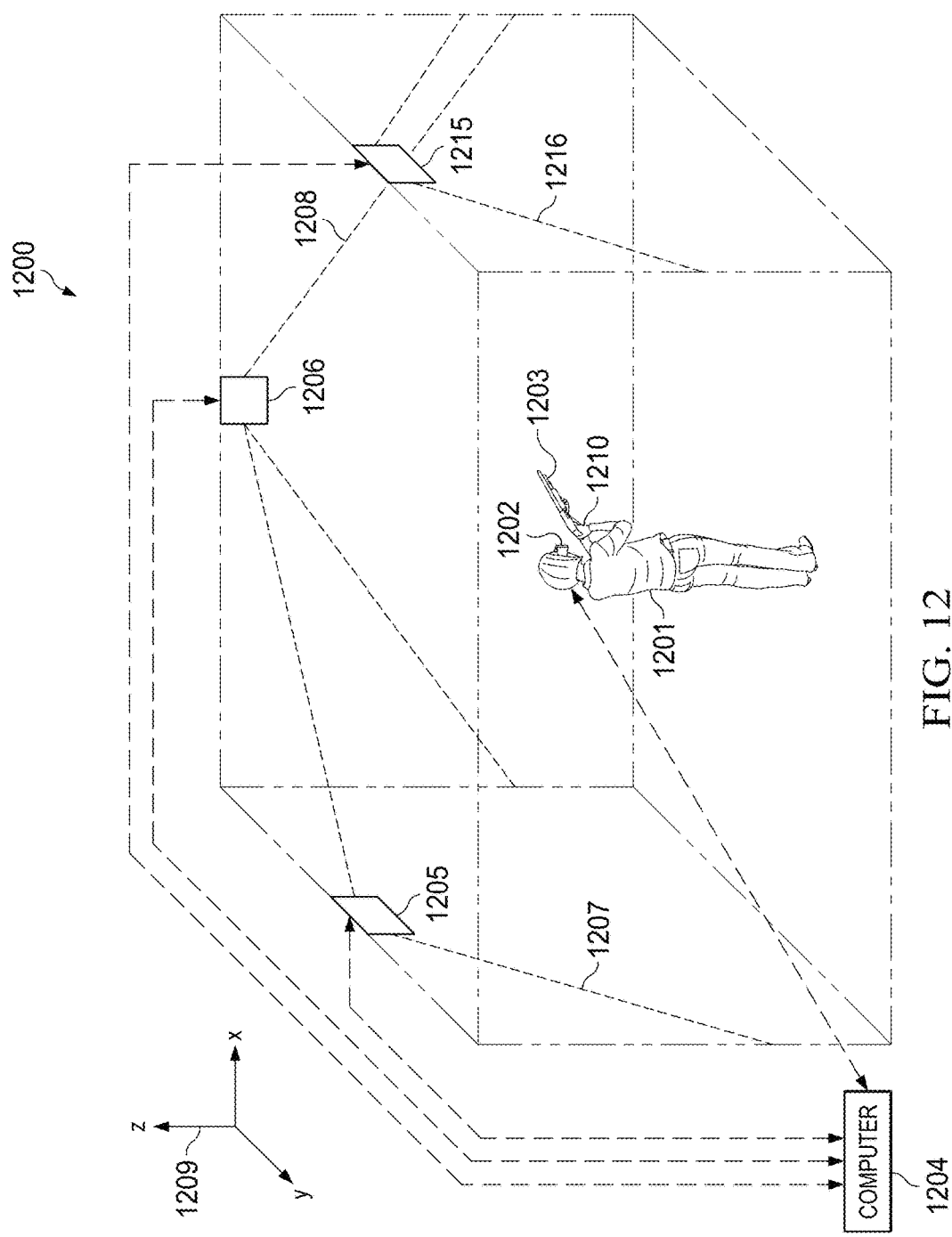
FIG. 12 is a schematic view of a virtual reality simulation environment of a preferred embodiment.

Referring to FIG. 12, in simulation environment 1200, user 1201 wears user device 1202 connected to computer 1204 and holds weapon 1203. Each of position trackers 1205, 1206, and 1215 is connected to computer 1204. Position tracker 1205 has field of view 1207. Position tracker 1206 has field of view 1208. Position tracker 1215 has field of view 1216. User 1201 is positioned in fields of view 1207, 1208, and 1216.

In one embodiment, weapon 1203 is a simulated weapon. In another embodiment, weapon 1203 is a real weapon with a simulation attachment. In another embodiment, weapon 1203 is a real weapon and user 1201 wears a set of tracking gloves 1210. In other embodiments, user 1201 wears the set of tracking gloves 1210 and uses the simulated weapon or the real weapon with the simulation attachment.

In a preferred embodiment, each of position trackers 1205, 1206, and 1215 is a near infrared CMOS sensor having a refresh rate of 60 Hz. Other suitable position trackers known in the art may be employed. For example, position trackers 1205, 1206, and 1215 can be embodiments of base 1028 of FIG. 10E.

In a preferred embodiment, position trackers 1205, 1206, and 1215 capture the vertical and horizontal positions of user device 1202, weapon 1203 and/or set of gloves 1210. For example, position tracker 1205 captures the positions and movement of user device 1202 and weapon 1203, and/or set of gloves 1210 in the y-z plane of coordinate system 1209 and position tracker 1206 captures the positions and movement of user device 1202 and weapon 1203 and/or set of gloves 1210 in the x-z plane of coordinate system 1209. Further, a horizontal angle and an inclination angle of the weapon are tracked by analyzing image data from position trackers 1205, 1206, and 1215. Since the horizontal angle and the inclination angle are sufficient to describe the aim point of the weapon, the aim point of the weapon is tracked in time.

In a preferred embodiment, computer 1204 generates the set of target data includes a target launch position, a target launch angle, and a target launch velocity of the generated target. Computer 1204 retrieves a set of weapon data based on a desired weapon, including a weapon type e.g., a shotgun, a rifle, or a handgun, a set of weapon dimensions, a weapon caliber or gauge, a shot type including a load, a caliber, a pellet size, and shot mass, a barrel length, a choke type, and a muzzle velocity. Other weapon data may be employed. Computer 1204 further retrieves a set of environmental data that includes temperature, amount of daylight, amount of clouds, altitude, wind velocity, wind direction, precipitation type, precipitation amount, humidity, and barometric pressure for desired environmental conditions. Other types of environmental data may be employed.

Position trackers 1205, 1206, and 1215 capture a set of position image data of user device 1202, weapon 1203 and/or set of gloves 1210 and the set of images is sent to computer 1204. Sensors in user device 1202, weapon 1203 and/or set of gloves 1210 detect a set of orientation data and sends the set of orientation data to computer 1204. Computer 1204 then calculates a generated target flight path for the generated target based on the set of target data, the set of environment data, and the position and orientation of the user device 1202. The position and orientation of the user device 1202, the weapon 1203 and/or set of gloves 1210 are determined from the set of position image data and the set of orientation data. Computer 1204 generates a phantom target and a phantom halo based on the generated target flight path and transmits the phantom target and the phantom halo to user device 1202 for viewing by user 1201. User 1201 aims weapon 1203 at the phantom target and the phantom halo to attempt to hit the generated target. Computer 1204 detects a trigger pull on weapon 1203 by a trigger sensor and/or a finger sensor and determines a hit or a miss of the generated target based on the timing of the trigger pull, the set of weapon data, the position and orientation of user device 1202, weapon 1203, and/or set of gloves 1210, the phantom target, and the phantom halo.

In an alternative embodiment, the set of gloves is replaced by a thimble worn on the trigger finger of the shooter and a simulation attachment on the weapon. The simulation attachment on the weapon indicates the position and direction of the weapon and the trigger finger thimble is used to indicate when the trigger is pulled. The positions of the simulation attachment and the thimble are tracked by position trackers 1205, 1206, and 1215. When the user provides a "pull" command, such as by vocalizing the word "pull" that is picked up via voice recognition, the system launches a target and arms the trigger finger thimble, so that when sufficient movement of the thimble relative to the weapon is detected, the system will identify the trigger as being pulled and fire the weapon in the simulation. When the thimble is not armed, movement of the thimble with respect to the weapon is not used to identify if the trigger has been pulled.

When weapon 1203 is loaded with live or blank rounds of ammunition, the discharge of the live or blank rounds of ammunition are detected by one or more sensors, such as a microphone, of user device 1202. When the discharge of a live or blank round of ammunition is detected and weapon 1203 is a multi-shot weapon that includes a receiver that cycles between shots, the simulation displays the cycling of the receiver after the discharge of the live or blank round of ammunition is detected. When weapon 1203 is a revolver, the simulation displays the rotation of the cylinder. When the system detects the discharge of a number of rounds of live or blank ammunition that is equal to the maximum number of rounds that can be stored in weapon 1203, the system provides an indication to the user, via user device 1202, that it is time to reload weapon 1203.

Figure 13:
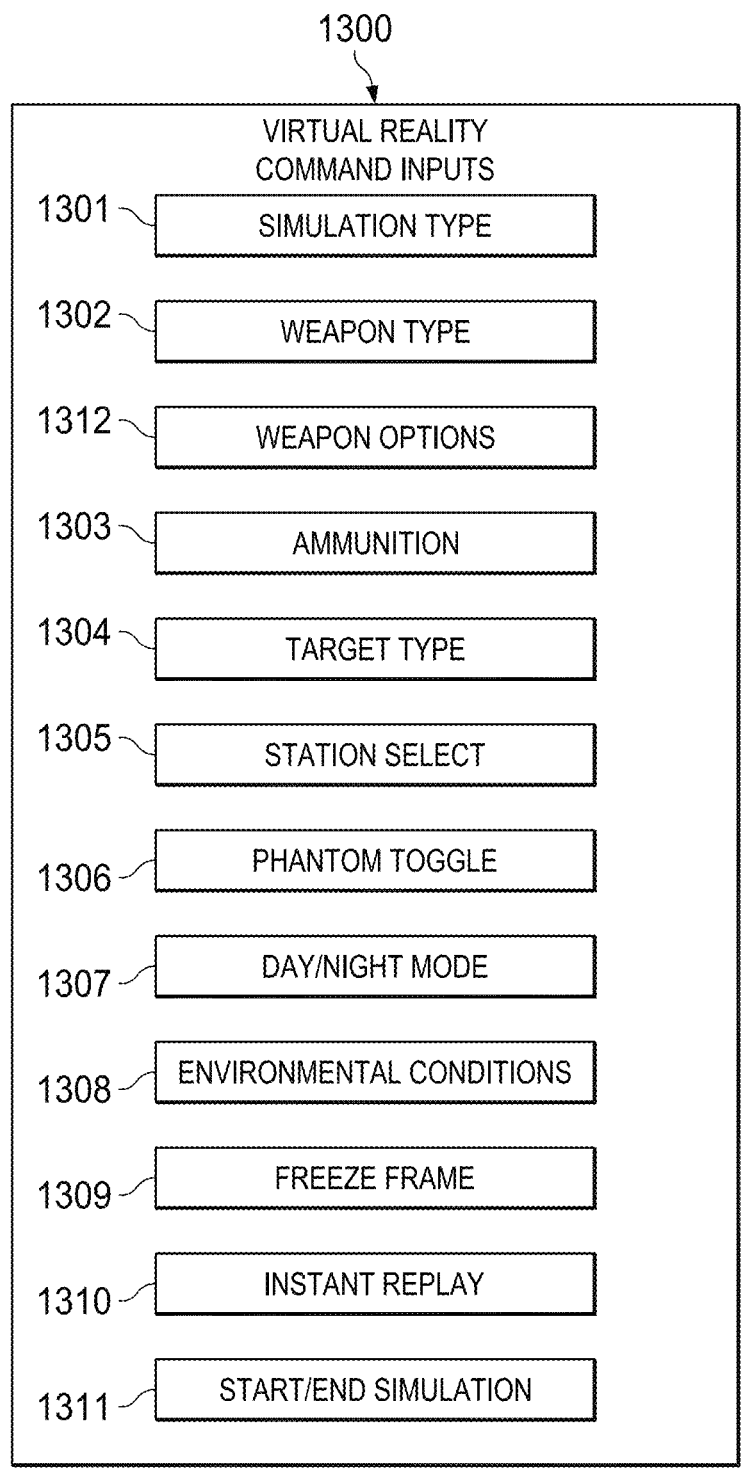
FIG. 13 is a command input menu for a virtual reality simulator system of a preferred embodiment.

Referring to FIG. 13, command menu 1300 includes simulation type 1301, weapon type 1302, weapon options 1312, ammunition 1303, target type 1304, station select 1305, phantom toggle 1306, day/night mode 1307, environmental conditions 1308, freeze frame 1309, instant replay 1310, and start/end simulation 1311. Simulation type 1301 enables a user to select different types of simulations. For example, the simulation type includes skeet shooting, trap shooting, sporting clays, and hunting. Weapon type 1302 enables the user to choose from different weapon types and sizes. Weapon types include shot guns, rifles, handguns, airsoft weapons, air guns, and so on. Weapon sizes include the different calibers or gauges for the weapon's type. The user further enters a weapon sensor location, for example, in the muzzle or on a rail, and whether the user is right or left handed. Weapon options 1312 enables the user to select different weapon options relating the weapon selected via weapon type 1302. Weapon options 1312 include optional accessories that can be mounted to the weapon, such as tactical lights, laser aiming modules, forward hand grips, telescopic sights, reflex sights, red-dot sights, iron sights, holographic sights, bipods, bayonets, and so on, including iron sight 1104, reflex sight 1106, and holographic sight 1110 of FIG. 11. Weapon options 1312 also include one or more beams to be simulated with the weapon, such as beams 1906, 1912, 1916, 1920, 1924, 1928, 1932, and 1936 of FIG. 19, which show an approximated trajectory of a shot and are optionally adjusted for one or more of windage and gravity. Ammunition 1303 enables the user to select different types of ammunition for the selected weapon type. Target type 1304 enables the user to select different types of targets for the simulation, including clay targets, birds, rabbits, drones, helicopters, airplanes, and so on. Each type of target includes a target size, a target color, and a target shape. Station select 1305 enables the user to choose different stations to shoot from, for example, in a trap shooting range, a skeet shooting range, a sporting clays course, or a field. The user further selects a number of shot sequences for the station select. In a preferred embodiment, the number of shot sequences in the set of shot sequences is determined by the type of shooting range used and the number of target flight path variations to be generated. For example, the representative number of shot sequences for a skeet shooting range is at least eight, one shot sequence per station. More than one shot per station may be utilized.

In a preferred embodiment, each simulation type 1301 is associated with one or more animated virtual reality shooting scenarios. As one example, when simulation type 1301 is hunting, the animated virtual reality shooting scenario includes a scenario for learning how to shoot over dogs. The shooting over dogs scenario displays an animated dog going on point as a part of the hunt in the simulation so that the user can learn to shoot the target and avoid shooting the dog.

Phantom toggle 1306 allows a user to select whether to display a phantom target and a phantom halo during the simulation. The user further selects a phantom color, a phantom brightness level, and a phantom transparency level.

In certain embodiments, phantom toggle 1306 includes additional help options that adjust the amount of "help" given to the user based on how well the user is doing, such as with aim sensitive help and with dynamic help. When aim sensitive help is selected, aim sensitive help is provided that adjusts one or more of the transparency, color, and size of one or more beams from weapon options 1312, phantom targets, and halos based on how close the aim point of the weapon is to a phantom target. With aim sensitive help, the beams, phantom targets, and halos are displayed with less transparency, brighter colors, and larger sizes the further off-target the aim point of the weapon is. Conversely, the beams, phantom targets, and halos are displayed with more transparency, darker colors, and smaller sizes when the weapon is closer to being aimed on-target.

When dynamic help is selected, the amount of help provided to the user for each shot is adjusted dynamically based on how well the user is performing with respect to one or more of each shot, each round, and the simulation overall. When more help is provided, beams, phantom targets, and halos are given more conspicuous characteristics and, conversely, when less help is provided, the beams, phantom targets, and halos are shown more passively or not at all. The amount of help is dynamic in that when the previous one or more shots hit the target, a lesser amount of help is provided on the next one or more shots and, conversely, when the previous one or more shots did not hit the target, more help is provided for the subsequent one or more shots. As the user's skill level advances, the brightness of the phantom target can diminish until it is transparent—the user has learned correct lead by rote repetition and no longer needs the phantom as a visual aide.

Day/night mode 1307 enables the user to switch the environment between daytime and nighttime. Environmental conditions 1308 enables the user to select different simulation environmental conditions including temperature, amount of daylight, amount of clouds, altitude, wind velocity, wind direction, precipitation type, precipitation amount, humidity, and barometric pressure. Other types of environmental data may be employed. Freeze frame 1309 allows the user to "pause" the simulation. Instant replay 1310 enables the user replay the last shot sequence including the shot attempt by the user. Start/end simulation 1311 enables the user to start or end the simulation. In one embodiment, selection of 1301, 1302, 1312, 1303, 1304, 1305, 1306, 1307, 1308, 1309, 1310, and 1311 is accomplished via voice controls. In another embodiment, selection of 1301, 1302, 1312, 1303, 1304, 1305, 1306, 1307, 1308, 1309, 1310, and 1311 is accomplished via a set of controls on a simulated weapon as previously described.

Figure 14:
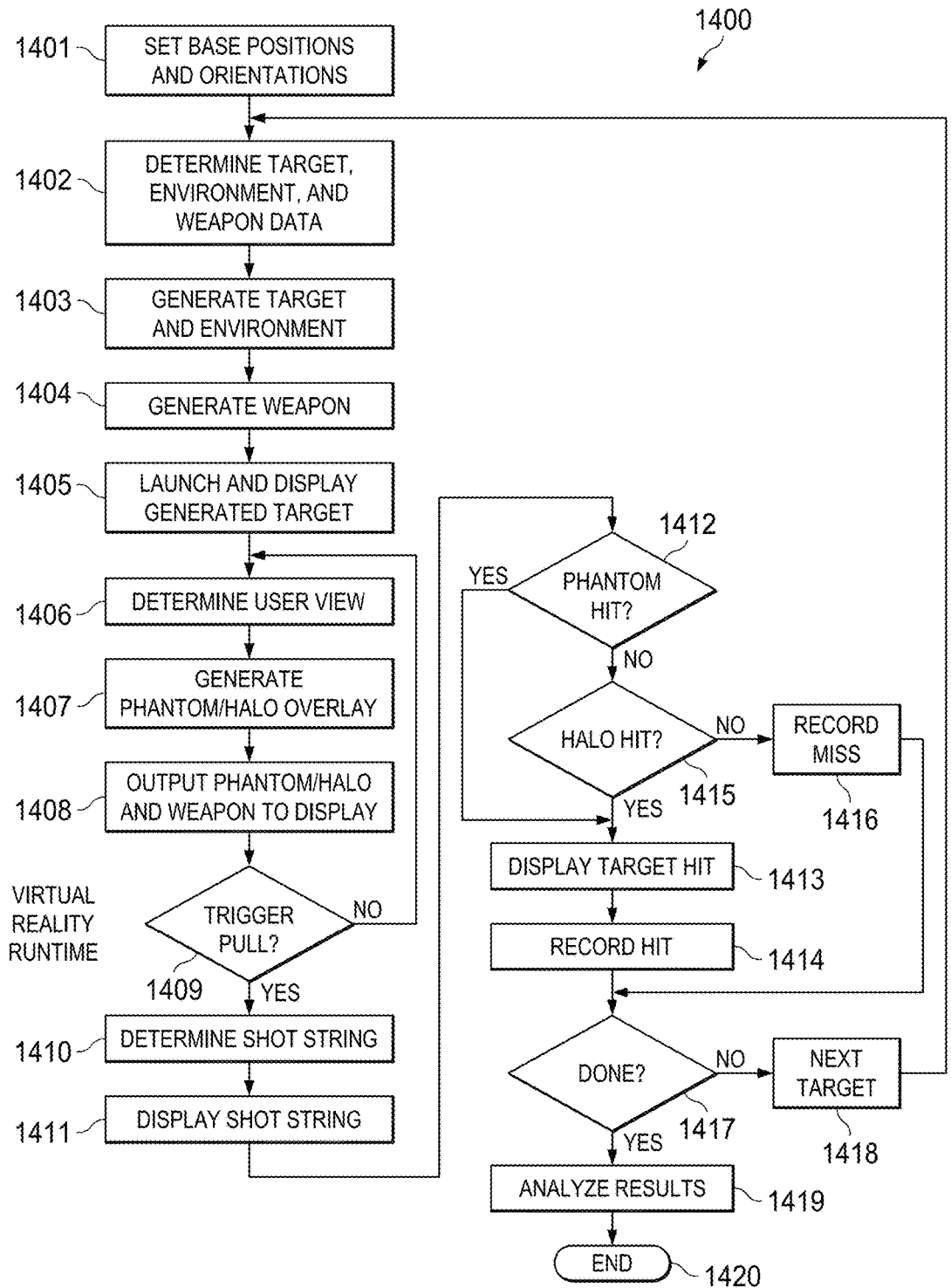
FIG. 14 is a flow chart of a method for runtime process of a virtual reality simulation system of a preferred embodiment.

Referring to FIG. 14, runtime method 1400 for a target simulation will be described. At step 1401, a baseline position and orientation of the user device and a baseline position and orientation of the weapon are set. In this step, the computer retrieves a set of position image data from a set of position trackers, a set of orientation data from a set of sensors in the user device, the weapon and/or a set of gloves and saves the current position and orientation of the user device and the weapon into memory. Based on the simulation choice, the virtual position of the launcher relative to the position and orientation of the user device is also set. If the user device is oriented toward the virtual location of the launcher, a virtual image of the launcher will be displayed. At step 1402, a set of target flight data, a set of environment data, and a set of weapon data are determined from a set of environment sensors and a database.

In a preferred embodiment, the set of weapon data is downloaded and saved into the database based on the type of weapon that is in use and the weapon options selected to be used with the weapon. In a preferred embodiment, the set of weapon data includes a weapon type e.g., a shotgun, a rifle, or a handgun, a weapon caliber or gauge, a shot type including a load, a caliber, a pellet size, and shot mass, a barrel length, a choke type, and a muzzle velocity. Other weapon data may be employed. In a preferred embodiment, the weapon options include one or more accessories and beams, including iron sight 1104, reflex sight 1106, and holographic sight 1110 of FIG. 11, and including beams 1906, 1912, 1916, 1920, 1924, 1928, 1932, and 1936 of FIG. 19.

In a preferred embodiment, the set of environment data is retrieved from the database and includes a wind velocity, an air temperature, an altitude, a relative air humidity, and an outdoor illuminance. Other types of environmental data may be employed.

In a preferred embodiment, the set of target flight data is retrieved from the database based on the type of target in use. In a preferred embodiment, the set of target flight data includes a launch angle of the target, an initial velocity of the target, a mass of the target, a target flight time, a drag force, a lift force, a shape of the target, a color of the target, and a target brightness level. In alternative embodiments, the target is a self-propelled flying object, such as a bird or drone, which traverses the simulated environment at a constant air speed.

At step 1403, the target and environment are generated from the set of target flight data and the set of environmental data. At step 1404, a virtual weapon image that includes the selected weapon options is generated and saved in memory. In this step, images and the set of weapon data of the selected weapon and the selected weapon options for the simulation is retrieved from the database. At step 1405, the target is launched and the target and environment are displayed in the user device. In a preferred embodiment, a marksman will initiate the launch with a voice command such as "pull."

At step 1406, a view of the user device with respect to a virtual target launched is determined, as will be further described below.

At step 1407, a phantom target and a phantom halo are generated based on a target path and the position and orientation of the user, as will be further described below. The target path is determined from the target position the target velocity using Eqs. 1-4. At step 1408, the generated phantom target and the generated phantom halo are sent to the user device and displayed, if the user device is oriented toward the target path. The generated weapon is displayed with the selected weapon options if the user device is oriented toward the position of the virtual weapon or the selected weapon options.

At step 1409, whether the trigger on the weapon has been pulled is determined from a set of weapon sensors and/or a set of glove sensors. In one preferred embodiment with the trigger sensor of FIG. 10K, the determination of whether the trigger is pulled is made responsive to detecting one of the codes that correspond to the state of trigger sensor 1014 from the output of LED 1039 by a sensor, such as one of position trackers 1205, 1206, and 1215 of FIG. 12.

If the trigger has not been pulled, then method 1400 returns to step 1405. If the trigger has been pulled, then method 1400 proceeds to step 1410.

At step 1410, a shot string is determined. In this step, a set of position trackers capture a set of weapon position images. In this step, a set of weapon position data is received from a set of weapon sensors. The shot string is calculated by:

$$A_{shot\ string} = \pi R_{string}^2 \qquad \text{Eq. 7}$$

$$R_{string} = R_{initial} + v_{spread}t \qquad \text{Eq. 8}$$

where $A_{shot\ string}$ is the area of the shot string, $R_{string}$ is the radius of the shot string, $R_{initial}$ is the radius of the shot as it leaves the weapon, $v_{spread}$ is the rate at which the shot spreads, and t is the time it takes for the shot to travel from the weapon to the target. An aim point of the weapon is determined from the set of weapon position images and the set of weapon position data. A shot string position is determined from the position of the weapon at the time of firing and the area of the shot string.

At step 1411, if the user device is oriented along the muzzle of the weapon, the shot string is displayed on the user device at the shot string position. Separately, a gunshot sound is played and weapon action is displayed. Weapon action is based on the type of the weapon and includes the display of mechanical movements of the weapon, such as the movement of a semi-automatic receiver and the strike of a hammer of the weapon.

At step 1412, whether the phantom target has been "hit" is determined. The simulation system determines the position of the shot string, as previously described. The simulation system compares the position of the shot string to the position of the phantom target. The shot string is optionally displayed as an elongated cloud of any color that moves from the tip of the user device towards the shot location, which, ideally, is the target and provides visual feedback to the user of the path taken by the shot string. When the elongated cloud is close to the user device shortly after firing, the diameter of the elongated cloud is about one inch. When the elongated cloud is close to the target, about twenty five yards away from the user, the diameter of the cloud has expanded linearly to about twenty five inches.

If the position of the shot string overlaps the position of the phantom target, then the phantom target is "hit." If the position of the shot string does not overlap the phantom target, then the phantom target is "missed."

If the phantom target is hit and the user device is oriented toward the hit location, then method 1400 displays an animation of the target being destroyed on the user device at the appropriate coordinates and plays a sound of the target being destroyed at step 1413. At step 1414, the simulation system records a "hit" in the database.

If a "miss" is determined at step 1412, then method 1400 proceeds to step 1415. At step 1415, whether the phantom halo is hit is determined. In this step, whether the shot string overlaps an area of the phantom halo by a percentage greater than or equal to a predetermined percentage is determined. For example, the predetermined percentage is 50%. Whether the shot string overlaps at least 50% of the area of the phantom halo is determined. Any predetermined percentage may be employed.

If the position of the shot string overlaps the phantom halo by a percentage greater than or equal to the predetermined percentage, then a "hit" is determined and method 1400 proceeds to step 1413, where the target hit is displayed.

If at step 1415, the shot string does not overlap the area of the phantom halo by a percentage greater than or equal to the predetermined percentage, then a "miss" is determined and the simulation system records a "miss" in the database at step 1416.

The number of targets that are hit, the number of targets that are missed, the location of each shot with respect to the phantom target, and the location of the shot string with respect to the trajectory of the target are generated to form tracking data. The tracking data is analyzed to provide insights and suggested adjustments for how to improve the user's performance with the simulation system.

At step 1417, whether an end command has been received to complete the simulation is determined. If not received, then method 1400 advances to the next target at step 1418.

If an end command has been received and the simulation is complete, then a trend of shot attempts is analyzed at step 1419 by retrieving a number of "hits" in the set of shot sequences and a number of "misses" in the set of shot sequences from the database. In this step, a shot improvement is determined by evaluating the number of hits in the set of shot sequences and the number of misses in the set of shot sequences. Method 1400 ends at step 1420.

Figure 15A:
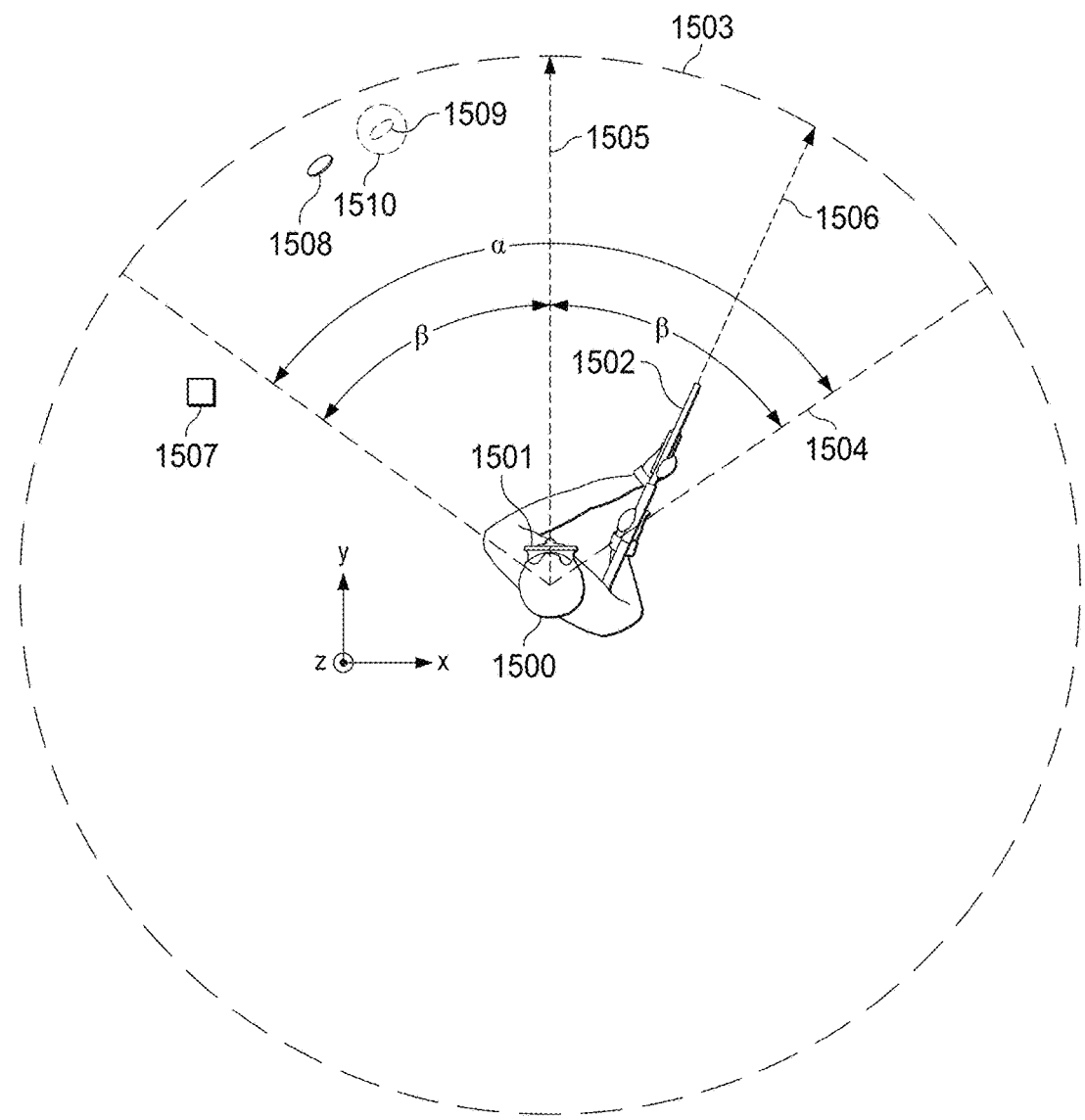
FIG. 15A is top view of a user and a simulation environment of a preferred embodiment.

Referring to FIG. 15A, user 1500 wears user device 1501 and holds weapon 1502 in simulation environment 1503. Simulation environment 1503 is a virtual sphere spanning 360° in all directions surrounding user 1500. User device 1501 has field of view 1504. Field of view 1504 is a cone that has angular range α and spans an arcuate portion (in two dimensions) or a sectorial portion (in three dimensions) of simulation environment 1503. User device orientation vector 1505 bisects field of view 1504 and angular range α into equal angles β. Weapon 1502 has weapon orientation vector 1506. Each of user device orientation vector 1505 and weapon orientation vector 1506 is independent of each other. The positions of user device 1501, weapon 1502, user device orientation vector 1505, and weapon orientation vector have Cartesian x,y,z coordinates. Simulation environment 1503 has spherical coordinates. Simulation environment 1503 includes virtual target launcher 1507, virtual target 1508, phantom target 1509 and phantom halo 1510. As can be seen, weapon 1502, virtual target 1508, phantom target 1509, and phantom halo 1510 are in field of view 1504 of user device 1501. Virtual target launcher 1507 is not in field of view 1504 of user device 1501. Weapon 1502, virtual target 1508, phantom target 1509 and phantom halo 1510 will be displayed in user device 1501 and virtual target launcher 1507 will not be displayed in user device 1501.

In a preferred embodiment, angular range α is approximately 110° and each of equal angles β is approximately 55°. Other angular ranges may be employed.

Figure 15B:
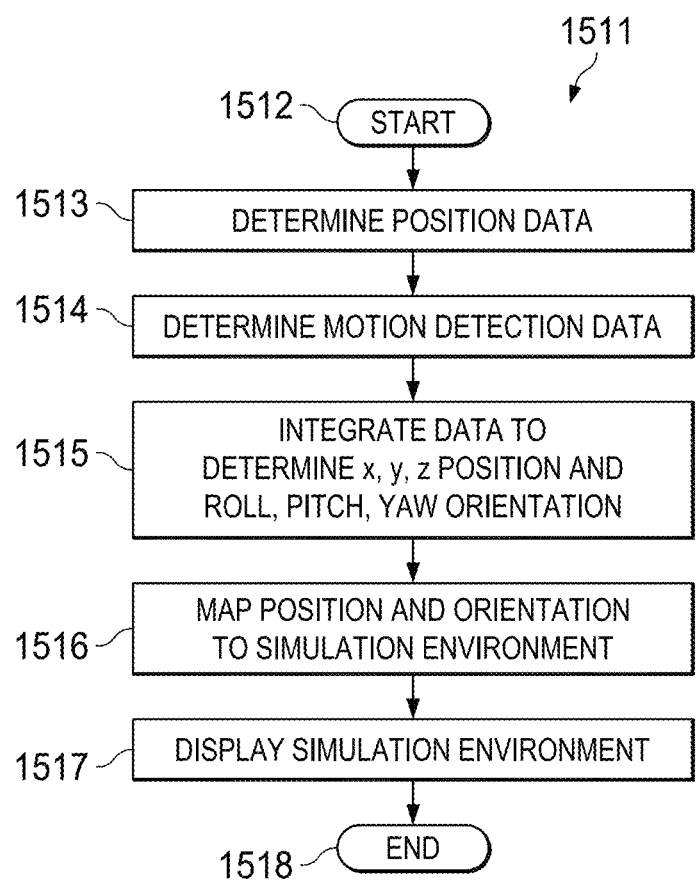
FIG. 15B is a flow chart of a method for determining a view for a user device with respect to a position and an orientation of the user device and the weapon.

Referring to FIG. 15B, step 1406 will be further described as method 1511 for determining a view for a user device with respect to a position and an orientation of the user device and the weapon. Method 1511 begins at step 1512. At step 1513, a set of current position image data is retrieved from a set of position trackers and a set of current position and orientation data is retrieved from the user device and the weapon and/or set of gloves. At step 1514, a set of motion detection data is received from a set of sensors in the user device to determine movement of the user device and from the weapon and/or set of gloves to determine movement of the weapon. At step 1515, the set of motion detection data and the position of the user device and the weapon and/or set of gloves are combined to determine an x, y, z position of the user device and the weapon and a roll, pitch, and yaw or detection of the user device and the weapon. The current x, y, z orientation vectors for the user device and the weapon are calculated from the difference between the baseline position and orientation and the current position and orientation of the user device and the weapon. The set of motion detection data received is the roll, pitch, and yaw orientation movement of the head of the user and the weapon. At step 1516, the current positions and orientation vectors of the user device and the weapon are mapped to the simulation environment. In a preferred embodiment, the current positions and orientation vectors are a 1:1 ratio to the positions and orientation vectors in the simulation environment. For example, for every inch and/or degree that the user device and/or the weapon moves and/or rotates, the view of the user and/or the simulated weapon moves one inch and/or rotates one degree in the simulated environment. Other ratios may be employed. The mapping determines the display view, as will be further described below. At step 1517, the simulation environment that would be visible to the user based on the orientation of the user device and the weapon is displayed. Method 1500 ends at step 1518.

Figure 15C:
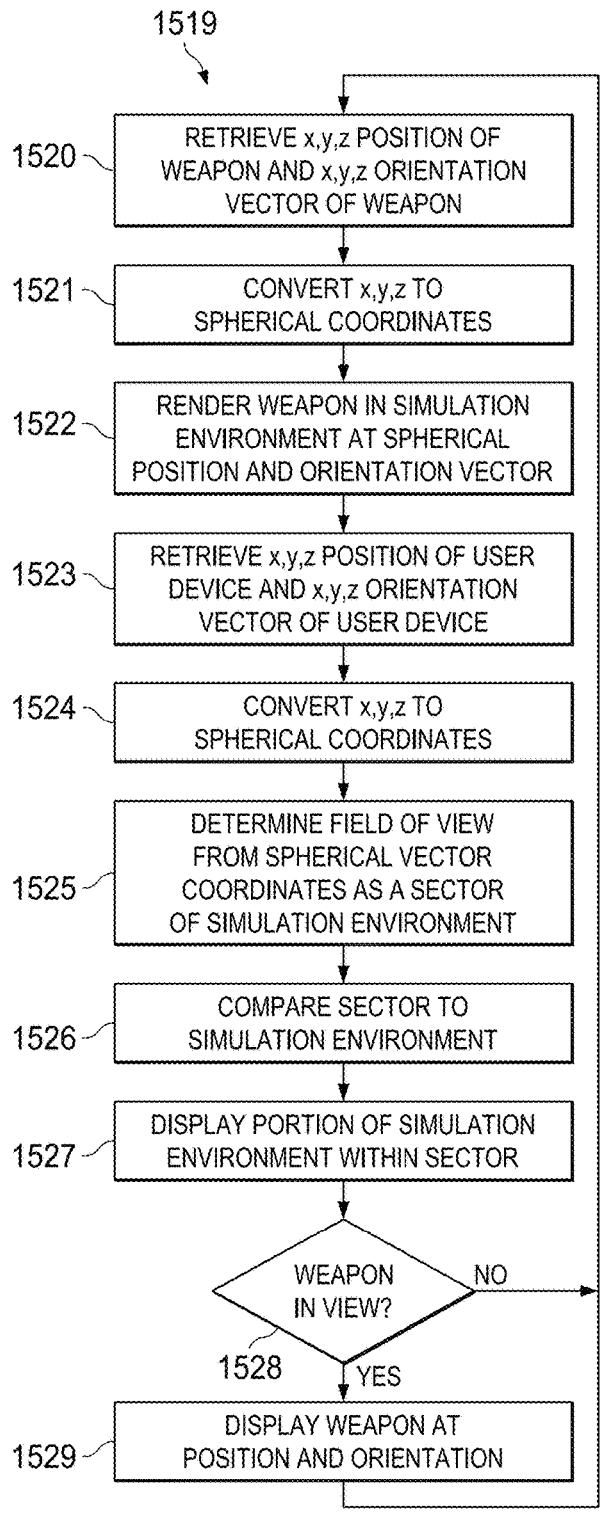
FIG. 15C is a flow chart of a method for mapping the position and orientation of the user device and the weapon to the simulation environment for determining a display field of view a preferred embodiment.

Referring to FIG. 15C, step 1516 will be further described as method 1519 for mapping the position and orientation of the user device and the weapon to the simulation environment for determining a display field of view. At step 1520, the x, y, z positions of the weapon and the weapon orientation vector are retrieved. At step 1521, the x, y, z positions of the weapon and the weapon orientation vector are converted to spherical coordinates (r, θ, φ) using:

$$r = \sqrt{x^2 + y^2 + z^2} \qquad \text{Eq. 9}$$

$$\theta = \arccos\left(\frac{z}{\sqrt{x^2 + y^2 + z^2}}\right) \qquad \text{Eq. 10}$$

$$\varphi = \arctan\left(\frac{y}{x}\right) \qquad \text{Eq. 11}$$

At step 1522, the weapon is rendered in the simulation environment at the spherical position and orientation vector. At step 1523, the x, y, z positions of the user device and the user device orientation vector are retrieved. At step 1524, the x, y, z positions of the user device and the user device orientation vector are converted to spherical coordinates (r, θ, φ) using Eqs. 9, 10, and 11. At step 1525, the display field of view is determined from the spherical orientation vector coordinates. In this step, equal angles β are measured from the user device orientation vector to define the display field of view as a sector of the simulation environment in spherical coordinates. At step 1526, the field of view sector is compared to the simulation environment to determine a portion of the simulation environment within the field of view sector. At step 1527, the portion of the simulation environment within the field of view sector is displayed on the user device as the display field of view. At step 1528, the spherical position and orientation vector of the weapon is compared to the field of view sector to determine whether the weapon is in the display field of view. If the weapon is not in the display field of view, then method 1519 returns to step 1520. If the weapon is in the display field of view, then at step 1529, the weapon is displayed on the user device at the spherical position and orientation. Method 1519 then returns to step 1520.

Figure 16A:
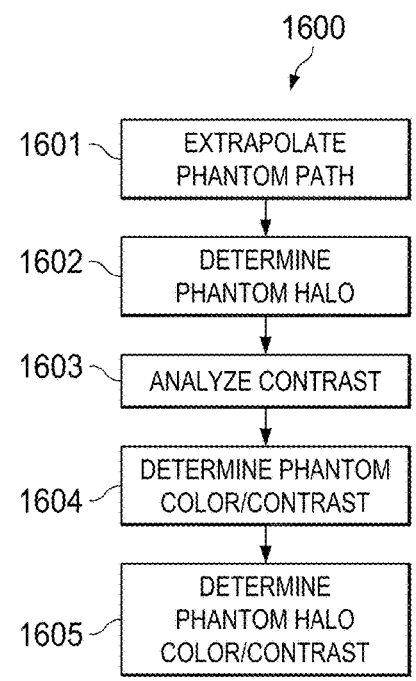
FIG. 16A is a flowchart of a method for determining a phantom and halo of a preferred embodiment.
Figure 16B:
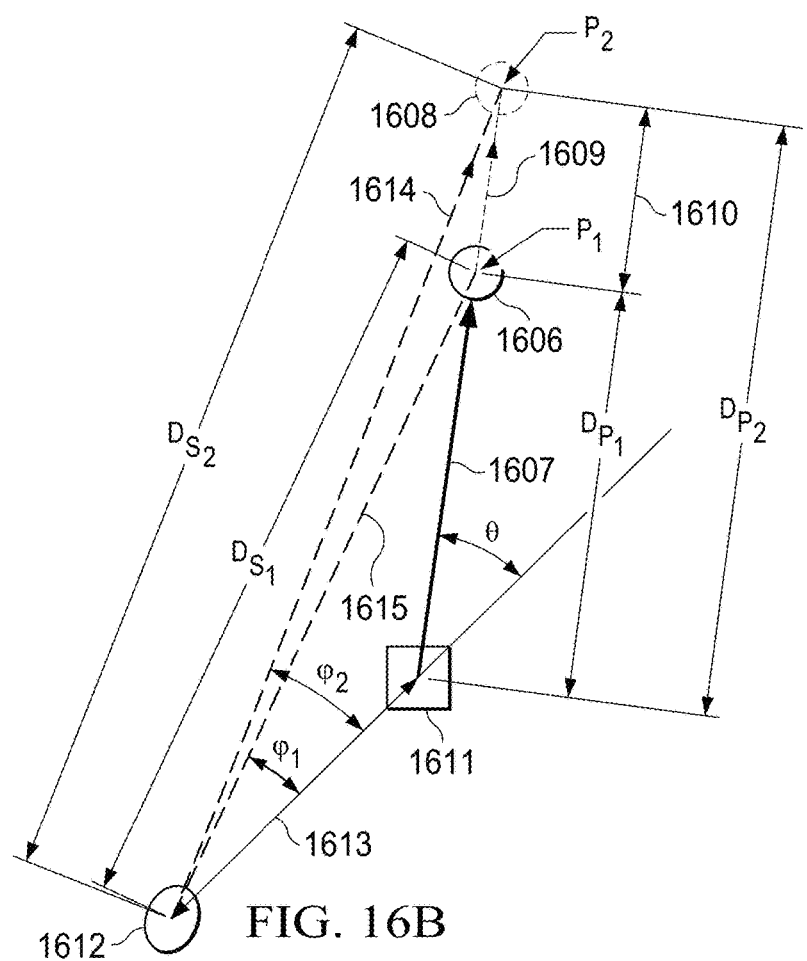
FIG. 16B is a plan view of a target and a phantom of a preferred embodiment.
Figure 16C:
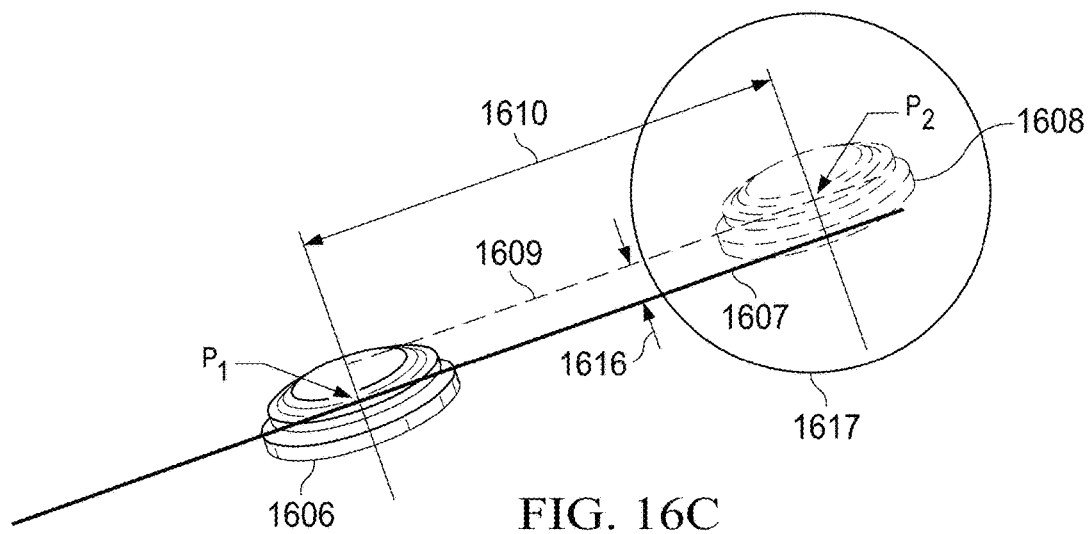
FIG. 16C is an isometric view of a target and a phantom of a preferred embodiment.

Referring to FIG. 16A, step 1407 will be further described as method 1600 for generating a phantom target and a phantom halo. At step 1601, a phantom path is extrapolated. Referring to FIGS. 16B and 16C, target 1606 is launched from launch point 1611 and moves along target path 1607 at position $P_1$. Phantom target 1608 moves along phantom path 1609 ahead of target 1606 at position $P_2$. Position $P_2$ is lead distance 1610 and drop distance 1616 from position $P_1$. Phantom path 1609 varies as target 1606 and target path 1607 varies, thereby varying lead distance 1610. Marksman 1612 is positioned at distance 1613 from launch point 1611. Marksman 1612 aims at phantom target 1608 and shoots along shot path 1614 to intercept target 1606. Target path 1607 is extrapolated over time using the set of target flight data. Target path 1607 is calculated using Eqs. 1-4.

Referring to FIG. 16B, lead distance 1610 is calculated using target path 1607, the relative marksman location, and the set of weapon data.

$$D_{P_2} \approx \frac{D_{S_2} \tan \varphi_2}{\cos \theta \tan \varphi_2 - \sin \theta} \qquad \text{Eq. 12}$$

$$D_{P_1} \approx \frac{D_{S_1} \tan \varphi_1}{\cos \theta \tan \varphi_1 - \sin \theta} \qquad \text{Eq. 13}$$

where $D_{P_2}$ is the distance of phantom target 1608 at position $P_2$ from launch point 1611, $D_{S_2}$ is the distance from marksman 1612 to phantom target 1608 along shot path 1614, $\varphi_2$ is the angle between shot path 1614 and distance 1613, θ is the launch angle between target path 1607 and distance 1613, $D_{P_1}$ is the distance of target 1606 at position $P_1$ from launch point 1611, $D_{S_1}$ is the distance from marksman 1612 to target 1606 along shot path 1615, $\varphi_1$ is the angle between shot path 1615 and distance 1613, θ is the launch angle between target path 1607 and distance 1613. Lead distance 1610 is:

$$D_{Lead} \approx D_{P_2} - D_{P_1} \qquad \text{Eq. 14}$$

$$D_{Lead} \approx \frac{A \Delta D_S \tan C \Delta \varphi}{\cos B\theta \tan C \Delta \varphi - \sin B\theta} \qquad \text{Eq. 15}$$

where $D_{Lead}$ is lead distance 1610, $\Delta D_S$ is the difference between the distances of shot paths 1614 and 1615, $\Delta \varphi$ is the difference between angles $\varphi_2$ and $\varphi_1$, θ is the launch angle between target path 1607 and distance 1613, A is a variable multiplier for shot size, gauge, and shot mass, B is a variable multiplier for θ including vibration of a target thrower and a misaligned target in the target thrower, and C is a variable multiplier for drag, lift, and wind.

For example, the approximate times it takes for a 7½ shot size shell with an initial muzzle velocity of approximately 1,225 feet per second to travel various distances is shown in Table 1.

TABLE 1

Time and Distances of a 7½ Shot

| Distance from barrel | Time (seconds) |
|---|---|
| 30 feet | 0.027 |
| 60 feet | 0.060 |
| 90 feet | 0.097 |
| 120 feet | 0.139 |
| 150 feet | 0.186 |
| 180 feet | 0.238 |

Various lead distances between target 1606 and phantom target 1608 for target 1606 having an initial velocity of approximately 30 mph is shown in Table 2.

TABLE 2

Lead Distances with a 7½Shot on a Full Crossing Shot

| Distance from Barrel | Lead Distance |
|---|---|
| 60 feet | 2.64 feet |
| 90 feet | 4.62 feet |
| 120 feet | 5.56 feet |

Referring to FIG. 16C, phantom path 1609 is offset from target path 1607 by drop distance 1616 to simulate and compensate for the average exterior ballistics drop of a shot.

The "drop of a shot" is the effect of gravity on the shot during the distance traveled by the shot. The shot trajectory has a near parabolic shape. Due to the near parabolic shape of the shot trajectory, the line of sight or horizontal sighting plane will cross the shot trajectory at two points called the near zero and far zero in the case where the shot has a trajectory with an initial angle inclined upward with respect to the sighting device horizontal plane, thereby causing a portion of the shot trajectory to appear to "rise" above the horizontal sighting plane. The distance at which the weapon is zeroed, and the vertical distance between the sighting device axis and barrel bore axis, determine the amount of the "rise" in both the X and Y axes, i.e., how far above the horizontal sighting plane the rise goes, and over what distance it lasts.

Drop distance 1616 is calculated by:

$$D_{Drop} \approx v_t \tau \ln \left[\cosh\left(\frac{t_{impact}}{\tau}\right)\right] \qquad \text{Eq. 16}$$

where $D_{Drop}$ is drop distance 1616, $t_{impact}$ is the time required for a shot string fired by marksman 1612 to impact phantom target 1608. $T_{impact}$ is determined by a set of lookup tables having various impact times at predetermined distances for various shot strings.

$$v_t = \sqrt{\frac{2mg}{C\rho A}}, \text{ and} \qquad \text{Eq. 17}$$

$$\tau = \frac{v_t}{g} \qquad \text{Eq. 18}$$

where $v_t$ is the terminal velocity of target 1606, m is the mass of target 1606, g is the vertical acceleration due to gravity, C is the drag coefficient for target 1606, $\rho$ is the density of the air, A is the planform area of target 1606, and $\tau$ is the characteristic time.

Referring to FIGS. 16A and 16C, at step 1602, phantom halo 1617 is determined. Phantom halo 1617 is a simulation of a shot string at a distance of the phantom target from the position of the marksman. In a preferred embodiment, an area of phantom halo 1617 is determined from the set of weapon data and calculated by:

$$A_{shot\ string} = \pi R_{string}^2 \qquad \text{Eq. 19}$$

$$R_{string} = \gamma R_{initial} + v_{spread} t \qquad \text{Eq. 20}$$

$$A_{phantom\ halo} = A_{shot\ string} \qquad \text{Eq. 21}$$

where $A_{shot\ string}$ is the area of the shot string, $R_{string}$ is the radius of the shot string, $R_{initial}$ is the radius of the shot as it leaves the weapon, $\gamma$ is a variable multiplier for any choke applied to the weapon as determined from the set of weapon data, $v_{spread}$ is the rate at which the shot spreads, and t is the time it takes for the shot to travel from the weapon to the target. $A_{phantom\ halo}$ is the area of phantom halo 1617.

In one embodiment, the area of phantom halo 1617 varies as the amount of choke applied to the weapon varies.

Returning to FIG. 16A, at step 1603, a relative contrast value between the target and a background surrounding the target is analyzed by calculating the difference between a grayscale brightness of the target and an average brightness of the background surrounding the target and the difference between an average color of the target and a color of the background surrounding the target based on a desired day/night setting and a set of desired environmental conditions.

At step 1604, a color and a contrast level of a phantom target is determined. In a preferred embodiment, the phantom target includes a set of pixels set at a predetermined contrast level. The predetermined contrast level is determined by the difference of the color between the phantom target and the target and the difference of the brightness between the phantom target and the target. In this embodiment, the predetermined contrast level is a range from a fully opaque image to a fully transparent image with respect to the image of the target and the image of the background.

In a preferred embodiment, the set of pixels is set at a predetermined color. For example, blaze orange has a pixel equivalent setting of R 232, G 110, B0.

At step 1605, a color and contrast level of the phantom halo is determined. In a preferred embodiment, the phantom halo includes a set of pixels set at a predetermined contrast level. The predetermined contrast level is determined by the difference of the color between the phantom halo and the target and the difference of the brightness between the phantom halo and the target. In this embodiment, the predetermined contrast level is a range from a fully opaque image to a fully transparent image with respect to the image of the target and the image of the background.

In a preferred embodiment, the set of pixels is set at a predetermined color. For example, black has a pixel equivalent setting of R 0, G 0, B 0. Any color may be employed.

Figure 17:
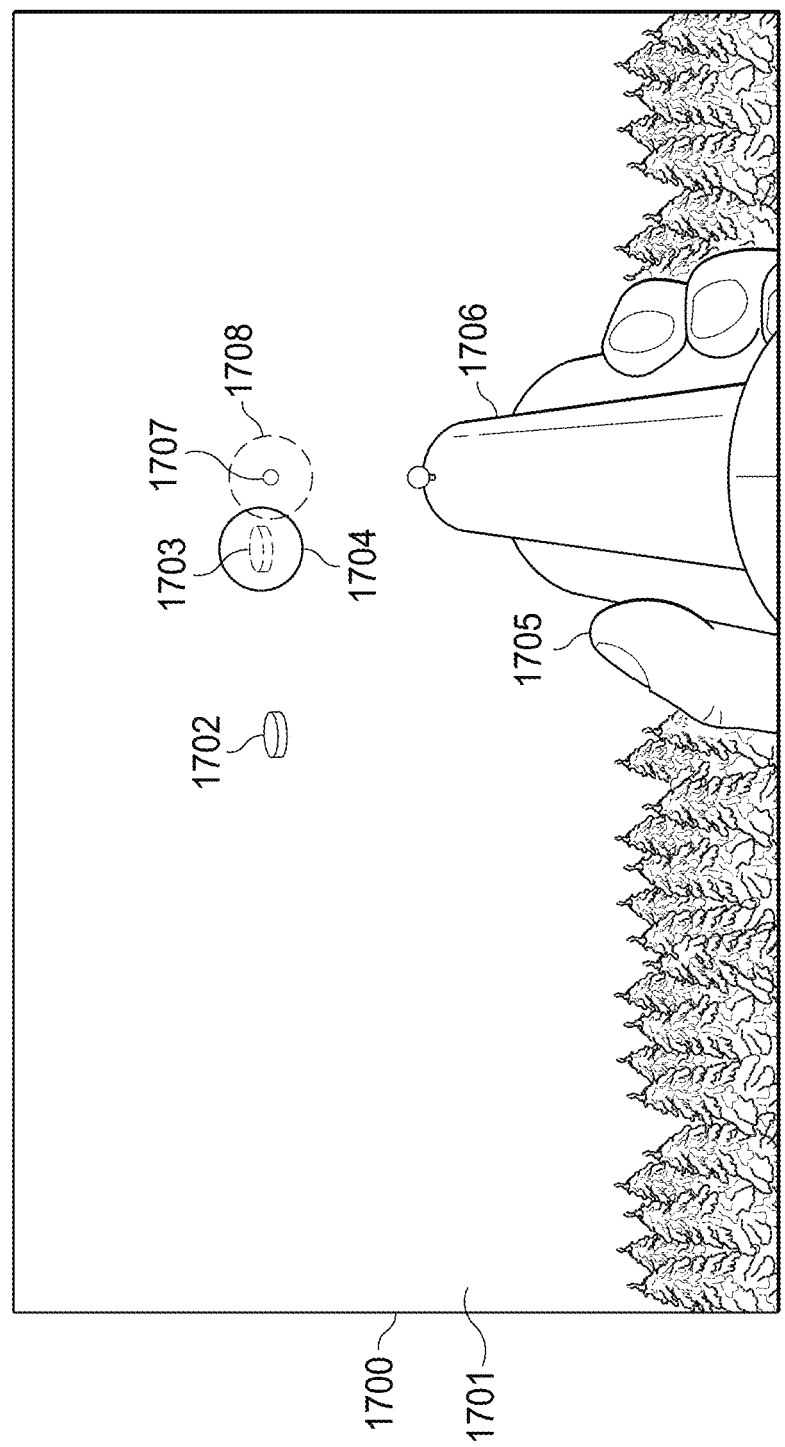
FIG. 17 is a user point of view of a virtual reality simulation system of a preferred embodiment.

Referring to FIG. 17, a view of a simulation from the perspective of a marksman wearing a user device, such as user device 900, is shown. Through display 1700, background environment 1701 and target 1702 are viewed. Phantom target 1703 is projected at a lead distance and at a drop distance from target 1702. Phantom halo 1704 is projected surrounding phantom target 1703. Marksman 1705 aims weapon 1706 at phantom target 1703.

In a preferred embodiment, shot center 1707 appears on display 1700 when marksman 1705 pulls a trigger of weapon 1706. Shot string 1708 surrounds shot center 1707. In a preferred embodiment, shot string 1708 is a simulation of a shot pellet spread fired from weapon 1706.

In an alternative embodiment, shot center 1707 is not displayed and shot string 1708 is displayed traveling from the barrel of weapon 1706 along a trajectory. The trajectory, size, positioning, and flight path of shot string 1708 are based on the location and orientation of weapon 1706 and are based on the type of ammunition selected for the simulation. When shot string 1708 intersects target 1702, target 1702 is destroyed. An image of one or more of target 1702, phantom target 1703, and phantom halo 1704 can be paused and displayed at their respective locations when the trigger of weapon 1706 was pulled while the target 1702 continues to move along its trajectory and shot string 1708 continues to move along its trajectory.

Figure 18:
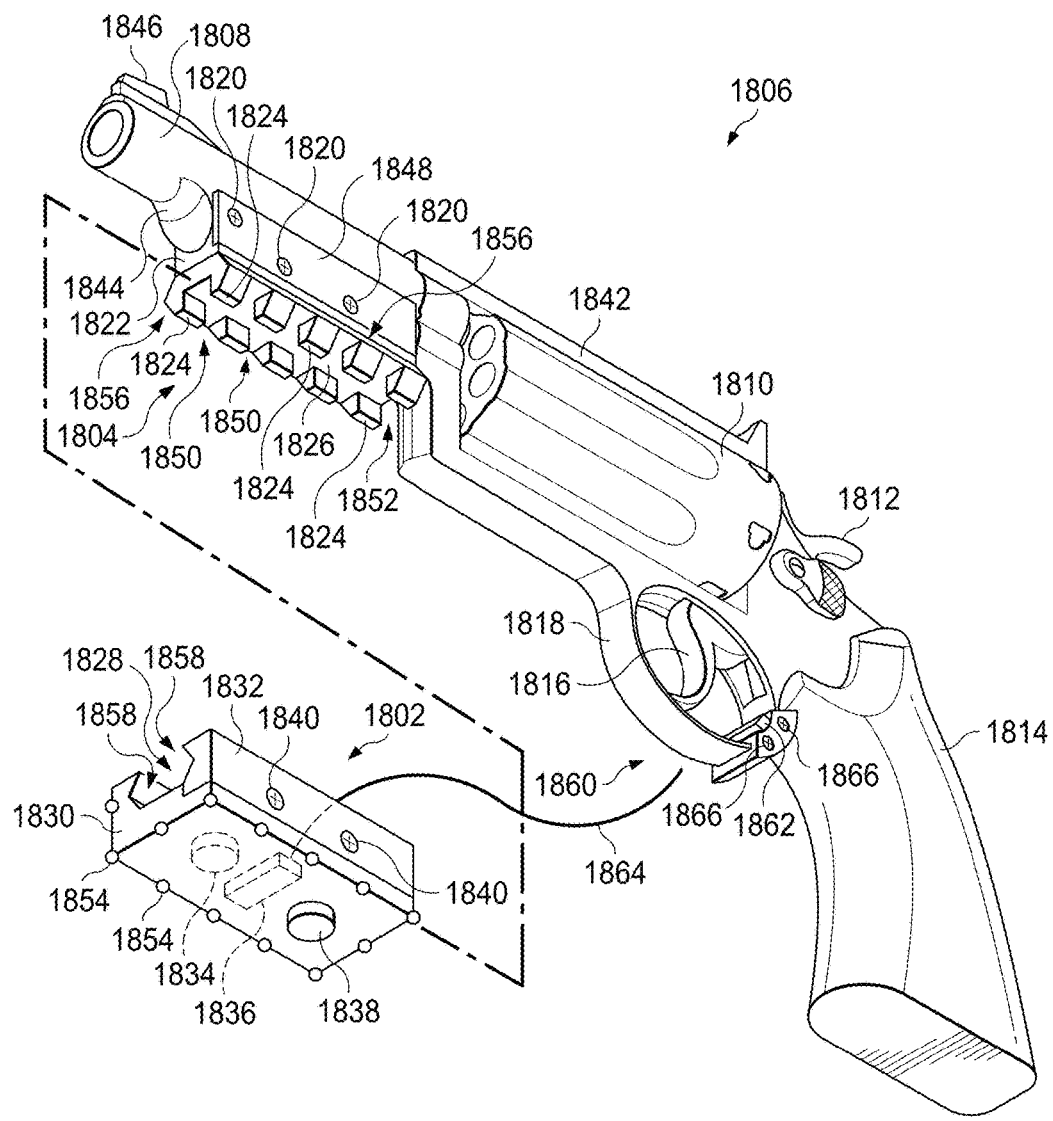
FIG. 18 is an isometric view of an input device configured to be mounted on a rail system of a weapon of a preferred embodiment.

Referring to FIG. 18, an isometric view shows an input device configured to be mounted on a rail system of a weapon. Input device 1802 is to be mounted to rail system 1804 of weapon 1806.

Weapon 1806 includes barrel 1808, sight 1846, frame 1842, member 1844, cylinder 1810, hammer 1812, handle 1814, trigger 1816, trigger guard 1818, trigger sensor 1860, and rail interface system 1804. Weapon 1806 is a double-action revolver wherein operation of trigger 1816 cocks and releases hammer 1812. Rotation of cylinder 1810 is linked to movement of hammer 1812 and trigger 1816.

Barrel 1808 is connected to frame 1842 and member 1844. Member 1844 supports barrel 1808 and is the portion of weapon 1806 to which rail interface system 1804 is mounted. In alternative embodiments, rail interface system 1804 is mounted to other parts or portions of weapon 1806, such as being directly mounted to barrel 1808.

Frame 1842 connects barrel 1808, member 1844, trigger guard 1818, trigger 1816, handle 1814, hammer 1812, and cylinder 1810. Frame 1842 and handle 1814 house the mechanisms that create action between trigger 1816, cylinder 1810, and hammer 1812.

Rail interface system 1804 is a rail system for interfacing additional accessories to weapon 1806, such as tactical lights, laser aiming modules, forward hand grips, telescopic sights, reflex sights, red-dot sights, iron sights, holographic sights, bipods, bayonets, and so on. Rail interface system 1804 may conform to one or more standard rail systems, such as the Weaver rail mount, the Picatinny rail (also known as MIL-STD-1913), and the NATO Accessory Rail. Rail interface system 1804 includes screws 1820, base 1822, member 1848, and rail 1826.

Screws 1820 fit and secure rail interface system 1804 to member 1844 of weapon 1806. Screws 1820 compress base 1822 and member 1848 of rail interface system 1804 against member 1844 of weapon 1806.

Rail 1826 includes ridges 1824, slots 1850, and angled surfaces 1856. The longitudinal axis of rail 1826 is substantially parallel to the longitudinal axis of barrel 1808. Slots 1850 are the lateral voids or slots between ridges 1824 that are perpendicular to both the longitudinal axis of rail 1826 and the longitudinal axis of barrel 1808. Rail 1826 also includes a longitudinal slot 1852 that runs along the length of rail 1826 and is substantially parallel to the longitudinal axis of barrel 1808. Angled surfaces 1856 of rail 1826 allow for the precise mounting of accessories to rail 1826.

Input device 1802 includes rail mount 1828, first portion 1830, second portion 1832, battery 1834, processor 1836, LEDs 1854, button 1838, and screws 1840. Input device 1802 slides longitudinally onto rail 1826 of rail interface system 1804 of weapon 1806 and its position is secured by screws 1840. The front surface of input device 1802 is flush with a ridge 1824 of rail 1826 so that the location and orientation of input device 1802 with respect to barrel 1808 is known and the firing of weapon 1806 can be accurately simulated.

Rail mount 1828 of input device 1802 includes first portion 1830, second portion 1832, and angled surfaces 1858. Angled surfaces 1858 of rail mount 1828 correspond to angled surfaces 1856 of rail 1826 to allow for a tight and precise fitment of input device 1802 to rail interface system 1804. Screws 1840 of input device 1802 compress first portion 1830 and second portion 1832 against rail 1826 of rail interface system 1804 with sufficient force to prevent changes in the positioning or orientation of input device 1802 with respect to weapon 1806 as weapon 1806 is being used.

Battery 1834 of input device 1802 is connected to and powers the electrical components within input device 1802 including processor 1836 and LEDs 1854. Processor 1836 controls LEDs 1854. In additional embodiments, input device 1802 includes one or more sensors, accelerometers, gyroscopes, compasses, and communication interfaces. The sensor data from the sensors, accelerometers, gyroscopes, and compasses is sent from input device 1802 to a computer, such as computer 801 of FIG. 8, via the communication interface. Input device 1802 includes button 1838 to turn on, turn off, and initiate the pairing of input device 1802.

LEDs 1854 emit light that is sensed by one or more cameras or sensors, from which the locations and orientations of input device 1802 and weapon 1806 can be determined. The locations and orientations are determined from the transmission characteristics of the light emitted from LEDs 1854, and the placement characteristics of LEDs 1854.

Trigger sensor 1860 detects the pull of trigger 1816 when trigger 1816 presses onto pressure switch 1862 with sufficient movement and force. When hammer 1812 is fully cocked, trigger 1816 rests just above pressure switch 1862 so that any additional movement will release hammer 1812 and will activate pressure switch 1862. One or more wires 1864 electrically connect trigger sensor 1860 to processor 1836 so that processor 1836 can determine when trigger 1816 is pulled when blanks or live rounds are not used. Trigger sensor 1860 is contoured to fit onto the back end of trigger guard 1818 behind trigger 1816 and trigger sensor 1860 is secured onto trigger guard 1818 by screws 1866.

In a two wire embodiment, current from processor 1836 through a first wire of wires 1864 to trigger sensor 1860 is returned through a second wire of wires 1864. In an alternative embodiment, wire 1864 is a single wire and a return path for the current from processor 1836 through wire 1864 to trigger sensor 1860 is created by electrically connecting trigger sensor 1860 to trigger guard 1818, which is electrically connected to frame 1842, rail system 1804, input device 1802, and processor 1836.

In alternative embodiments, weapon 1806 is loaded with one or more live or blank rounds of ammunition that discharge through barrel 1808 after hammer 1812 is cocked and trigger 1816 is then pulled. Weapon 1806 does not include sensors for measuring the precise location of cylinder 1810, hammer 1812, and trigger 1816. During simulation and after a round has been fired, the simulation shows the movement of cylinder 1810, hammer 1812, and trigger 1816 to prepare for a subsequent shot, which may or may not correspond to the actual state of weapon 1806.

In alternative embodiments, the computer that receives data from one or more sensors from input device 1802 derives the state of weapon 1806 from data received from one or more sensors and updates the display of weapon 1806 to show the state and/or firing of weapon 1806 in the simulation. For example, data from sensors, accelerometers, and gyroscopes within input device 1802 can indicate the click for when hammer 1812 is fully cocked, indicate the click for when cocked hammer 1812 is released and the chamber in cylinder 1810 is unloaded, and indicate the discharge of a live or blank round of ammunition. Data from a microphone, such as microphone 919 of FIG. 9, can be used to similarly detect one or more states of weapon 1806 and the discharge of live or blank rounds of ammunition. When cylinder 1810 is configured to hold six rounds of ammunition and six shots have been fired successively, the simulation may indicate to the user that it is time to reload weapon 1806. The simulation displays changes to the state of weapon 1806 as mechanical movements on weapon 1806 and displays the firing of weapon 1806 with associated mechanical movements of weapon 1806.

Figure 19:
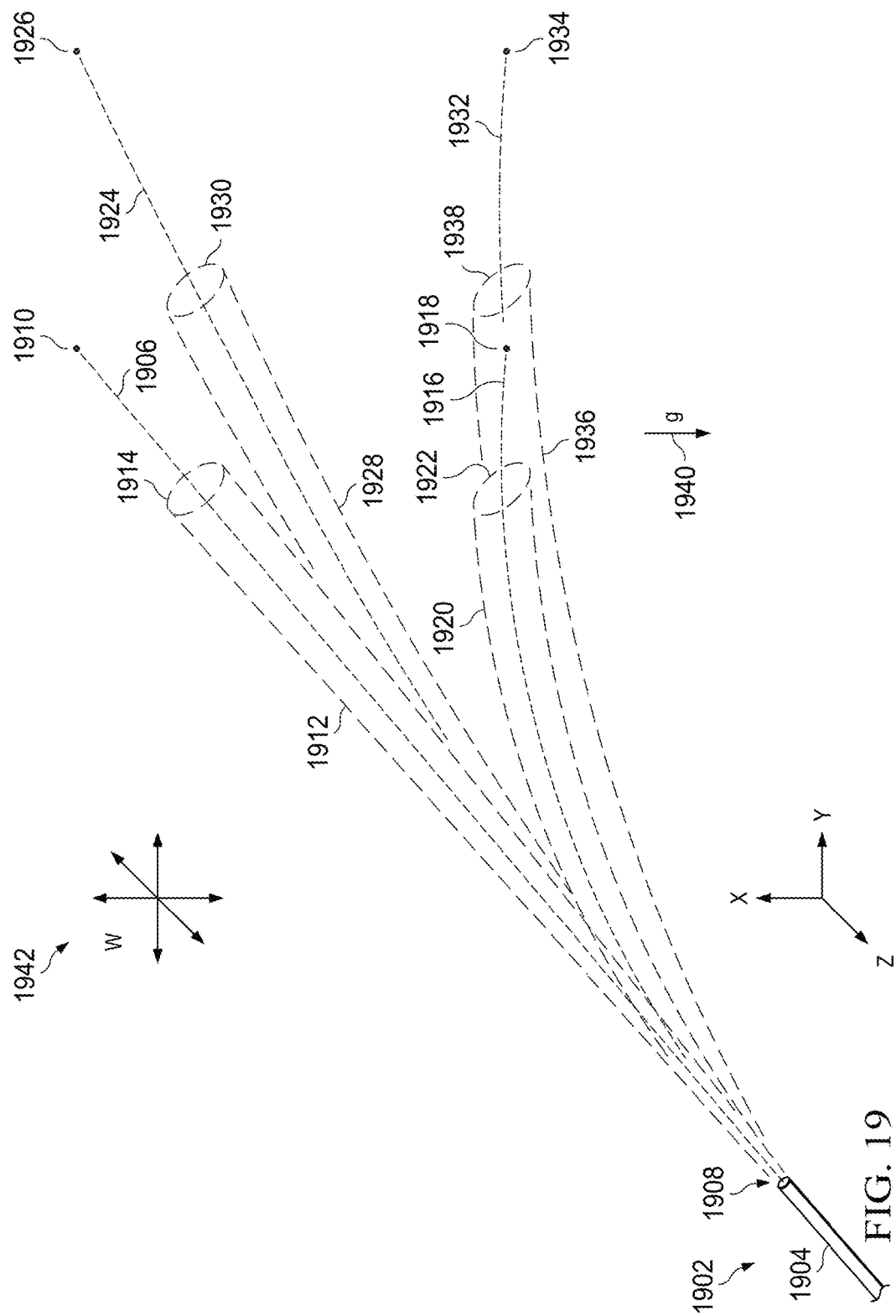
FIG. 19 is a simulation view that shows beams being projected from a barrel of a weapon of a preferred embodiment.

Referring to FIG. 19, a simulation view shows "beams" being projected from a barrel of a weapon. Weapon 1902 includes barrel 1904 with one or more simulated beams 1906, 1912, 1916, 1920, 1924, 1928, 1932, and 1936 that emanate from the tip of barrel 1904. Beams 1906, 1912, 1916, 1920, 1924, 1928, 1932, and 1936 follow and are adjusted with the movement of barrel 1904 of weapon 1902.

The beam of a laser in a real world environment is generally not visible to an observer unless reflected from an object in the environment. In a virtual reality environment, however, a simulated laser beam can be calculated and displayed. Simulated beams can be displayed with any level of transparency and can demonstrate characteristics that are not possible in the real world. For example, the simulated beam can be displayed as visible, and with a dispersion pattern or in a curved path.

As an example, beam 1906 is a beam of a simulated laser and is displayed as visible along its entire length. The beam is displayed as a line or as a tight cylinder. Beam 1906 emanates from point 1908 that is central to and aligned with barrel 1904. Beam 1906 indicates the precise direction that barrel 1904 is pointed. Beam 1906 extends to point 1910 that is on the central longitudinal axis of barrel 1904 and is a fixed distance away from barrel 1904.

In another embodiment, beam 1912 is displayed as a conical frustum starting from barrel 1904 and extending to circular cross section 1914. The increase of the radius of beam 1912 from the radius of barrel 1904 to cross section 1914 approximates the increasing spread of a shot as it travels away from barrel 1904. Circular cross section 1914 is displayed at the termination plane of beam 1912 and provides an indication of the maximum distance that a shot on target can reliably register as a hit.

Beams 1906 and 1912 maintain their respective shapes and orientation with respect to barrel 1904 as it is moved. Pulling the trigger of weapon 1902 while beam 1906 or beam 1912 is aligned with a phantom target or phantom target, such as phantom target 1703 or phantom halo 1704 of FIG. 17, registers as a hit to the simulated target.

Beam 1916 is displayed as a curved line that extends from point 1908 at barrel 1904. Beam 1916 is tangential to beam 1906 at point 1908 and ends at point 1918.

In another embodiment, beams 1916 and 1920 are curved to approximate the drop of a shot due to gravity. The curvature of beams 1916 and 1920 is calculated based on the amount of simulated force due to gravity 1940 and the angle of barrel 1904 when the trigger is pulled. Pulling the trigger of weapon 1902 while beam 1916 or beam 1920 is aligned with a phantom target or phantom target, such as phantom target 1703 or phantom halo 1704, registers as a hit to the simulated target.

In another embodiment, beam 1920 is displayed as a curved conical frustum beginning at barrel 1904 and ending at circular cross section 1922. Beam 1920 is curved to approximate the drop of a shot due to gravity and has a radius that increases along the length from barrel 1904 to cross section 1922 to simulate the spread of a shot.

In another embodiment, beams 1924 and 1928 are curved to approximate changes in shot trajectory due to windage 1942. The amount of curvature of beams 1924 and 1928 is based on the amount of simulated force due to windage 1942 and the angle of barrel 1904 with respect to windage 1942. The simulation of windage may approximate changes in wind velocity and direction, such as found in a gusty wind. In this embodiment, the simulation is calculated so that the beam moves with respect to the longitudinal axis of the barrel to indicate how the shot would be affected by windy conditions. When windage 1942, is simulated, pulling the trigger of weapon 1902 while beam 1924 or beam 1928 is aligned with a phantom target or phantom target, such as phantom target 1703 or phantom halo 1704, registers as a hit to the simulated target.

Beam 1924 is displayed as a curved line that extends from point 1908 at the tip of barrel 1904. Beam 1924 is tangential to beam 1906 at point 1908 and ends at point 1926.

Beam 1928 is displayed as a curved conical frustum starting at the circular tip of barrel 1904 and ending at circular cross section 1930. Beam 1928 is curved to approximate the drop of a shot due to gravity and has a radius that increases along the length from the tip of barrel 1904 to cross section 1930 to simulate the spread of a shot.

Beams 1932 and 1936 are curved to approximate changes in shot trajectory due to both gravity 1940 and windage 1942. The curvature of beams 1932 and 1936 is based on the amount of gravity 1940 and windage 1942 and based on the angle of barrel 1904 with respect to gravity 1940 and windage 1942. When both gravity 1940 and windage 1942 are simulated, pulling the trigger of weapon 1902 while beam 1932 or beam 1936 is aligned with a phantom target or phantom target, such as phantom target 1703 or phantom halo 1704, registers as a hit to the simulated target.

Beam 1932 is displayed as a curved line that extends from point 1908 at the tip of barrel 1904. Beam 1932 is tangential to beam 1906 at point 1908 and ends at point 1934.

Beam 1936 is formed as a curved conical frustum starting at 'barrel 1904 and ending at circular cross section 1938. Beam 1936 is curved to approximate the changes to the trajectory of a shot due to both gravity 1940 and windage 1942 and the radius of beam 1936 increases along the length from the tip of barrel 1904 to cross section 1938 to approximate the spread of a shot.

In one preferred embodiment, a video capture system, such as Microsoft hololens, in combination with prerecorded videos of the shooting field and multiple actual clay target launches are used to create a virtual model of the surroundings and trajectories of clay targets for display and use in the system.

The locations and orientations of the launchers are derived based on the known location of the camera with respect to the field, the known size and weight of the targets, and the known physical constraints of the environment (e.g., gravity). After deriving the launcher locations and orientations, virtual or holographic launchers can be placed at similar positions in virtual reality or augmented reality simulations of the fields, as will be further described.

Figure 20A:
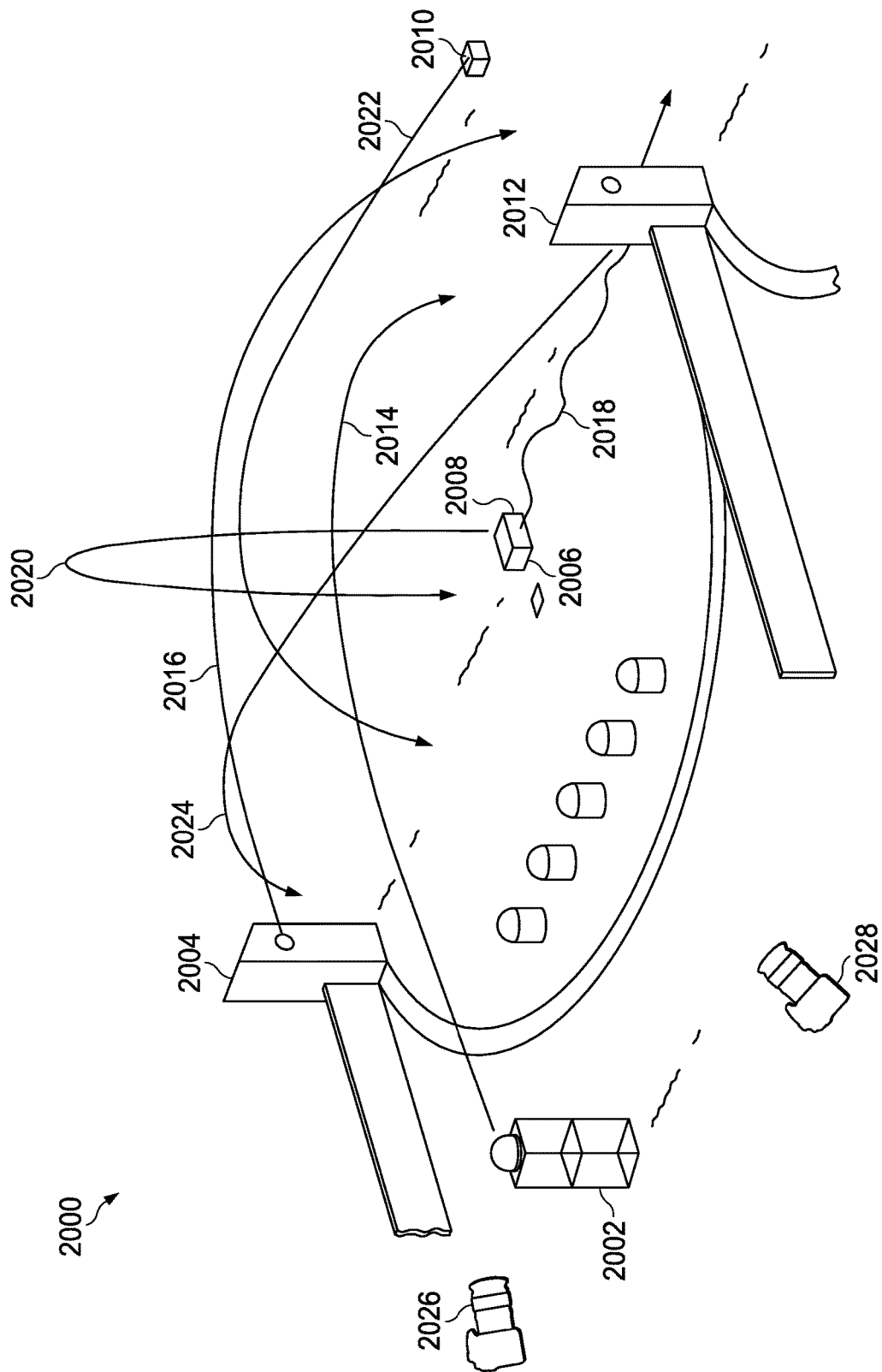
FIG. 20A is a five stand field of a preferred embodiment.

Referring to FIG. 20A, five stand field 2000 includes five shooter locations with six launchers. Five stand field 2000 includes launchers 2002, 2004, 2006, 2008, 2010, and 2012 that launch targets onto paths 2014, 2016, 2018, 2020, 2022, and 2024, respectively. Cameras 2026 and 2028 are positioned to view all towers and launchers. A video of the high tower and the low tower shot with a normal lens at 60 fps from station 4 can be processed and used to show correct trajectory and correct lead from any point of view at any station. The trajectory of the target is the same, being viewed from different angles.

Figure 20B:
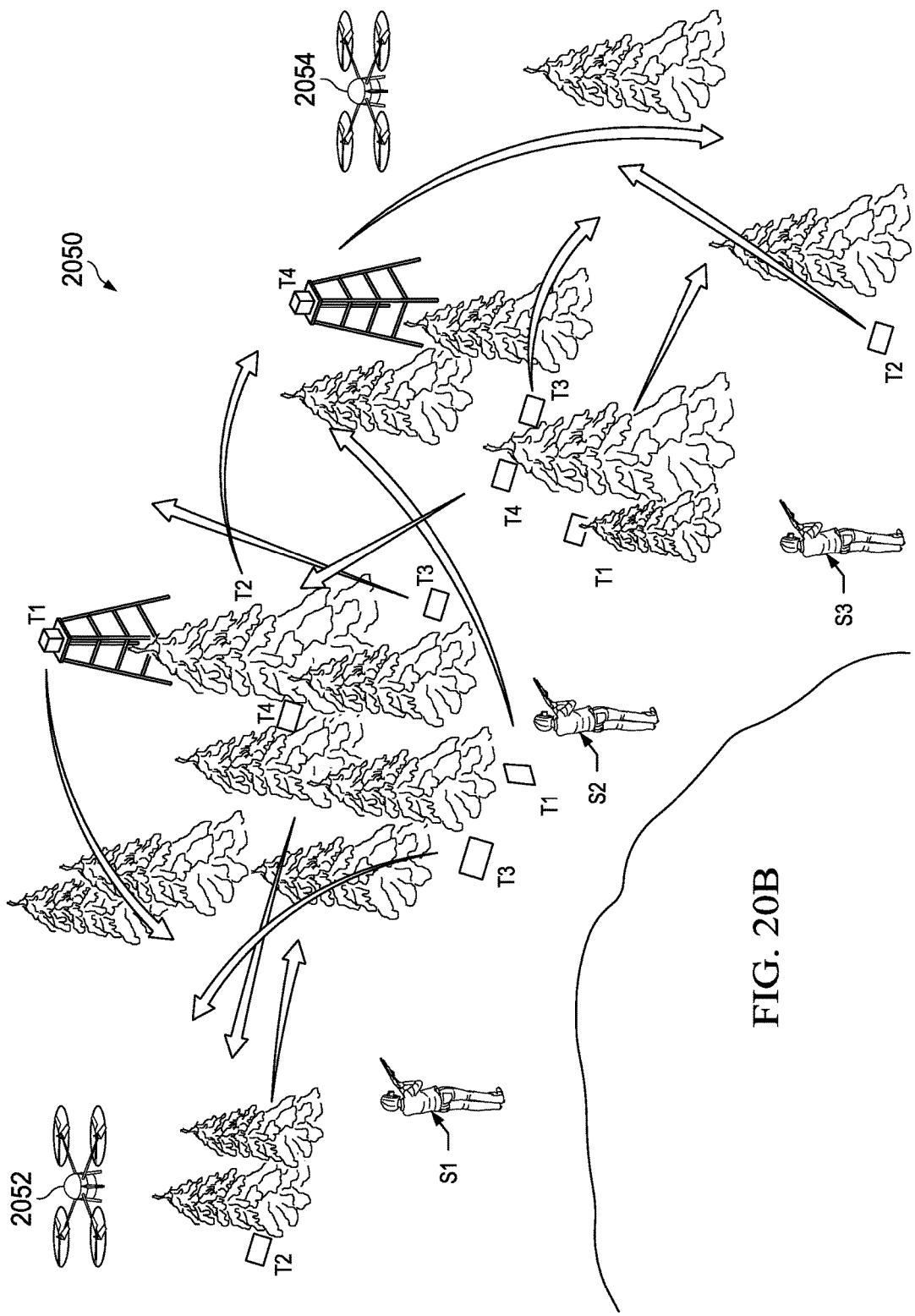
FIG. 20B is a sporting clay field of a preferred embodiment.

Referring to FIG. 20B, sporting clays field 2050 includes three shooter locations that each have four launcher locations. The shooter and launch locations in sporting clays are unique to the venue. Sporting clays field 2050 includes four launchers labeled T1 through T4 for each of the three shooter positions S1, S2, and S3. Drones 2052 and 2054 include cameras that record the paths of the clay targets. Drones 2052 and 2054 are capable of sensing and recording their respective GPS locations while in flight. The same process can be used to record the flight trajectories of birds, drones, helicopters and airplanes for purposes of simulating correct spatial lead.

Figure 21A:
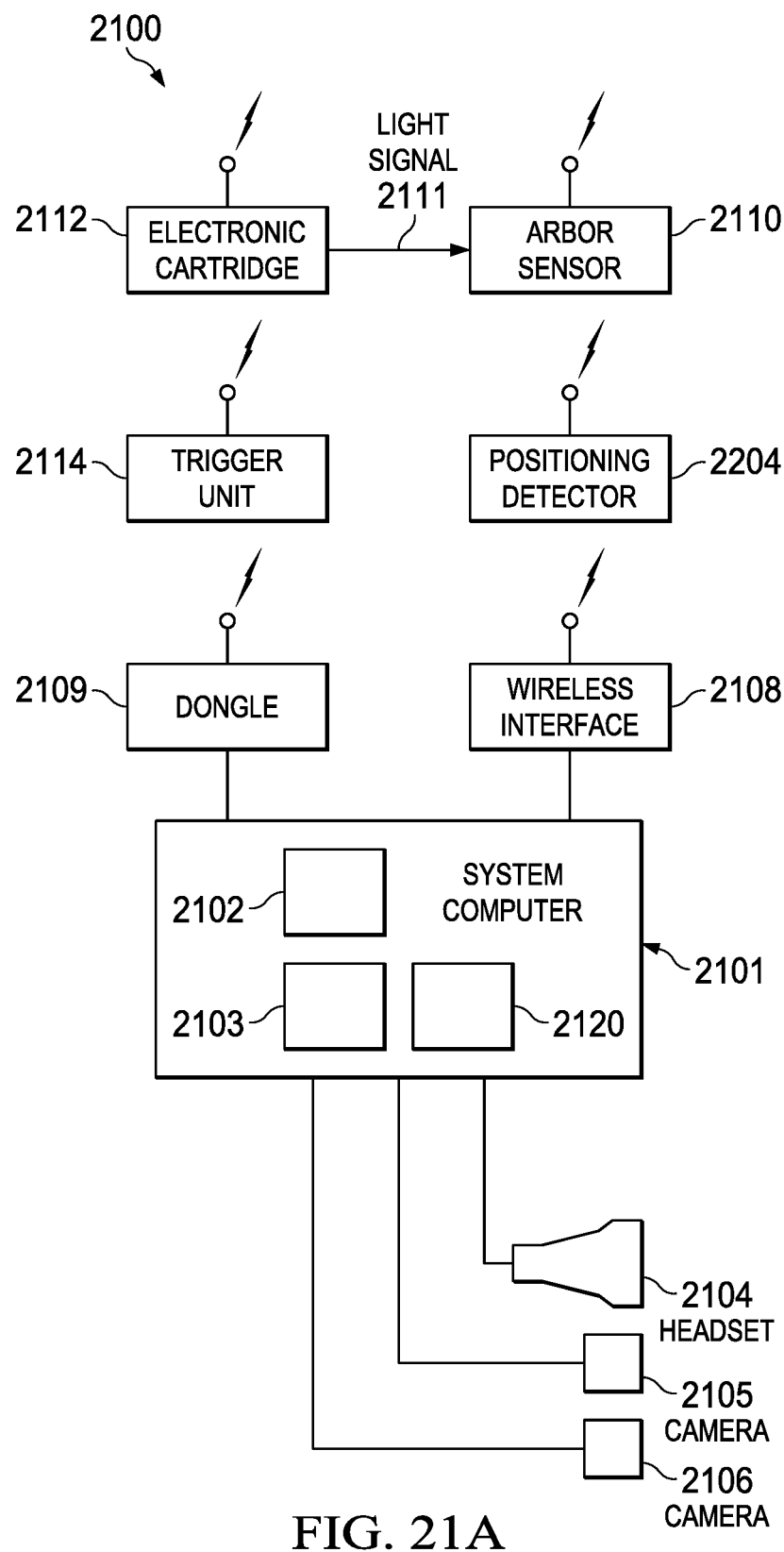
FIG. 21A is diagram of a preferred embodiment.

Referring to FIG. 21A, an alternate embodiment of the simulation system will be described. System 2100 includes system computer 2101. System computer 2101 includes programs 2102, 2103, and 2120. Program 2102 is software capable of operating the Microsoft hololens system, as will be further described. Program 2103 includes instructions to operate a unity 3D simulation of the system, as will be further described. Program 2120 is simulation software capable of communicating with programs 2102 and 2103. In a preferred embodiment, program 2120 is the Unity 3D simulation engine, as will be further described.

Head set 2104 is connected to system computer 2101. Head set 2104 includes an augmented reality display or a virtual reality display, as will be further described. System computer 2101 is further connected to camera 2105 and camera 2106. The cameras are used in registering fixed objects such as launchers and towers and in creating trajectory models of moving objects such as clay targets in the Microsoft hololens system, as will be further described.

System computer 2101 is attached to wireless interface 2108. In a preferred embodiment, wireless interface 2108 is a Bluetooth interface. System computer is also attached to dongle 2109. In a preferred embodiment, dongle 2109 is compatible with the Vive Tracker, available from HTC.

System 2100 further includes trigger unit 2114. Trigger unit 2114, in a preferred embodiment, is attached to the weapon and includes sensors to detect trigger pulls. The sensors communicate signals through an onboard wireless interface to wireless interface 2108.

System 2100 further includes electronic cartridge 2112 and barrel bore arbor mounted sensor 2110. In a preferred embodiment, both include onboard wireless interfaces which communicate with wireless interface 2108. Electronic cartridge 2112 communicates with barrel arbor mounted sensor 2110 via light signal 2111, as will be further described.

Electronic cartridge 2112 in a typical usage is chambered in the weapon. In a typical embodiment, arbor mounted sensor 2110 is secured in the muzzle of the weapon.

System 2100 also includes positioning detector 2204, as will be further described.

Figure 21B:
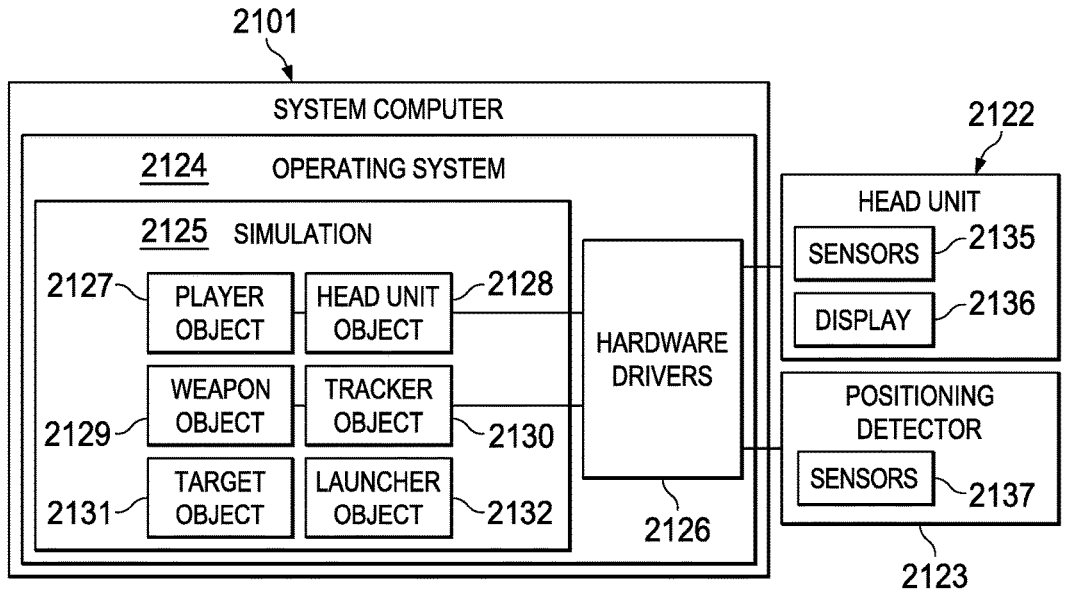
FIG. 21B is a diagram of a virtual reality system of a preferred embodiment.

Referring to FIG. 21B, in a preferred embodiment of a virtual reality system, a system computer 2101 is connected to head unit 2122 and position detector 2123.

System computer 2101 runs operating system 2124, which runs virtual reality simulation engine 2125. System computer 2121 receives input from head unit 2122 and position detector 2123 that includes measurement data, which is used to identify the positions of head unit 2122 and position detector 2123. System computer 2121 outputs images to head unit 2122 that are rendered using simulation engine 2125.

Head unit 2122 includes sensors 2135 that provide measurement data that is used to identify the position of head unit 2122. Head unit 2122 also includes display 2136 that shows three dimensional images. The measurement data is processed by system computer 2121 and used to generate the images displayed by the one or more display screens.

Position detector 2123 includes sensors 2137, is mounted to a weapon, and provides measurement data. System computer 2121 receives and processes the measurement data from position detector 2123 to update the position of the weapon inside of the simulation.

Operating system 2124 runs on system computer 2121 and provides standard interfaces for applications to run and access external hardware. Applications running under operating system 2124 on system computer 2121 access data provided by hardware devices, such as head unit 2122 and position detector 2123, through hardware drivers 2126.

Hardware drivers 2126 include device drivers for each of head unit 2122 and position detector 2123. Hardware drivers 2126 allows simulation engine 2125 to access the measurement data provided by head unit 2122 and positioning detector 2123 and to send images to head unit 2122.

Simulation engine 2125 runs under operating system 2124. In a preferred embodiment, the simulation engine 2125 runs in program 2120. The simulation engine receives measurement data from head unit 2122 and position detector 2123, renders virtual reality images based on the measurement data and the state of the simulation, and sends the images back to head unit 2122 to be displayed to the user. In a preferred embodiment, simulation engine 2125 uses one or more software objects to run the virtual reality simulation, including player object 2127, head unit object 2128, weapon object 2129, tracker object 2130, target object 2131, and launcher object 2132. Every time a new frame or image is generated, simulation engine 2125 updates each of the objects based on the measurement data, the amount of time since the last update, and the previous state of the simulation.

Player object 2127 represents the user inside of simulation engine 2125 and its location is based on the location of head unit 2122. Player object 2127 is linked to head unit object 2128, which stores the current location of head unit 2122. Head unit object 2128 identifies the current location of head unit 2122 by accessing the measurement data provided by head unit 2122 through hardware drivers 2126.

Weapon object 2129 represents, in simulation engine 2125, the weapon to which position detector 2123 is attached. The position of weapon object 2129 is linked to the position of position detector 2123 so that movements of position detector 2123 result in movements of weapon object 2129 inside of simulation engine 2125. Weapon object 2129 is linked to tracker object 2130 so that when tracker object 2130 updates is position, the position of weapon object 2129 is also updated.

Tracker object 2130 receives measurement data from position detector 2123 through hardware drivers 2126. Tracker object 2130 updates the position of position detector 2123, which is used by simulation engine 2125 and weapon object 2129 to update the visible location of weapon object 2129 within simulation engine 2125. Tracker object 2130 also receives button status data within the measurement data. The button status data is used to identify when a shot is fired and when a target should be launched.

Target object 2131 is a digital representation of a clay target. Target object 2131 is instantiated when a button is pressed on position detector 2123. The button press is identified by tracker object 2130 and target object 2131 is brought into the simulation at the location and direction specified by the launcher object. Target object 2131 is identified as a rigid body to a physics engine of simulation engine 2125 and its position is updated based on the simulated weight, position, and velocity of target object 2131. Upon initial placement, target object 2131 a simulated force is applied to target object 2131 to make it move inside of simulation engine 2125.

Launcher object 2132 represents the starting location of target object 2131 and can be placed at any position inside of simulation engine 2125. For simulations that include a launcher in a high house, launcher object 2132 is located inside a digital representation of the high house.

Figure 21C:
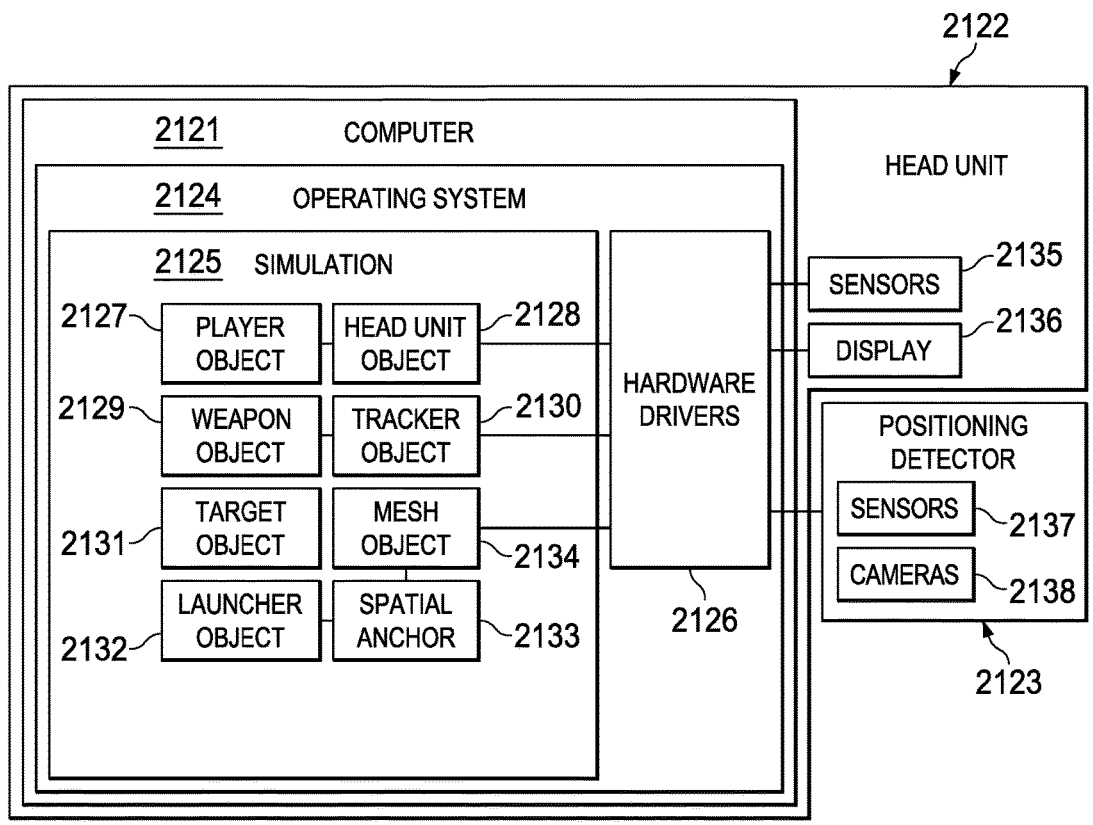
FIG. 21C is a diagram of an augmented reality system of a preferred embodiment.

Referring to FIG. 21C, an augmented reality system includes head unit 2122 and positioning detector 2123.

Head unit 2122 includes system computer 2121, sensors 2135, and display 2136.

Positioning detector 2123 includes sensors 2137 and is mounted to the weapon. Positioning detector 2123 provides measurement data that allows is used to determine the location of positioning detector 2123 with respect to the environment and the location of head unit 2122.

Sensors 2135 of head unit 2122 are used to provide measurement data that identifies the position of head unit 2122 and generates and updates mesh object 2134. Camera 2138 of head unit 2122 are used to locate and track registration marks on the towers and the weapon, as will be further described.

Display 2136 is mounted within head unit 2122 and displays three dimensional images or holograms to the user.

Computer 2121 receives measurement data from sensors 2135 of head unit 2122 and from sensors 2137 of positioning detector 2123 and renders an overlay image or hologram for each time step that is shown in display 2136. Computer 2121 hosts operating system 2124.

Operating system 2124 runs on computer 2121 and contains several applications, including simulation engine 2125 and hardware drivers 2126. Operating system provides standard interfaces for the applications to access data from hardware devices by using hardware drivers 2126. In a preferred embodiment, operating system 2124 is Windows 10 from Microsoft Corp.

Simulation engine 2125 renders each image shown through display 2136 based upon the measurement data from sensors 2135 and 2137, the amount of time since the last image was rendered, and the state of the simulation. Simulation engine 2125 includes several objects that are used to render an image, including player object 2127, head unit object 2128, weapon object 2129, tracker object 2130, target object 2131, launcher object 2132, spatial anchor 2133, and mesh object 2134. In a preferred embodiment simulation engine 2125 is the Unity 3D engine from Unity Technologies.

Player object 2127 represents the user in simulation engine 2125. In an augmented reality simulation, Player object 2127 is not shown, but the position of the player is constantly updated. The position of player object 2127 is associated with head unit object 2128 so that when the position of head unit object is updated, the position of player object 2127 is also updated.

Head unit object 2128 maintains the current position of head unit 2122 within simulation engine 2125. For each frame, the position of head unit object 2128 is updated based on measurement data from sensors 2135 that is received through hardware drivers 2126.

Weapon object 2129 is the representation of the weapon inside simulation engine 2125. For an augmented reality simulation, weapon object 2129 is not graphically displayed. The position of weapon object 2129 is associated with the position of tracker object 2130 and is updated for each frame of the simulation based on the movement of positioning detector 2123. The location and orientation of weapon object 2129 is used to determine if a shot hits a target.

Tracker object 2130 represents positioning detector 2123 inside of simulation engine 2125 and identifies the position of positioning detector 2123 and the status of one or more buttons connected to positioning detector 2123. Tracker object 2130 communicates with sensors 2137 of positioning detector 2123 through hardware drivers 2126. The measurement data provided by sensors 2137 of positioning detector 2123 include position data and button status data from which the current position of positioning detector 2123 is identified and stored into tracker object 2130.

Target object 2131 in simulation engine 2125 represents the virtual clay target. In a preferred embodiment, target object 2131 is displayed as a hologram using display 2136. Target object 2131 is initially created and instantiated at the location of launcher object 2132 with the same direction as launcher object 2132. Target object 2131 is identified as an object to which physics apply (e.g., gravity) by making it a rigid body object. Once placed into simulation engine 2125, target object 2131 is given an initial force that causes it to move through simulation engine 2125. For each frame, the position of target object 2131 is updated by the physics engine of simulation engine 2125 based on a simulated weight, velocity, and any other applied forces.

Launcher object 2132 represents the location of a launcher in simulation engine 2125. Launcher object 2132 is locked to a specific point on mesh object 2134 that is represented by spatial anchor 2133. To position launcher object 2132, spatial anchor 2133 is placed on to mesh object 2134. In a preferred embodiment, launcher object 2132 is placed on or within a tower or high house. When spatial anchor 2133 is placed on or inside a real life tower, simulation engine 2125 does not render a model of the tower. When spatial anchor 2133 is placed on the ground, simulation engine 2125 renders and displays a model of tower, within which launcher object 2132 is located.

Mesh object 2134 represents the three dimensional environment in which the user is located. Mesh object 2134 is a three dimensional surface of the environment measured by sensors 2135 of head unit 2122 and includes representation of the buildings and trees or, if indoors, walls, ceilings, floors, and objects surrounding the user.

Figure 22A:
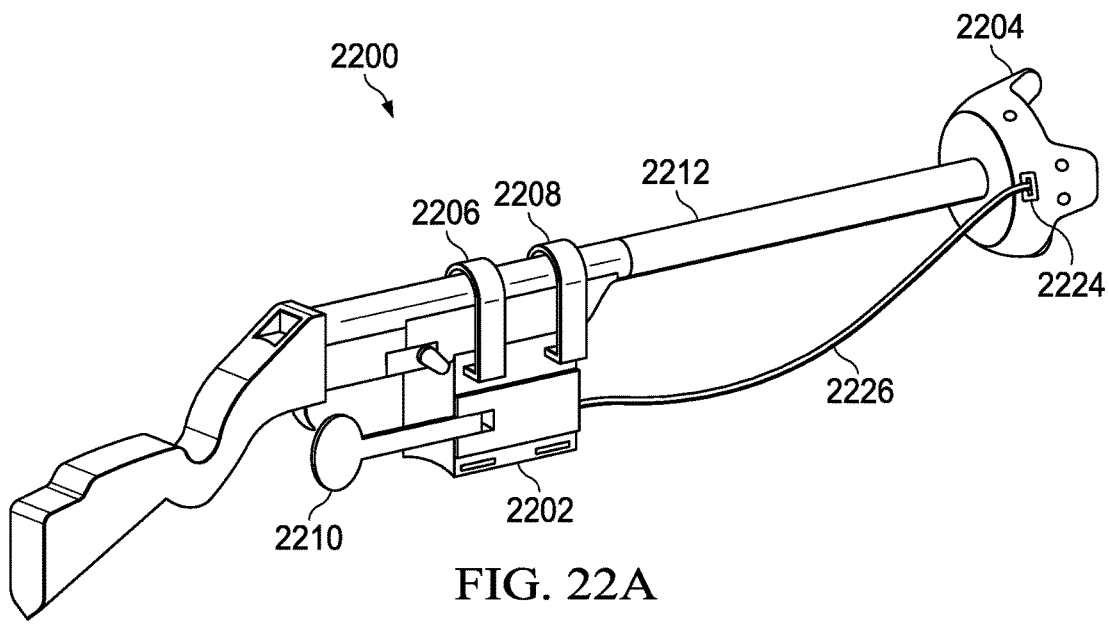
FIG. 22A is a diagram of a system using a positioning detector at an end of a barrel in a preferred embodiment.

Referring to FIG. 22A, weapon 2200 is used with the simulation system. Trigger unit 2202 is secured to weapon 2200 with fasteners 2206 and 2208. Trigger unit 2202 includes paddle 2210. Upon deflection of the paddle, the trigger unit sends electric signals utilized by the system. In one embodiment, trigger unit 2202 is in electronic communication with the simulation computer using a short range wireless communications protocol, such as Bluetooth, as will be further described. Positioning detector 2204 is fitted to a known position on weapon 2200 with respect to barrel 2212, as will be further described. In one embodiment, positioning detector 2204 includes USB port 2224. Cable 2226 connects the USB port to the trigger unit for communication of operational signals, as will be further described.

Figure 22B:
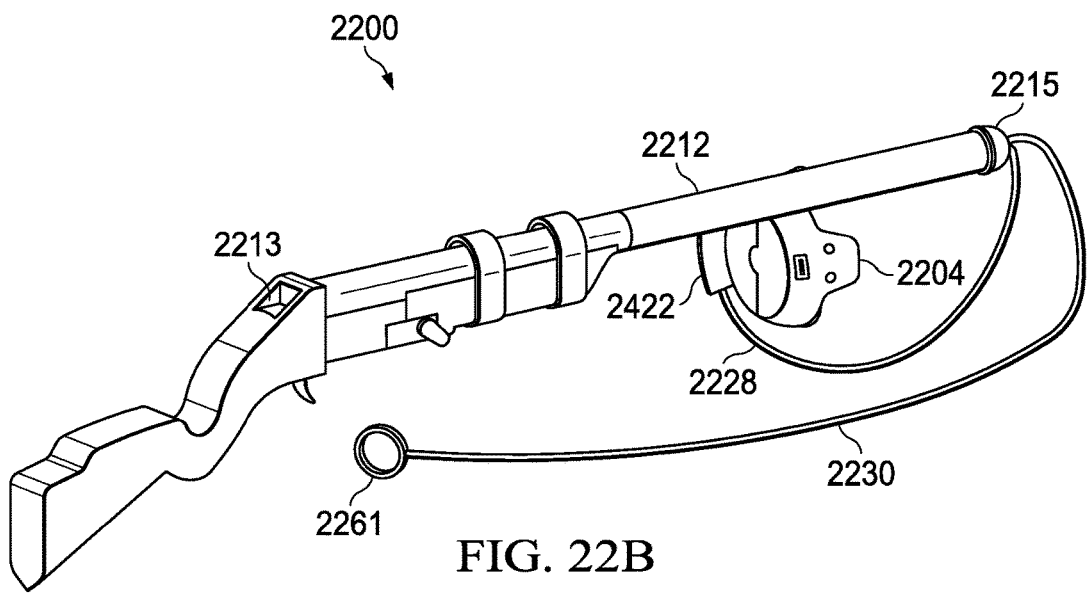
FIG. 22B is a diagram of a system using a positioning detector mounted under a barrel in a preferred embodiment.

Referring to FIG. 22B, weapon 2200 is alternatively used with the simulation system. Weapon 2200 includes electronic cartridge 2213 chambered in the weapon (not shown). Weapon 2200 further includes sensor arbor 2215 secured in the muzzle of the weapon. The weapon further includes positioning detector 2204 positioning below and attached to the barrel. Sensor arbor 2215 is connected to positioning detector 2204 by USB cable 2228. Weapon 2200 includes sensor thimble or ring 2261. Sensor arbor 2215 is connected to thimble 2261 by USB cable 2230.

Figure 22C:
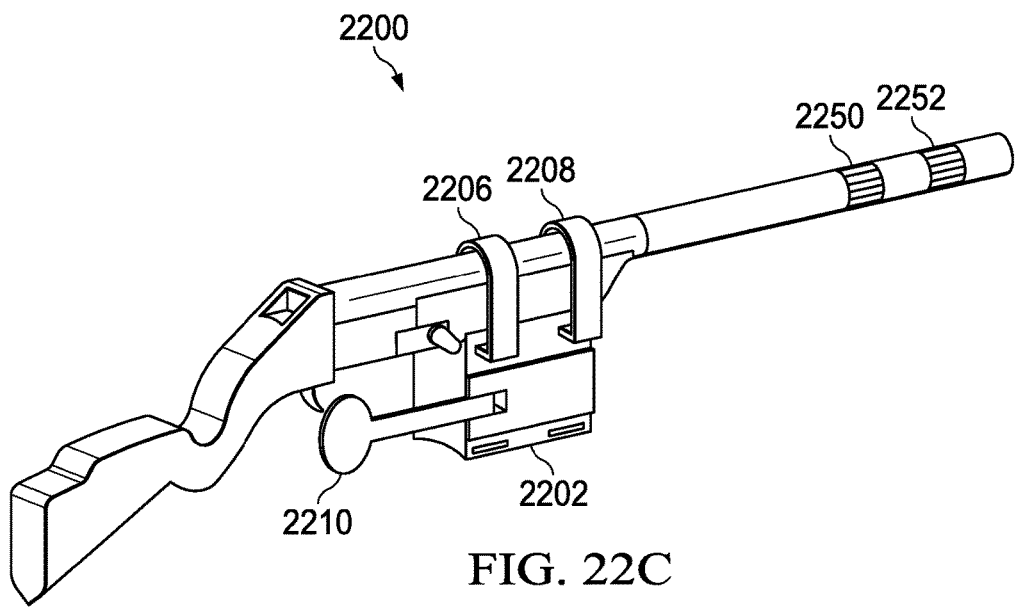
FIG. 22C is a diagram of a system using sight markings in a preferred embodiment.

Referring to FIG. 22C, weapon 2200 is alternatively used in the simulation system. Trigger unit 2202 is secured to the weapon as previously described. Trigger unit 2202 is in electronic communication with the simulation computer as will be further described. Weapon 2200 includes visual sight markers 2250 and 2252 capable of being recognized by the Microsoft hololens system and are used to locate the position orientation of the weapon during a simulation, as will be further described.

Figure 22D:
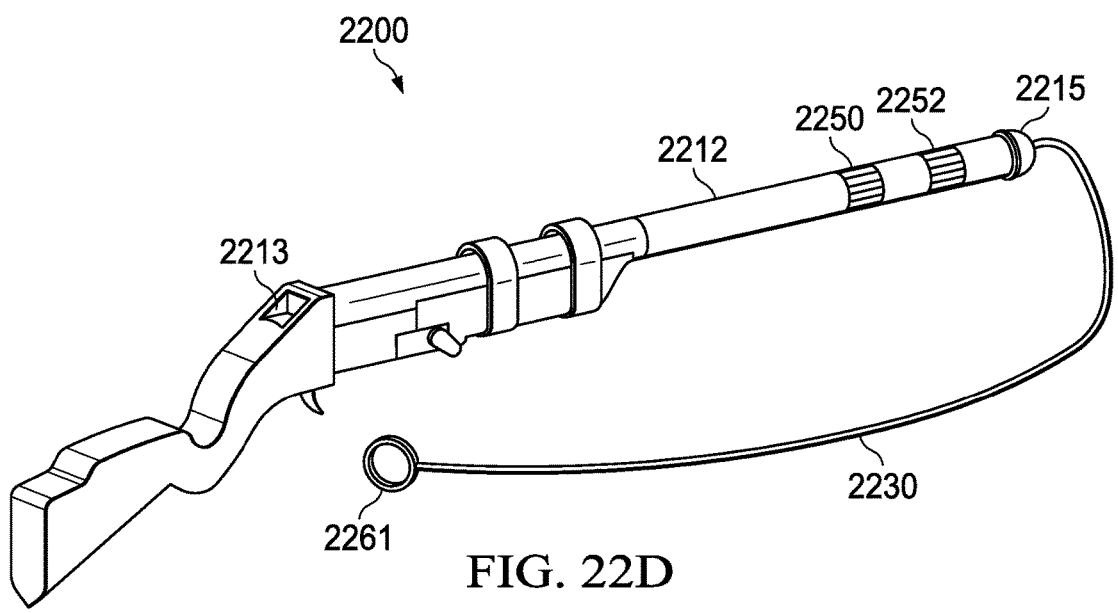
FIG. 22D is a diagram of a system using sight markings and a sensor thimble in a preferred embodiment.

Referring to FIG. 22D, weapon 2200 is alternatively used with the simulation system. Weapon 2200 includes electronic cartridge 2213 chamber in the weapon, as previously described. Weapon 2200 includes sensor arbor 2215 secured in the muzzle of the weapon, as previously described. Weapon 2200 includes sensor thimble 2261 connected to the sensor arbor, as will be further described. Weapon 2200 includes visual sight markers 2250 and 2252 capable of being recognized by the Microsoft hololens system and are used to locate the position orientation of the weapon during a simulation.

In a preferred embodiment, the augmented reality system is the Microsoft hololens running the Vuforia augmented reality platform and SDK with the Unity 3D engine. The visual sight markers 2250 and 2252 include an image (not limited to a barcode) that is printed on a flat two dimensional surface. The image is fixed to the weapon, either directly to the barrel of the weapon or to sensor arbor 2215, so that movement of the weapon causes similar movements of the image. The images of visual sight markers 2250 and 2252 are in the field of view of a camera of the head unit when the weapon is being aimed by the user. The augmented reality system identifies the position and orientation of the head unit with respect to an origin of the current augmented reality scene. When the augmented reality system processes the data from its sensors, including the camera, the image is identified and compared with a reference image stored in a database. From this comparison, the augmented reality system determines the position and orientation of the image with respect to head unit. The augmented reality system identifies the position and orientation of the head unit with respect to an origin of the current augmented reality scene. The augmented reality system then also determines the position and orientation of the weapon based on the positions and orientations of the image and the head unit with respect to the origin of the scene.

Figure 22E:
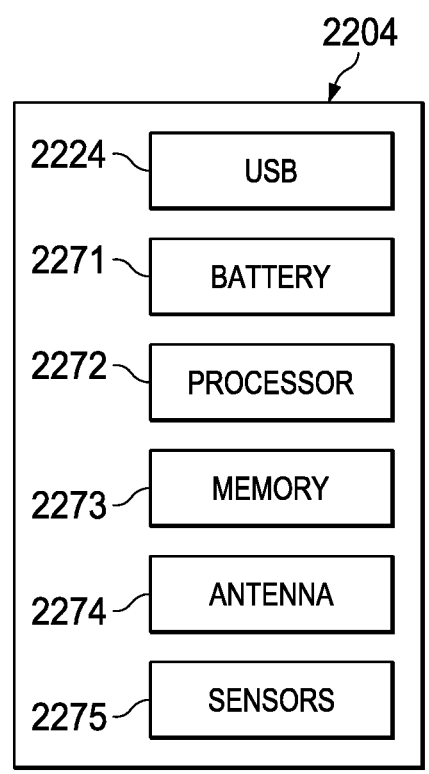
FIG. 22E is a diagram of a positioning detector in a preferred embodiment.

Referring to FIG. 22E, positioning detector 2204 includes USB port 2224, battery 2271, processor 2272, memory 2273, antenna 2274, and sensors 2275, all operatively connected together. Processor 2272 executes instructions stored in memory 2273 that cause positioning detector 2204 to continuously measure its position and orientation using sensors 2275 and to broadcast its position and orientation using antenna 2274. In a preferred embodiment, positioning detector 2204 is a Vive Tracker manufactured by HTC Corporation. Positioning detector 2204 communicates over a short range wireless connection to the simulation computer through dongle 2109, as will be further described. In other preferred embodiments, the positioning detector can transmit a launch signal or a shot signal to the system computer, as will be further described.

Figure 23A:
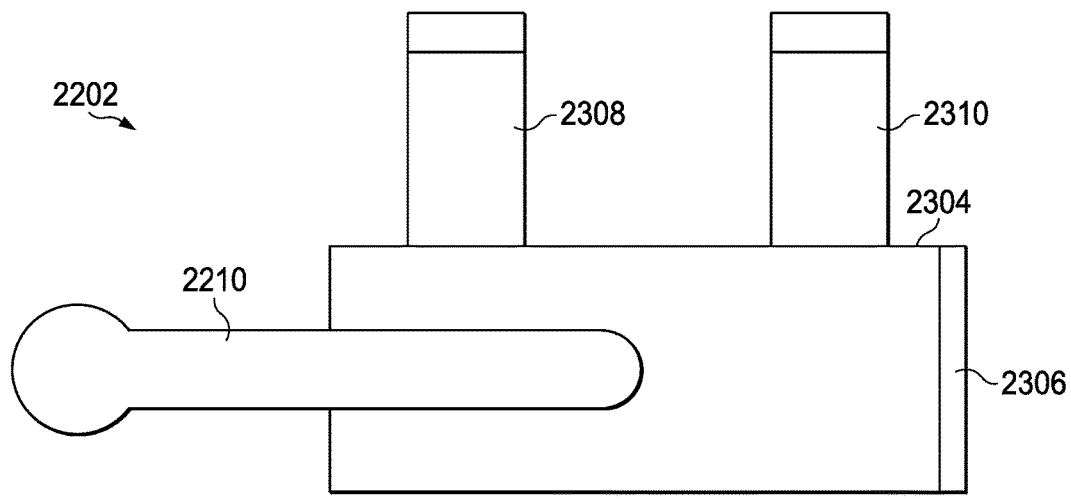
FIGS. 23A and 23B are diagrams of a trigger unit in a preferred embodiment.
Figure 23B:
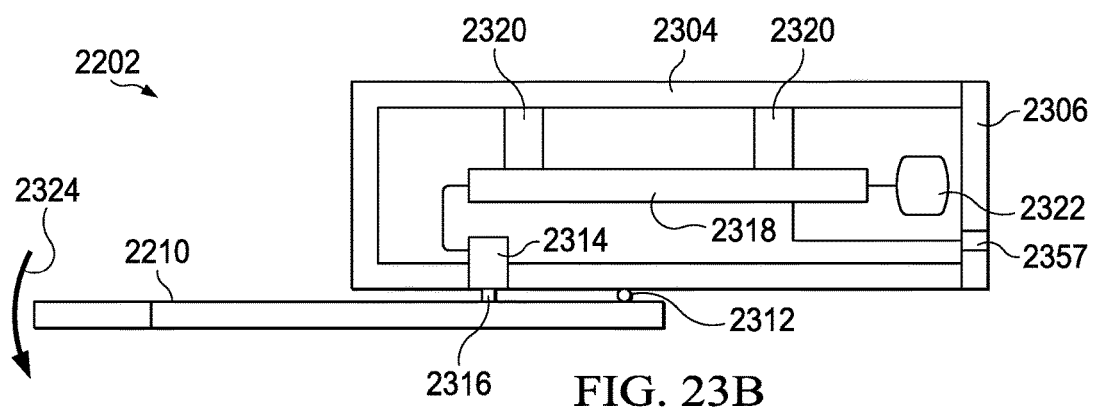

Referring to FIGS. 23A and 23B, trigger unit 2202 includes external case 2304 sealed by closure 2306. Barrel clamps 2308, and 2310 are rigidly attached to external case 2304. Barrel clamps 2308 and 2310 are adapted to connect with a standard picatinny or weaver rail mount system. Paddle 2210 is pivotally attached to the enclosure at hinge 2312. Switch 2314 is a spring loaded switch that is resident in external case 2304 and operatively connected to the paddle at pivot 2316. In a preferred embodiment, all the mechanical components of the trigger unit are formed of high impact plastic.

Processor board 2318 is centrally mounted in external case 2304 through standoffs 2320. Processor board 2318 is operatively connected to battery 2322 which powers its operation. Processor board 2318 is connected to switch 2314. Processor board 2318 also operatively connected to external USB port 2357. In use, paddle 2210 is deflected in direction 2324 thereby activating switch 2314. After deflection the spring loaded switch returns the paddle to its original position.

Figure 23C:
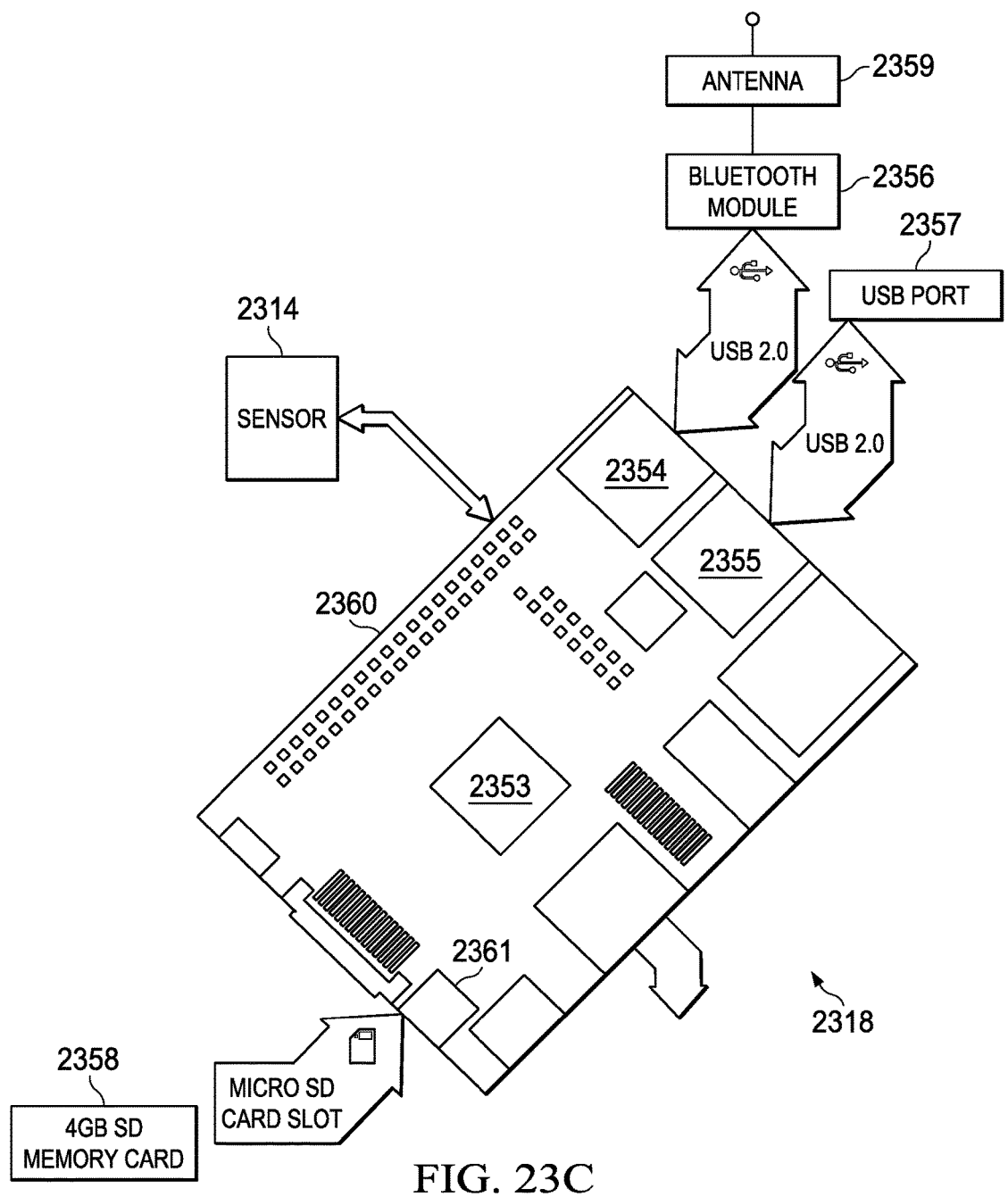
FIG. 23C is a diagram of a processor board of a trigger unit in a preferred embodiment.

Referring then to FIG. 23C, a preferred embodiment of the electronics of trigger unit 2202 is shown. Processor board 2318 is a Razberi Pi 3 Model B board available from digikey.com. Processor board 2318 includes processor 2353. In a preferred embodiment, processor 2353 is a Broadcom BCM 2837 1.2 GHz Quad-Core processor. Two USB ports 2354 and 2355 are included. USB port 2354 is connected to Bluetooth module 2356 which provides a short range wireless networking connection. The Bluetooth module in a preferred embodiment is Product ID 1327 Bluetooth 4.0 USB Module (v2.1 Back-Compatible) available from Ada Fruit at adafruit.com. The Bluetooth module includes antenna 2359.

Processor 2353 is connected to general purpose input output pins 2360, which are connected to switch 2314. In one embodiment, switch 2314 is normally an open contact switch that when closed, completes a circuit to provide current through one of the pins to be detected by processor 2353. Switch 2314 sends a signal to the processor which, in turn, sends a Bluetooth signal to the host computer, as will be further described.

Processor 2353 is connected to memory card 2358 via access slot 2361. Code resident on the memory card is used to boot the processor and perform the operations necessary to control its operation, as will be further described.

FIGS. 24A, 24B, 24C, and 24D show alternate embodiments of mechanisms for attachment of the positioning detector to the barrel of the weapon.

Figure 24A:
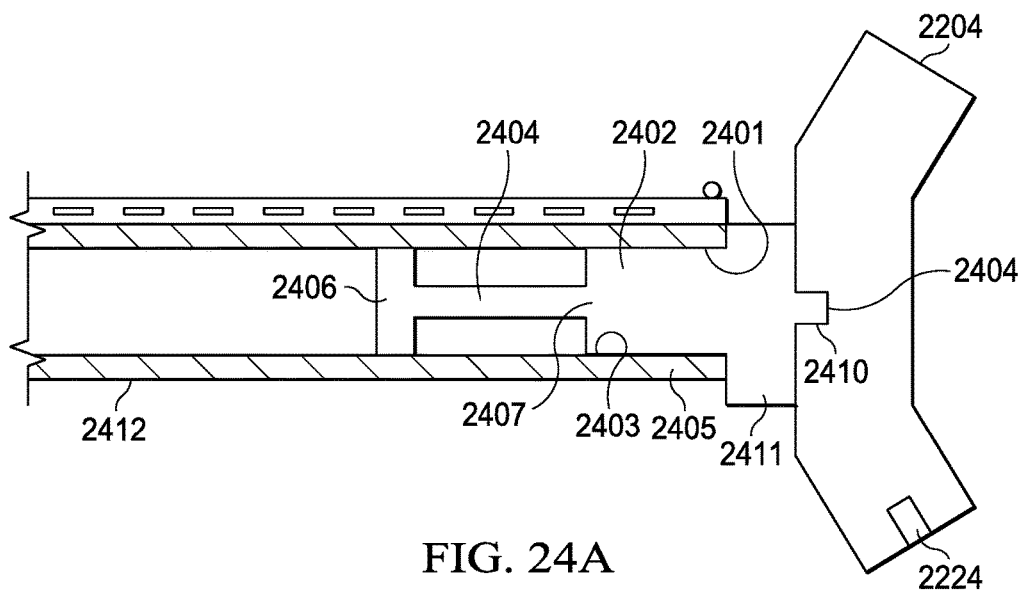
FIGS. 24A and 24B are diagrams of a mounting arbor in a preferred embodiment.
Figure 24B:
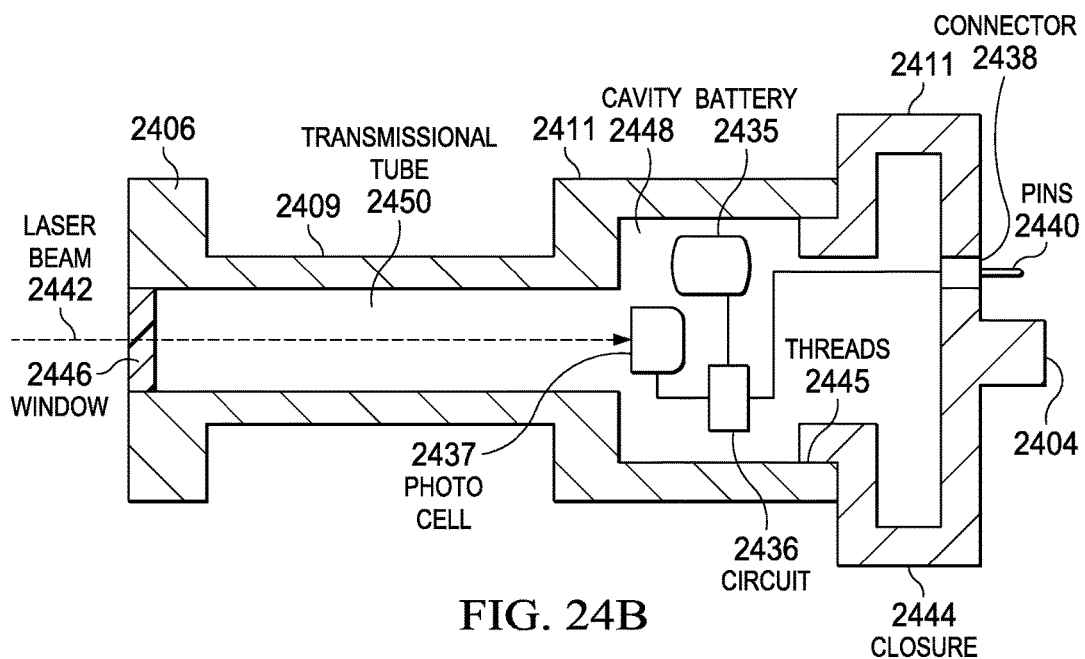

Referring to FIGS. 24A and 24B, mounting arbor 2402 is positioned within muzzle 2401 of barrel 2412. Mounting arbor 2402 includes threads 2403 designed to fit choke threads 2405. Mounting arbor 2402 includes rigid extension 2404. Positioning detector 2204 is fitted to the rigid extension 2404 with receiver 2410. Mounting arbor 2402 also includes stabilizer 2406 connected to arbor body 2407 by standoff 2409. Arbor body 2407 includes rubberized grip cylinder 2411.

In a preferred embodiment, arbor body 2407 is formed of a durable plastic. Arbor body 2407 further includes removable closure 2444. In a preferred embodiment, the removable closure is connected to the arbor body with a suitable set of mating threads 2445. Arbor body 2407 includes window 2446. In a preferred embodiment, window 2446 is a ruby crystal. In a preferred embodiment, the window may be a transparent plexiglass capable of transmission of radiation in the 650 nanometer range.

Arbor body 2407 includes transmission tube 2450 adjacent window 2446. Transmission tube 2450 terminates in cavity 2448. Cavity 2448 includes standoffs (not shown) capable of supporting internal circuitry.

Cavity 2448 encloses photo cell 2437, circuit 2436, and battery 2435. Removable closure 2444 includes push pin connector 2438 and connector pins 2440. Photo cell 2437 is connected to circuit 2436 and generates a current based on incident laser beam 2442. Circuit 2436, in a preferred embodiment, forms a commonly known transistor amplifier, which uses current from the battery to amplify the signal from the photo cell and transmit it to connector 2438. The signal generated by the circuit is received by positioning detector and used for operation of the simulation, as will be further described.

In use, the mounting arbor is threaded into the muzzle of the weapon using the rubberized grip cylinder. Laser beam 2442 from the electronic cartridge is incident on the photo cell during operation of the system. The photo cell sends a binary signal to connector 2438 and connective pins 2440 which, in turn, activate the positioning detector.

Figure 24C:
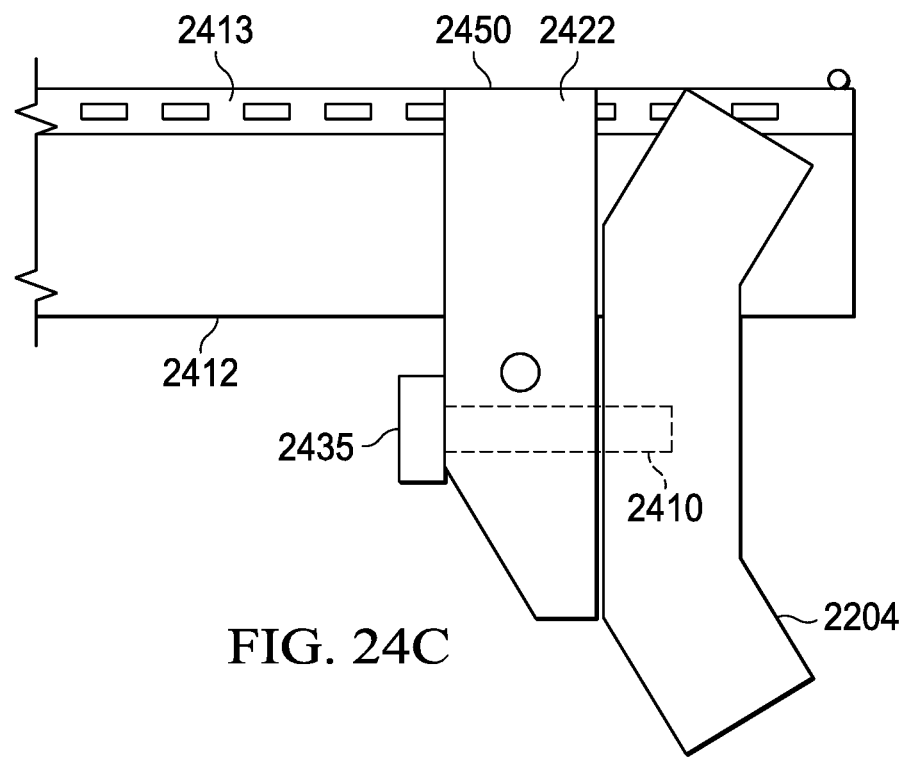
FIGS. 24C and 24D are diagrams of a barrel clamp in a preferred embodiment.
Figure 24D:
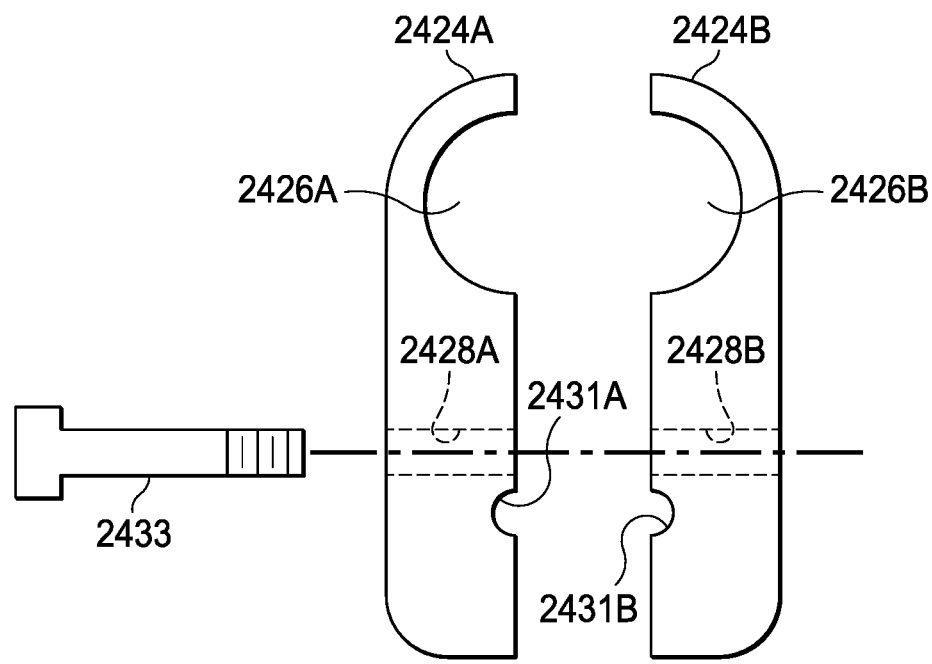

Referring then to FIGS. 24C and 24D, an alternate embodiment of transmission tube 2450 will be described. Barrel clamp 2422 includes mating sections 2424A and 2424B. The sections have mating semi-cylindrical cavities 2426A and 2426B. Section 2424A includes hole 2428A. Section 2424B includes threaded hole 2428B.

When assembled, section 2424A and 2424B are fitted around barrel 2412 and into engagement with picatinny rail 2413. Bolt 2433 is positioned through hole 2428A and threaded into hole 2428B. Bolt 2435 is positioned in the hole formed by cavities 2431A and 2431B and threaded into receiver 2410. In this way, positioning detector is held securely adjacent the barrel of the weapon. The placement of the positioning detector below the barrel allows live rounds to be fired from the weapon for practice shooting in combination with the simulation system.

Referring to FIGS. 25A, 25B, 25C, and 25D, several embodiments of the electronic cartridge component will be described.

Figure 25A:
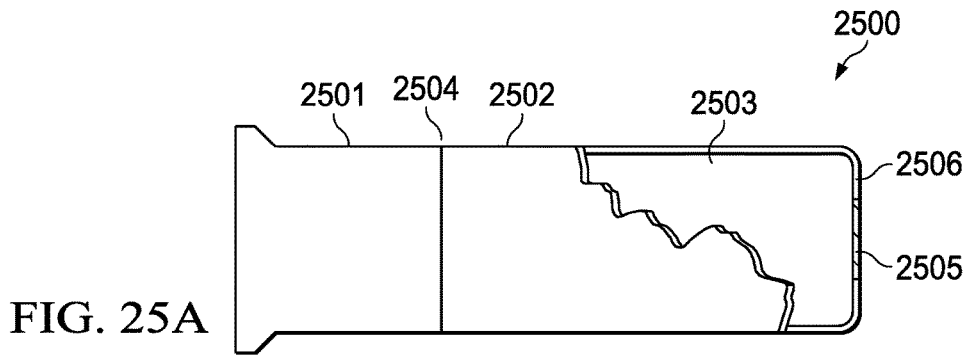
FIGS. 25A through 25D are diagrams of electronic cartridges in preferred embodiments.

Referring to FIG. 25A, the generalized exterior of electronic cartridge 2500 of each embodiment includes rim section 2501 and a shell case section 2502. The rim section and shell case form a hollow central chamber or cavity 2503 used for placement of electronic components. The two sections are joined by a threaded connection 2504 and may be disassembled to service interior components. In a preferred embodiment, the rim section and shell case are formed of a high impact plastic, such as polycarbonate or nylon. Generalized exterior of electronic cartridge 2500, in one preferred embodiment, includes a ruby window 2505 imbedded in shell case section 2502 at crimped end 2506. Other transparent plastics may be used. The window is graded to transmit radiation in the 650 nanometer range. In general, chambering electronic cartridge 2500 during operation of the simulation prevents the accidental discharge of a live round.

Figure 25B:
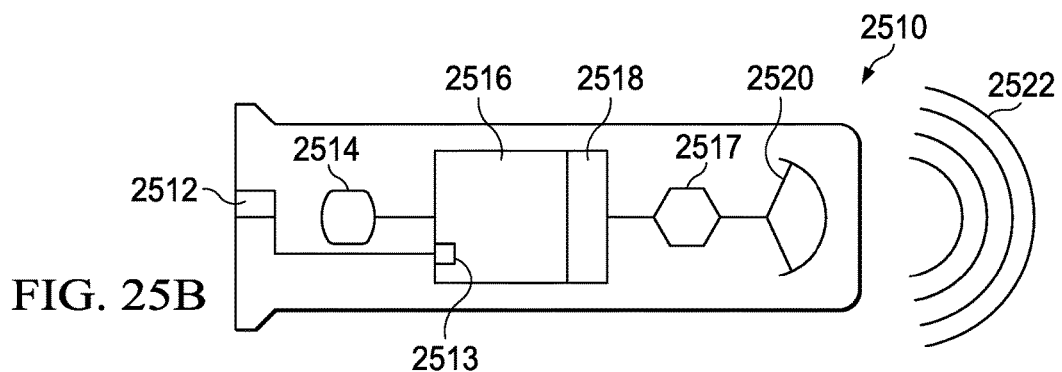

Referring to FIG. 25B, one embodiment of the electric cartridge is described.

Electronic cartridge 2510 includes cylindrical micro switch 2512. Micro switch 2512 is centrally located in the rim section at the position of a primer. In a preferred embodiment, the micro switch is part no. EGT12, N12 available from Euchner. Micro switch 2512 is connected to I/O pin 2513 of processor 2516. In a preferred embodiment, processor 2516 is a Razberi pi zero, machined to fit within cavity 2503. Processor 2516 is operatively connected to battery 2514. Processor 2516 is operatively connected to onboard memory 2518. Processor 2516 is operatively connected to Bluetooth module 2517. Bluetooth module 2517 is operatively connected to antenna 2520. In a preferred embodiment, Bluetooth module 2517 is the Arduino cc2541 Bluetooth 4.0 BOE data transmission module compatible with Razberi pi, available from newegg.com.

In operation, processor 2516 is booted by and receives instructions from onboard memory 2518. Once booted, the processor enters a wait state waiting for a closure signal from micro switch 2512. Micro switch 2512 generates a closure signal when impacted by the hammer of the weapon upon an actual trigger pull by the user. Once the signal is received, the processor activates Bluetooth module 2517 which sends a signal 2522 via antenna 2520, to wireless interface 2108.

Figure 25C:
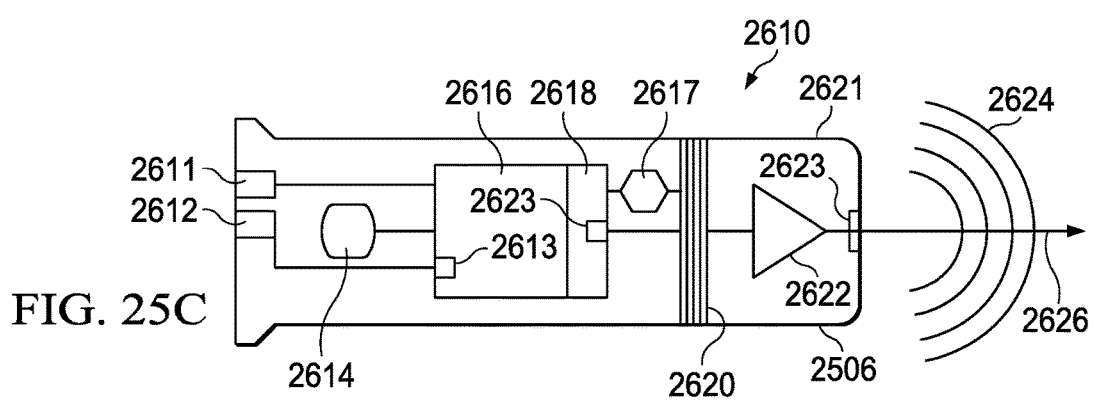

Referring to FIG. 25C, an alternate embodiment of the electronic cartridge 2610 will be described. Electronic cartridge 2610 includes centrally positioned cylindrical micro switch 2612, as previously described. The micro switch is connected to IO port 2613 of processor 2616, as previously described. Processor 2616 includes memory 2618 which provides boot-up and operating instructions on board. Processor 2616 is powered by battery 2614 as previously described. Processor 2616 is connected to Bluetooth module 2617 as previously described. Bluetooth module 2617 is connected to cylindrical Bluetooth antenna 2620. In this preferred embodiment, Bluetooth antenna 2620 is integrally constructed with the shell case section 2502 in a cylindrical pattern to direct radiation towards crimped end 2506. Bluetooth antenna 2620 produces Bluetooth signal 2624, upon receipt of a signal from processor 2616, as previously described.

Electronic cartridge 2621 includes micro slide switch 2611 connected to processor 2616. The micro slide switch activates the processor and the functions of the cartridge.

Processor 2616 is also connected to laser diode 2622 via IO port 2623. In a preferred embodiment, the laser diode is a 5 milo watt 650 nanometer red laser product ID 1054 available from adafruit.com. In this and other preferred embodiments, the laser diode can take the form of an infrared LED and the various windows are designed to transmit the LED light signal.

In operation, micro slide switch 2611 is activated by the user, then the electronic cartridge is chambered. The micro switch sends a signal to processor 2616, which in turn activates laser diode 2622. Upon activation laser diode 2622 produces laser radiation or beam 2626 which is directed coaxially to the barrel of the weapon. In further operation, when the trigger of the weapon is pulled, the hammer (not shown) impacts the cylindrical micro switch 2612 which sends a signal to processor 2616, producing Bluetooth signal 2624, as previously described.

Figure 25D:
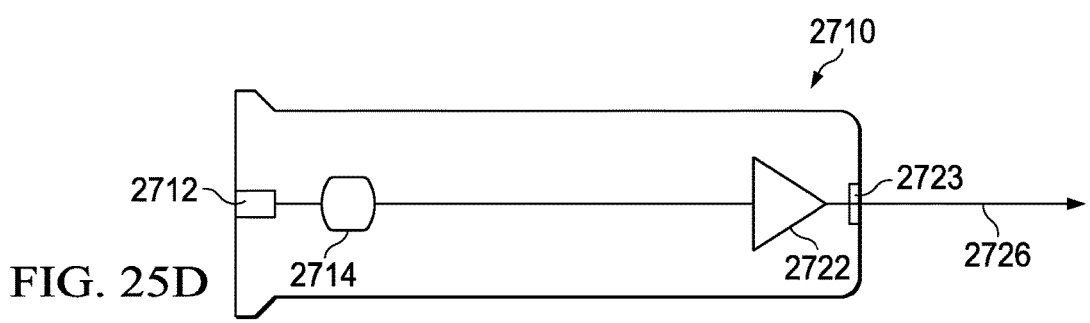

Referring to FIG. 25D, another embodiment of electronic cartridge 2710 is described. Electronic cartridge 2710 includes micro slide switch 2712 in the rim section of the cartridge. The micro slide switch is operatively connected to battery 2714. Battery 2714 is operatively connected to laser diode 2722. In another preferred embodiment, the laser diode may take the form of an infrared LED. Moving the slide switch to the "on" position activates the laser diode. When activated, the laser diode emits laser beam 2726 directed through ruby window 2723. After activation, the electronic cartridge is chambered in the weapon. In a preferred embodiment, laser beam 2726 is coaxial to the barrel of the weapon.

Figure 25E:
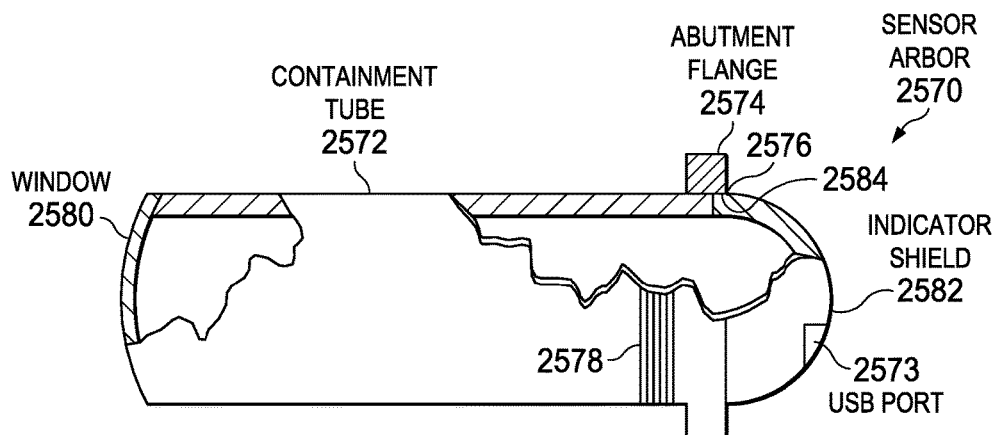
FIGS. 25E and 25F are diagrams of a sensor arbor in a preferred embodiment.
Figure 25F:
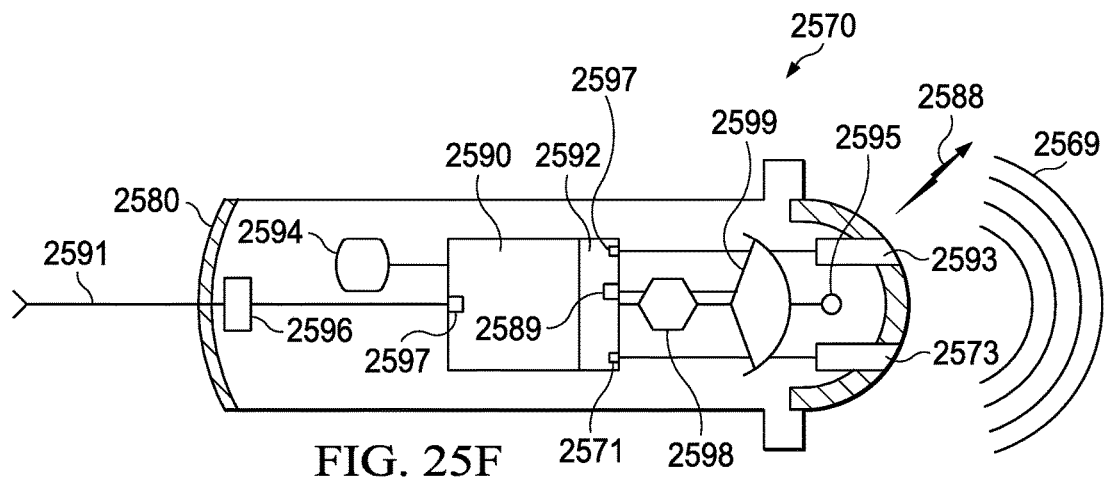

Referring to FIGS. 25E and 25F a preferred embodiment of sensor arbor 2570 will be described. Sensor arbor 2570 is comprised of a containment tube 2572. Containment tube 2572 is preferably construed of an aluminum alloy but also can be constructed of a rigid plastic such as polypropylene or delrin. Containment tube 2572 includes abutment flange 2574. In a preferred embodiment abutment flange 2574 is integrally formed with containment tube 2572. Containment tube 2572 is cylindrical and has the dimensions sufficient to allow placement within the muzzle of a standard 12-gauge shotgun. Other diameters may be used. Abutment flange 2574 includes interior threads 2576. Adjacent abutment flange 2574 on containment tube 2572 are retaining threads 2578. Retaining threads 2578 are arranged to mate with choke threads (not shown) in a standard 12-gauge shotgun. Window 2580 is affixed to containment tube 2572 with a suitable epoxy adhesive. Window 2580 in a preferred embodiment is plexiglass. In alternative embodiments, it may be ruby crystal. Containment tube 2572 is configured to receive indicator shield 2582. Indicator shield 2582, in a preferred embodiment, is a hemispherical frosted plexiglass material, which is translucent. Indicator shield 2582 includes threads 2584. Threads 2584 sized to mate with threads 2576 and hold indicator shield 2582 in place in containment tube 2572. Indicator shield 2582 includes rectangular USB ports 2573 and 2593. The USB ports are operatively connected to connectors 2571 and 2597, respectively.

Referring to FIG. 25F, sensor arbor 2570 includes processor 2590. Processor 2590 is functionally collected to memory 2592. In a preferred embodiment, processor 2590 is a Razberi zero, as previously described. Memory 2592 includes instructions to boot the processor and operate the functions of the sensor arbor when in use in the system. Battery 2594 is connected to processor 2590 and supplies operational power for the functions of the device. Photo sensor 2596 is centrally located within the sensor arbor and positioned adjacent window 2580. Photo sensor 2596, in a preferred embodiment, is the four wire light sensor module available from Uugear and is compatible with the Razberi zero. Photo sensor 2596 is connected to processor 2590 through IO connector 2597. Processor 2590 is also connected to Bluetooth module 2598. A preferred embodiment, Bluetooth module 2598 is the Arduino cc2541 Bluetooth 4.0 BOE data transmission module available from newegg.com. Bluetooth module 2598 is connected to antenna 2599. Processor 2590 is also connected to indicator LED 2595 at input output data port 2589.

In use, the sensor arbor is threaded into the muzzle of the weapon using threads 2578. Abutment flange 2574 is held in place against the outside of the muzzle. USB port 2593 is connected to the positioning detector through a USB cable (not shown). USB port 2573 is connected to sensor thimble

2560 through a USB cable (not shown). Laser radiation 2591 from the electronic cartridge is incident on photo sensor 2596 during operation of the system. Photo sensor 2596 sends a first signal to the processor which, in turn, activates a status indicator signal 2588 created by LED 2595. The status signal can be seen through the translucent indicator shield indicating the status of the system to the user or other observers. The processor also sends an activation signal to the positioning detector through USB port 2593.

In response to a second signal from USB port 2573, processor 2590 activates Bluetooth module 2598 and transmits a signal 2569 through antenna 2599. In a preferred embodiment, the Bluetooth signal is received by the system computer and translated into system instructions. In an alternate embodiment, in response to the second signal, processor 2590 transmits a signal to the positioning detector through USB port 2593. In this embodiment, the positioning detector then sends a third corresponding signal to the system computer.

In another preferred embodiment, upon receipt of the second signal from the USB port, processor 2590 also sends different signals to LED 2595 causing it to illuminate red. In this way, in one embodiment, the indicator shield indicates a "ready" signal in green and a "shots fired" signal in red.

Figure 25G:
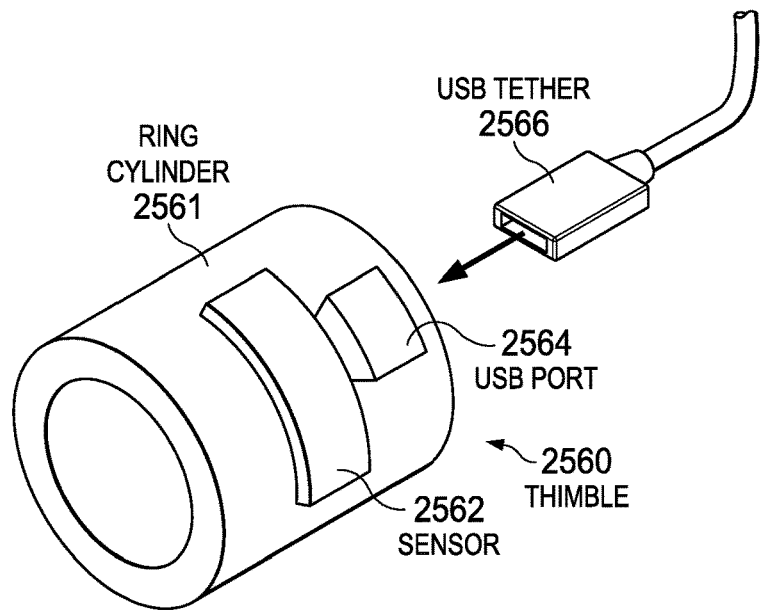
FIG. 25G is a diagram of a sensor thimble in a preferred embodiment.

Referring to FIG. 25G, a preferred embodiment of sensor thimble 2560 is described. Sensor thimble 2560 includes ring cylinder 2561. In a preferred embodiment, ring cylinder 2561 is stainless steel. Attached to the exterior surface of ring cylinder 2561 is sensor 2562. Sensor 2562, in a preferred embodiment, is flexible pressure sensor part number SEN09375 available from Karlsson Robotics. The sensor can detect an impact of anywhere between 100 grams and 10 kilograms. In another preferred embodiment, sensor 2562 includes a photo emitter and a photo sensor combination, controlling circuits and a power supply, which enables the sensor to detect the proximity of the ring to a metallic object (such as a trigger).

Sensor 2562 is mechanically connected to the exterior surface of ring cylinder 2561 with an epoxy or other suitable adhesive. Sensor 2562 is electrically connected to USB port 2564. USB port 2564 is mechanically attached to the exterior surface of ring cylinder 2561 with epoxy or another suitable adhesive. USB port 2564 is connected to USB tether 2566 through a removable connection. USB tether 2566 is also connected to USB port 2573 of sensor arbor 2570.

In use, ring cylinder 2561 is placed on the trigger finger of the user and connected to USB tether 2566. Sensor thimble 2560 is tapped on the trigger of the weapon one time to activate a target launch and a second time to simulate a trigger pull. In a preferred embodiment, the pressure exerted by the user on the thimble against the trigger of the weapon is sufficient to change the resistance in the sensor which is sensed by processor 2590. In response, the processor sends a Bluetooth signal through antenna 2599 to the wireless interface 2108 indicating that a sensor event has occurred, as will be further described.

Figure 26:
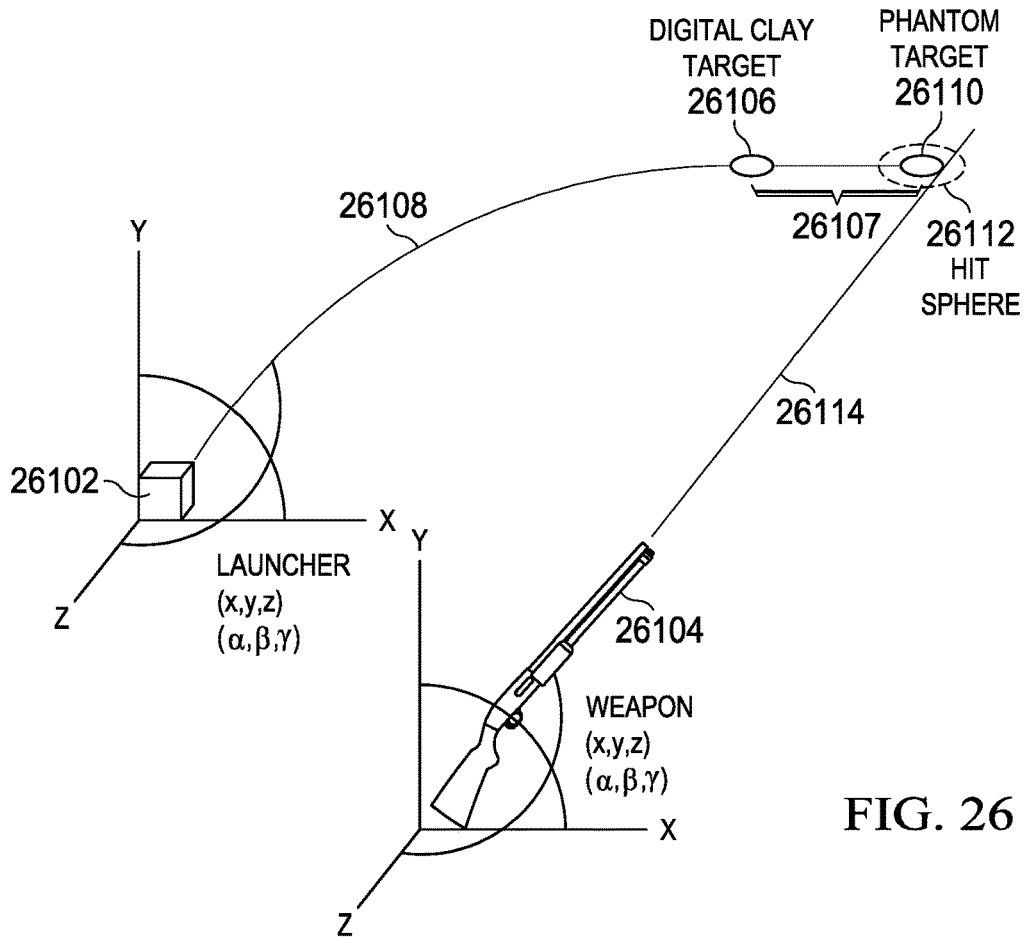
FIG. 26 is a diagram of a computer implemented method for determining a launcher location of a preferred embodiment.

Referring to FIG. 26, in use, the simulation system, generally, simulates launcher 26102 and digital clay target 26106. Launcher 26102 is located at a fixed position in the simulation and provides the starting trajectory for digital clay target 26106.

In the simulation, digital clay target 26106 is launched from the starting position and orientation of digital launcher 26102. Digital clay target 26106 travels along path 26108. In one embodiment, phantom target 26110 and hit sphere 26112 are collocated at the same point in the simulation. Phantom target 26110 and hit sphere 26112 lead digital clay target 26106 by the lead distance 26107, along path 26108.

When a trigger event occurs, the simulation program creates a "ray" object that starts at the muzzle of weapon 26104 and is coaxial to the central axis of the barrel. If ray 26114 intersects hit sphere 26112, then a determination is made by the simulation program as to whether or not a hit has occurred. A "hit" is determined based on the statistical likelihood of a hit based on the Gaussian distribution of pellets in a typical spread pattern for the type of ammunition chosen in the simulation, as will be further described. The Gaussian distribution of pellets is also referred to as a shot distribution probability. The diameter of the hit sphere is also determined by the Gaussian distribution of pellets, as will be further described. In a preferred embodiment, the hit sphere is three standard deviations of the pellet spread.

Figure 27:
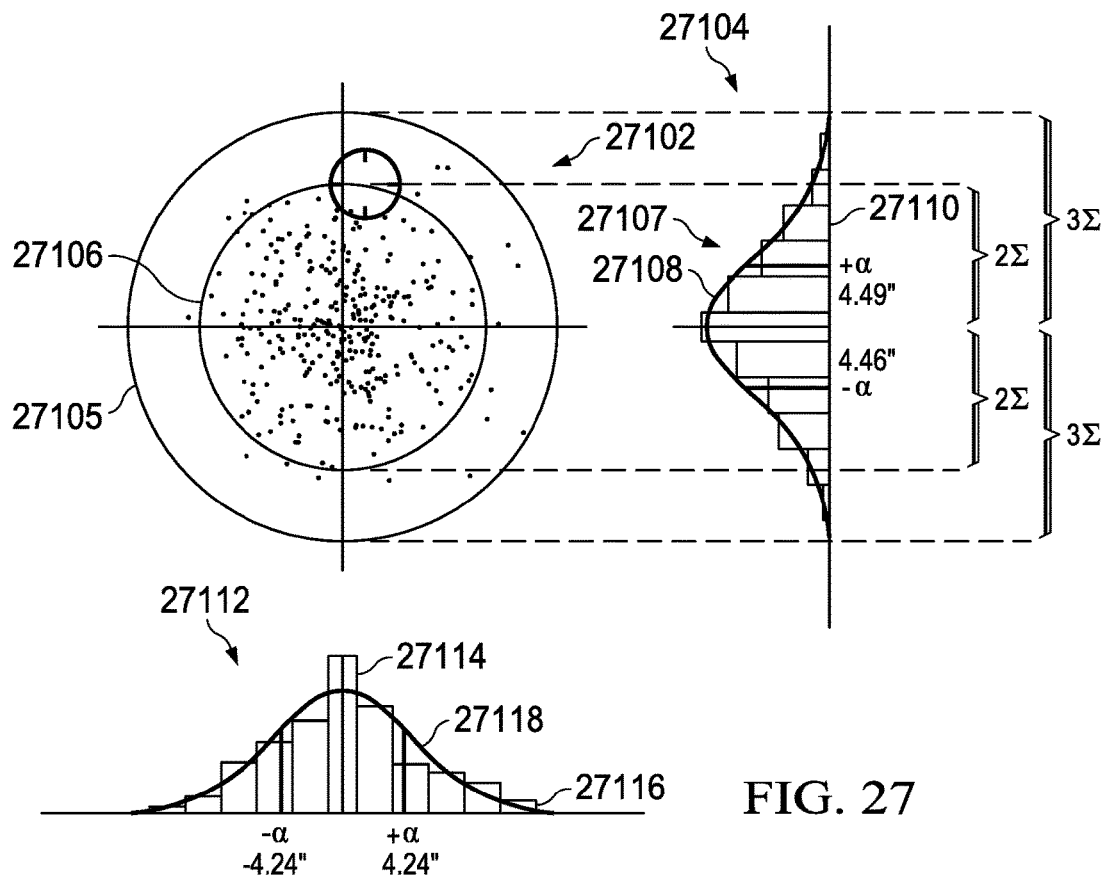
FIG. 27 is a diagram of graphs of a pellet spread of a preferred embodiment.

Referring to FIG. 27, the Gaussian distribution of pellets for a standard 12-gauge round at a target distance of 70 feet, as used in the simulation, is described. Spread pattern 27102 shows a particular spread pattern for a 12-gauge round. Spread patterns have different characteristics depending on pellet count, powder charge, weapon gauge, pellet size, and barrel length and distance to target.

Graph 27104 shows that the vertical distribution of pellets and obeys a standard Gaussian distribution. Similarly, graph 27104 shows that the horizontal distribution of pellets and obeys a standard Gaussian distribution. Each graph changes as a function of distance to target. As expected, the standard deviation distance increases with distance to target.

In this example, graph 27104 includes histogram 27107, normal distribution 27108, and standard deviation ($\sigma$) 27110. Histogram 27107 shows that highest concentration of pellets are in the center of the spread pattern 27102. Standard deviation 27110 is located at 4.49 inches away from the center for the vertical axis.

In this example, graph 27112 analyzes the horizontal spread of pellets with histogram 27114 and normal distribution 27116. Standard deviation 27118 is 4.24 inches for graph 27112, indicating that there is a tighter spread along the horizontal axis. There is a larger concentration of pellets in the central bucket of the histogram, as compared to graph 27104, which correlates with standard deviation 27118 being smaller than standard deviation 27110.

Ellipse 27105 identifies a boundary of spread pattern 27102 that is three standard deviations away from the center of the spread. The boundary of spread pattern 27102 that is two standard deviations away from the center of the spread is identified by ellipse 27106.

Figure 28A:
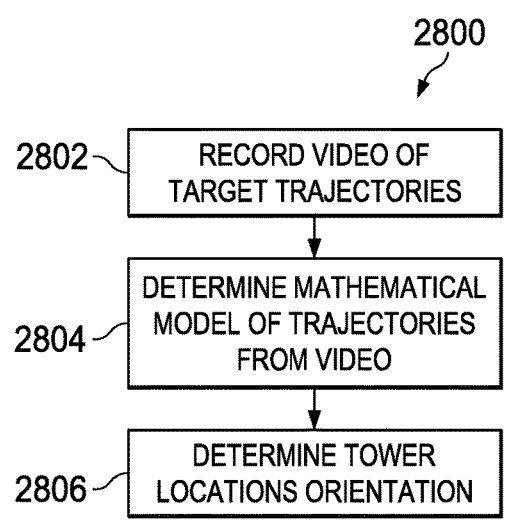
FIG. 28A is a diagram of a computer implemented method for simulating digital clay targets of a preferred embodiment.

Referring to FIG. 28A, method 2800 is used to determine the location of a simulated launcher in a clay shooting field and a set of trajectories for the digital clay targets used for the simulation.

At step 2802, several trajectories of actual clay targets are recorded by the video cameras as they are launched from actual towers at the clay shooting field. The cameras are placed at known GPS positions to record the flight path of a clay target for each tower and for each possible trajectory for a target from each tower. Additionally, measurements of windage, humidity, temperature, and barometric pressure can be recorded for use by the simulation.

At step 2804, the speed and trajectory of a clay target is determined from the video provided by the cameras. A mathematical model of each trajectory, of each target, from each tower is created by the simulation program, as will be further described. From these models the position of the target can be calculated and displayed relative to the tower as a function of time. However, slight variations from the mathematical model are necessary to provide the virtual clay target with a more realistic trajectory and appearance. For example, wind gusts randomly raise and lower the clay above the perfect trajectory. Likewise variations in velocity can occur due to wind and humidity. To correct for these variations the path of the mathematical model is compared frame to frame to the video viewed from a position in the simulation that matches the position of the camera that took the video. The mathematical model is changed to account for the variations and stored in a combined trajectory file. Additional embodiments incorporate trajectory variations from atmospheric conditions and other forces acting on the target, such as drag and turbulence, into the mathematical models. The combined trajectory is stored as a file for use in the simulation engine.

In a preferred embodiment, the pure mathematical models are developed by a function of Unity 3D engine. For the digital clay target, a rigid body simulation object is created that includes the known quantities of the real life clay target, including, size, weight, launch angle, and launch velocity. Additional simulation parameters for the digital clay target are adjusted based on a comparison of the flight of the digital clay target compared with the real life video of the clay target. For example, the angular dampening of the digital clay target may be adjusted so that the digital clay target will stay aloft for about the same amount of time as a real clay target would stay aloft. To launch the digital clay target, a simulated force is applied to the digital clay target as soon as the digital clay target is instantiated into the simulation. From the initial parameters for the digital clay target, which includes the simulated force, the physics engine of the simulation system handles moving the digital clay target along a trajectory that approximates that of a real life clay target.

In another embodiment, the camera used to record the real clay target is a 360 degree camera, such as the Omni from GoPro, Inc. From this video, the position of the clay target is recorded and can used to adjust the mathematically generated model trajectory in the virtual or augmented reality simulation.

At step 2806, the location and orientation of each tower is determined and stored in the simulation program.

In a preferred embodiment, the tower locations are modeled and set by the unity 3D engine.

Figure 28B:
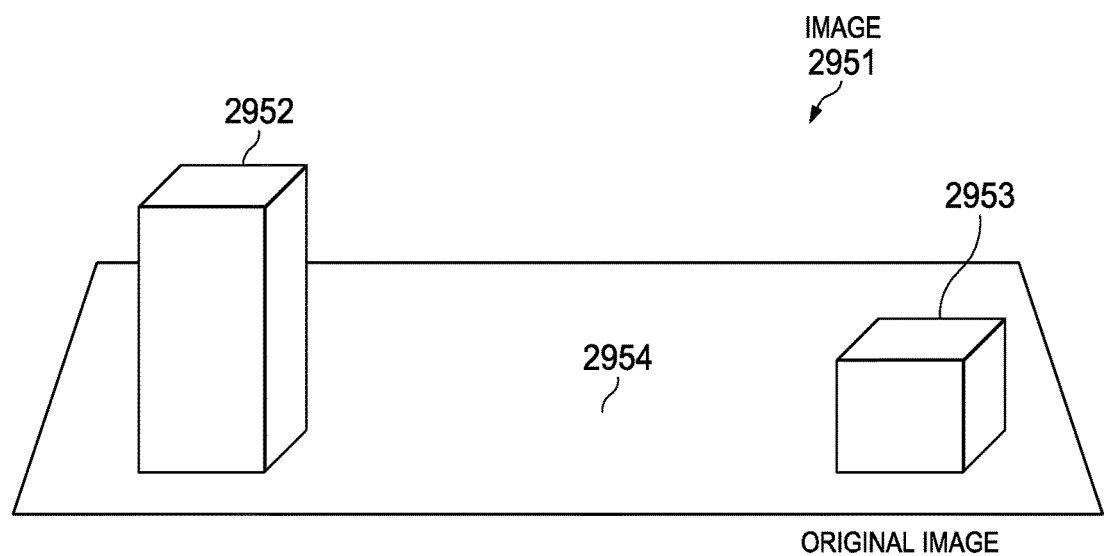
FIG. 28B is a diagram of an original image captured by an augmented reality system in a preferred embodiment.
Figure 28C:
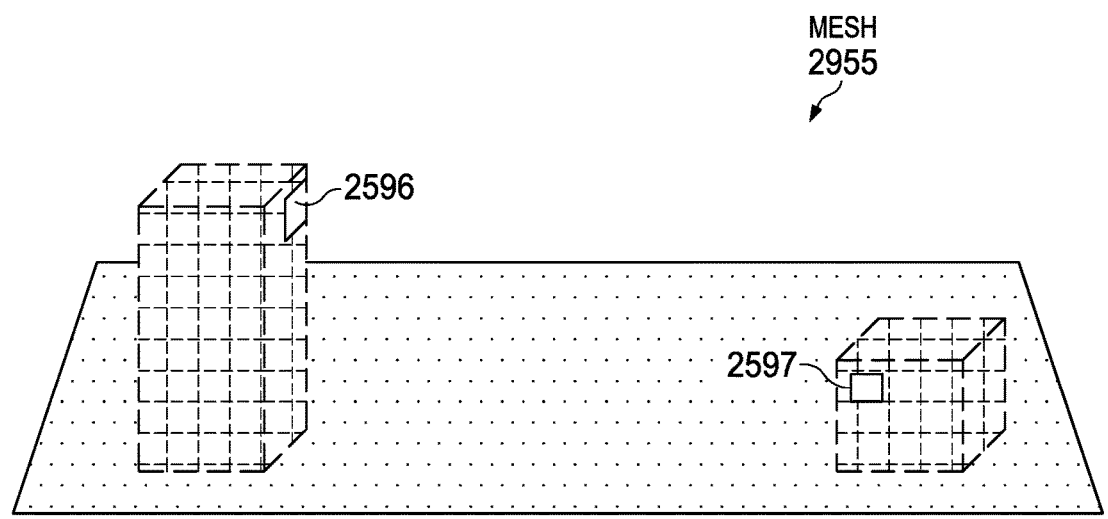
FIG. 28C is a diagram spatial map and anchors in an augmented reality system in a preferred embodiment.

Referring to FIGS. 28B and 28C, the registration of the launcher locations in the unity 3D engine is described. "Registration" of a point in a virtual reality space to a fixed point in the real world is typically accomplished by creating a virtual copy of the critical features of the real world in the unity 3D system. In one embodiment, the high house, the low house, and shooter pad locations are defined at predetermined measurements from a predefined common origin. The house dimensions are created with the "box" function in Unity 3D. The boxes each are defined with a virtual launch point that corresponds to the muzzle of the launcher in the real world. In a similar way, the locations of the shooter pads are measured in the real world and registered in the unity 3D engine.

"Registration" of a point in an augmented reality space to a fixed point in the real world is typically accomplished by an augmented reality camera such as that used in the Microsoft hololens. In this case, a "spacial anchor" is chosen. The spacial anchor is chosen from an array called a spatial map. The special anchor is chosen by calling a function known as "gaze ray". The gaze ray function returns a set of coordinates in the mesh that is then named and identified as the spacial anchor. For example, image 2951, from an augmented reality camera shows a high house 2952 and a low house 2953 in skeet field 2954. The Microsoft hololens system creates mesh 2955. Mesh 2955 is a three dimensional map of image 2951. The registration identifies spatial anchor 2596 at a location in the mesh that corresponds to the location of the high house. The registration identifies spatial anchor 2597 is at a location in the mesh that corresponds to the location of a launcher.

Figure 28D:
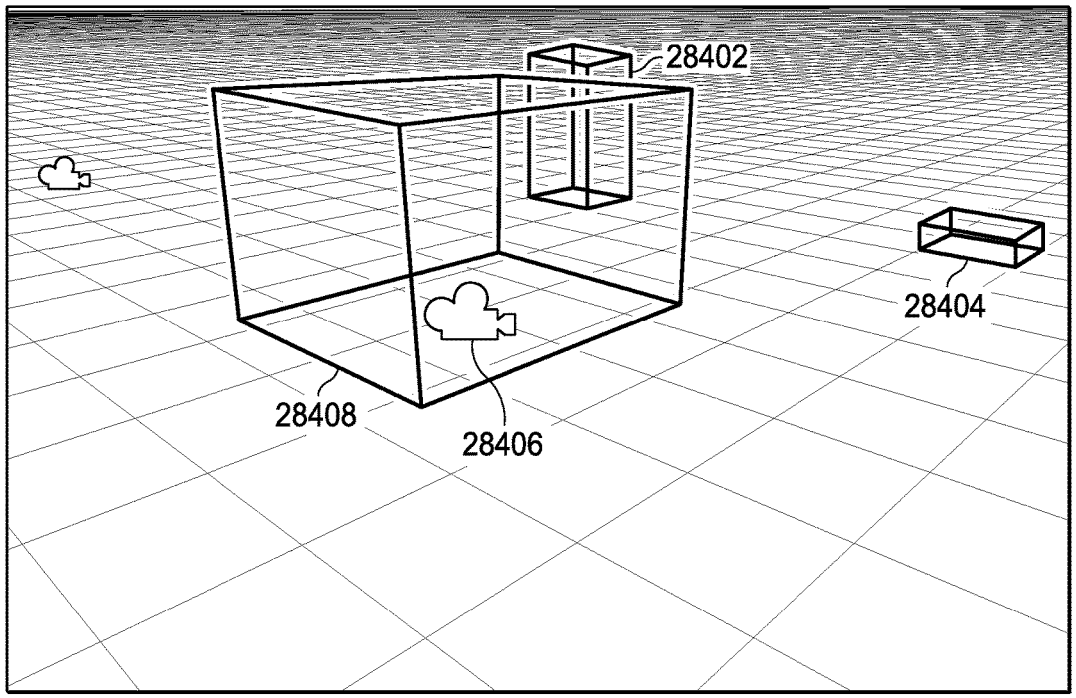
FIG. 28D is a diagram of a virtual reality simulation in a preferred embodiment.

Referring to FIG. 28D, a virtual reality simulation includes high house 28402 and low house 28404. Camera icon 28406 represents the current location of the user within defined space 28408. Defined space 28408 is the safe space inside of the simulation that corresponds to the safe space in real life where the user is experiencing the simulation.

Defined space 28408 has a specific origin and orientation. High house 28402 and low house 28404 are placed with respect to the origin and orientation of defined space 28408. Both high house 28402 and low house 28404 include launcher objects that are used for the launch of clay target objects in the simulation.

Figure 29A:
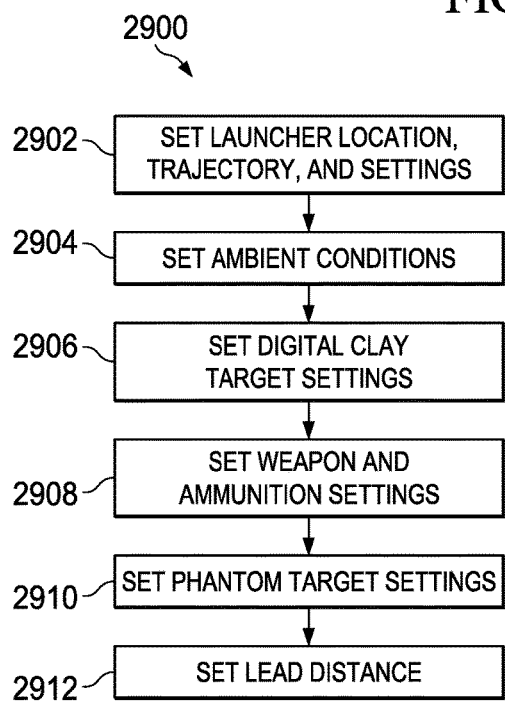
FIG. 29A is a diagram of initializing a computer implemented simulation of shooting a digital clay target.

Referring to FIG. 29A, method 2900 is shown. Method 2900, performed by a simulation computer, to create a virtual reality or augmented reality shooting simulation is described.

At step 2902, the location, orientation, and settings of a launcher are set. The location of each launcher includes Cartesian coordinates that identify where each launcher is placed in the simulation. The orientation of each launcher indicates the initial direction for the digital targets when launched, and is defined by three Euler angles. The Euler angles are unique for each trajectory model.

At step 2904, ambient conditions for the simulated environment are set, which include simulated windage, humidity, temperature, and barometric pressure. In one embodiment, the simulated environmental factors are set to match the environmental factors that existed when the cameras recorded the images of the actual clay target trajectories.

At step 2906, the settings of the digital clay target are selected. The settings include size, color, and mass. The settings are incorporated into the trajectory models.

At step 2908, weapon ammunition settings are selected. The ammunition types include those that are appropriate for the selected weapon. The ammunition settings determine the Gaussian distributions used by the simulation to determine the probability of a "hit" and the diameter of the hit sphere.

At step 2910, the phantom target settings are selected. The phantom target settings identify the color, transparency, and size of the phantom target. In a preferred embodiment, the phantom target is the same size as the digital clay target, but includes a different color and transparency in order to distinguish it from the digital clay target.

At step 2912, the lead distance is selected.

The lead distance is the linear distance between the location of the center of digital clay target and the location of the center of the phantom target. In a preferred embodiment, the lead distance is selected as a fixed distance, usually about three feet.

In an alternative embodiment, a lead time is selected and the lead distance is calculated based on velocity of the digital clay target. For example, the desired lead time is multiplied by the initial velocity of the digital clay target to calculate the lead distance.

Additionally, the lead time can be estimated using the known positions of the weapon and the digital clay target, the trajectory of the digital clay target, the velocity of the digital clay target, and the muzzle velocity for the selected weapon and ammunition type.

Figure 29B:
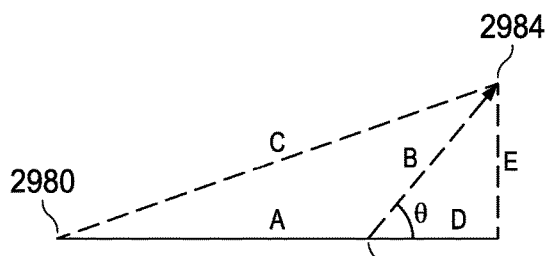
FIG. 29B is a diagram for calculating a lead distance.

Referring to FIG. 29B, $$A = x_{clay} - x_{weapon} \quad \text{Eq. 22}$$

$$B = v_{clay} \cdot t \quad \text{Eq. 23}$$

$$C = v_{muzzle} \cdot t \quad \text{Eq. 24}$$

$$D = B \cdot \cos\theta \quad \text{Eq. 25}$$

$$E = B \cdot \sin\theta, \quad \text{Eq. 26}$$

where:
- A is the line segment of known length between the weapon location 2980 and the digital clay target location 2982;
- B is the distance between the digital clay target location 2982 and the point of impact;
- C is the distance between the weapon location and the point of impact;
- θ is the angle between D and B.

and:

$$(A + v_{clay} \cdot t \cdot \cos\theta)^2 + (v_{clay} \cdot t \cdot \sin\theta)^2 = (v_{muzzle} \cdot t)^2 \quad \text{Eq. 27}$$

Solving for t yields an estimate of the time it will take a shot to reach point of impact 2984 from weapon location 2980 of the weapon, as follows:

$$t = \pm \frac{\sqrt{v_{muzzle}^2 - 4 \cdot A \cdot v_{clay} \cdot v_{muzzle} \cdot \cos\theta - 4 \cdot A^2 \cdot v_{clay}^2 \cdot \sin^2\theta} \pm v_{muzzle} \mp 2 \cdot A \cdot v_{clay} \cdot \cos\theta}{(2 \cdot v_{clay}^2 \cdot (\sin^2\theta + \cos^2\theta))} \quad \text{Eq. 28}$$

Other lead calculation equations may be used in other embodiments.

Figure 29C:
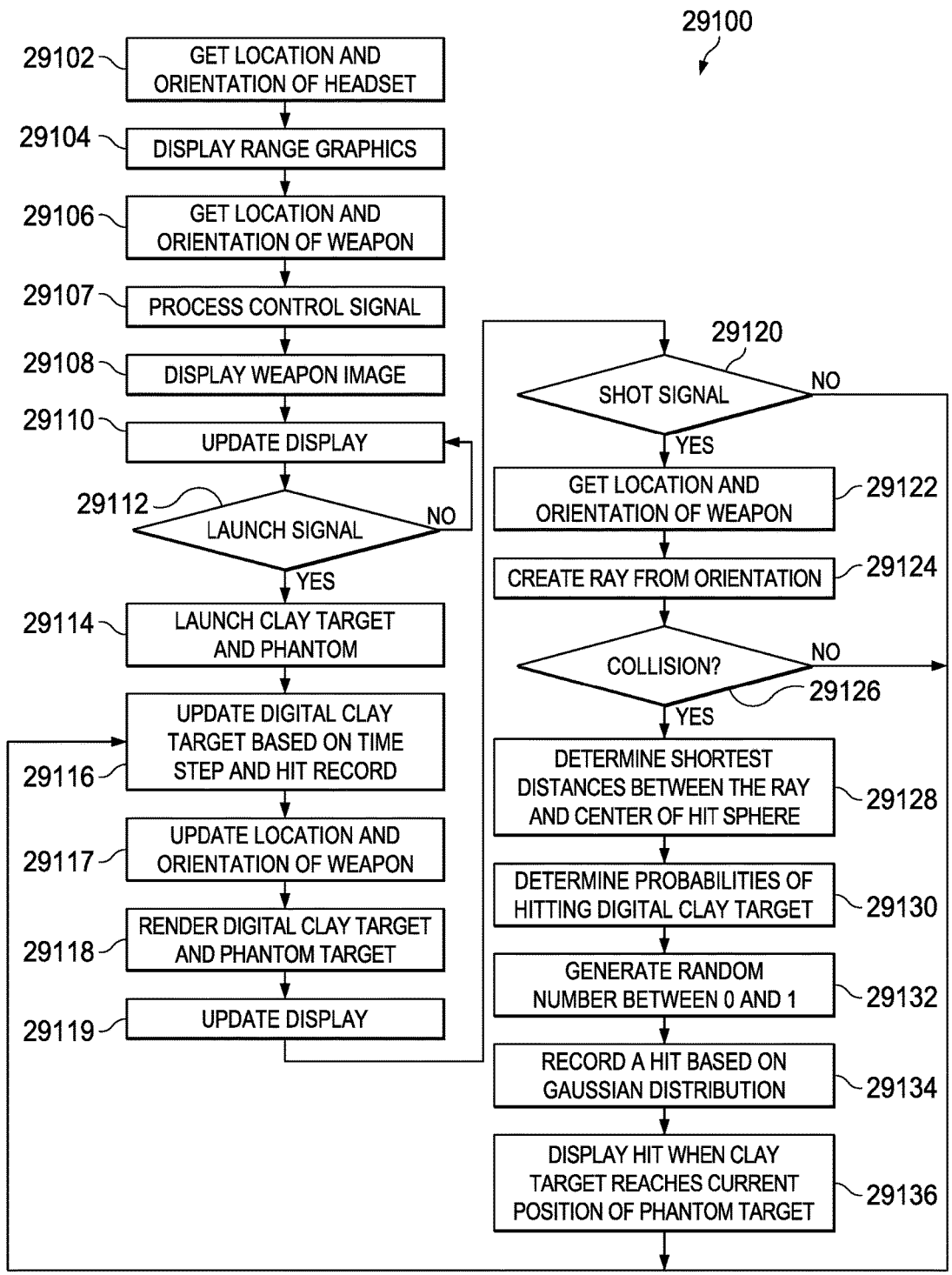
FIG. 29C is a diagram of an image from the system.

Referring to FIG. 29C, method 29100 of generating a simulation of the system is described.

At step 29102, the system obtains the location orientation of the headset from the headset object. In a preferred embodiment, the location is a set of Cartesian coordinates and the orientation includes an angle view.

At step 29104, the system displays range graphics as previously described. In a preferred embodiment of the virtual reality system, the range graphics include a virtual image of a high house and a virtual image of a low house in appropriate background imagery. In a preferred embodiment of the augmented reality system, the images of the high house and the low house are set to "invisible" because the actual high house and the actual low house are visible to the user through the transparent headset.

At step 29106, the system obtains the location and orientation of the weapon from the weapon object.

At step 29107, the system processes control signals received from a peripheral connected to the weapon. As is described in FIG. 31 below, the control signals allow for the user to launch a digital clay target, display a laser from the weapon, and turn the point of view left or right.

At step 29108, the system displays a weapon image if in virtual reality mode.

At step 29110, the system updates the display in the headset object. In the augmented reality system, the towers and launchers are not displayed (or displayed as "invisible") because they can be seen by the user through the transparent headset. In a virtual reality system or augmented reality system, where the real towers and launchers are not present, images of the towers and launchers may be displayed in the overlay.

At step 29112, the method checks for a launch event signal from the trigger object in the weapon object. In one embodiment, the system computer generates the launch signal automatically at predetermined time intervals. In other embodiments, the user generates the launch signal through use of the trigger unit on thimble, as will be further described, which is then posted by the trigger object. If no launch event signal is received, the method returns to step 29110. If a launch signal is received, the method moves to step 29114.

At step 29114, the virtual clay target object and the phantom target object are launched. The clay target object path is drawn from the modified trajectory recorded after manual manipulation based on camera recordings of the actual flight paths. The phantom target path is drawn from the virtual target path modified by a lead distance function, as will be further described. The simulation engine displays the clay target and the phantom target according to the positions assigned to the objects by the Unity 3D engine. The hit sphere object is instantiated, but invisible to the user. The phantom target is rendered as leading the digital clay target by a fixed distance set or calculated as previously described.

At step 29116, the position and status of the digital clay target object is updated based on the time step and hit record. Updating the position of the clay target object updates the position of the phantom target object and the hit sphere object. For each update the new position and orientation of the digital clay target are calculated from the trajectory model of the clay target.

At step 29117, the weapon position is updated based on measurements from the positioning detector on the weapon or based on the position information retrieved from the registration mark in the hololens system. The phantom target position is updated based on a new lead time or distance calculated from the updated positions of the digital clay target.

The size of the hit sphere is updated based on the current distance between the weapon and the digital clay target. The hit sphere is a mathematical construct centered at the centroid of the phantom target object. The hit sphere is used to determine a theoretical "hit" of the target by shot. In one embodiment, the radius of the hit sphere is equal to the pellet spread at the distance to target, for the chosen ammunition. In another embodiment, the hit sphere is an ellipsoid with the vertical radius based on the vertical shot spread and the horizontal axis based on the horizontal shot spread at the distance between the weapon and the centroid of the phantom target.

At step 29118, the digital clay target and the phantom target are rendered. The rendering is based on the updated positions of the digital clay target and the phantom target. The appearance of the clay target and the phantom target are conditioned on the predetermined settings.

At step 29119, the system updates the display showing the new position of the weapon, in the virtual reality mode.

At step 29120, the system determines whether or not a shot signal event has occurred. When the shot signal event has not occurred, the simulation returns to step 29116. When the shot signal event has occurred, the method proceeds to step 29122.

At step 29122, the current location and orientation of the weapon are retrieved from the weapon object. In one embodiment, the data is retrieved from a memory that stores the positioning data that is continuously broadcast by the positioning detector on the weapon. In another embodiment, the data is retrieved from a server that stores the positioning data that is derived by the observation of the registration structure on the weapon by the Microsoft hololens system.

At step 29124, a ray is created. The ray is a mathematical vector whose starting point is the end of the barrel of the weapon. The orientation of the ray is set to be coaxial with the axis of the barrel of the weapon. As a result, the ray always points the same direction as the weapon.

At step 29126, it is determined if there is a "collision" between the ray and the hit sphere. When there is no collision then the method returns to step 29116. When there is a collision, then the method proceeds to step 29128.

At step 29128, the shortest distance between the ray and the center of the hit sphere is determined. This distance is tangential to the ray and includes a horizontal component and a vertical component.

At step 29130, the probability of hitting the digital clay target is determined from the Gaussian pellet distribution at the time of collision. In one embodiment, the Gaussian pellet distribution may be calculated. Values from a cumulative distribution function for the normal distribution of the shot spread pattern are calculated using the equation:

$$CDF(x) = \int_{-\infty}^{x} \frac{1}{\sqrt{2\pi}\,\sigma} e^{-\left(\frac{(t-\mu)^2}{2\sigma^2}\right)} dt \qquad \text{Eq. 31}$$

where:
σ is the standard deviation of the spread pattern; and,
μ is the mean of the spread pattern, which is set to zero.

Using the cumulative distribution function, the hit probability is calculated in both the horizontal and vertical dimensions that are orthogonal to the direction of the weapon:

$$p_{horizontal} = CDF(x+r_x) - CDF(x-r_x) \qquad \text{Eq. 32}$$

$$p_{vertical} = CDF(y+r_y) - CDF(y-r_y) \qquad \text{Eq. 33}$$

where
$p_{horizontal}$ is the hit probability for the horizontal dimension;
$p_{vertical}$ is the hit probability for the vertical dimension;
x is the horizontal distance between the ray an the center of the hit sphere;
$r_x$ is the distribution hit radius for the horizontal dimension, which is calculated by multiplying the horizontal length of the digital clay target by the hit scaling factor;
y is the vertical distance between the ray an the center of the hit sphere; and,
$r_y$ is the distribution hit radius for the vertical dimension, which is calculated by multiplying the vertical length of the digital clay target by the hit scaling factor.

The "hit scaling factor" is set to 1 so long as the size of the digital clay target is the same as the actual clay target.

At step 29132, a random number for each dimension is generated between 0 and 1.

At step 29134, a hit is recorded based on the Gaussian pellet distribution when the random number for the horizontal dimension is less than the horizontal hit probability and the random number for the vertical dimension is less than the vertical hit probability. In one embodiment, steps 29128 through 29132 are bypassed and a hit is recorded when the ray collides with the phantom target.

At step 29136, after recording a hit, the system identifies the point of impact, which is the point on the path of the digital clay target where the hit will occur in the future. The three dimensional position of the point of impact is the current three dimensional position of the phantom target. When the digital clay target reaches the point of impact, the hit will be displayed as a rapid disassembly or explosion of the digital clay target. After step 29136, the method returns to step 29116, to continue updating the simulation of the digital clay target until it is destroyed or until the trajectory model intersects the horizon line.

Figure 29D:
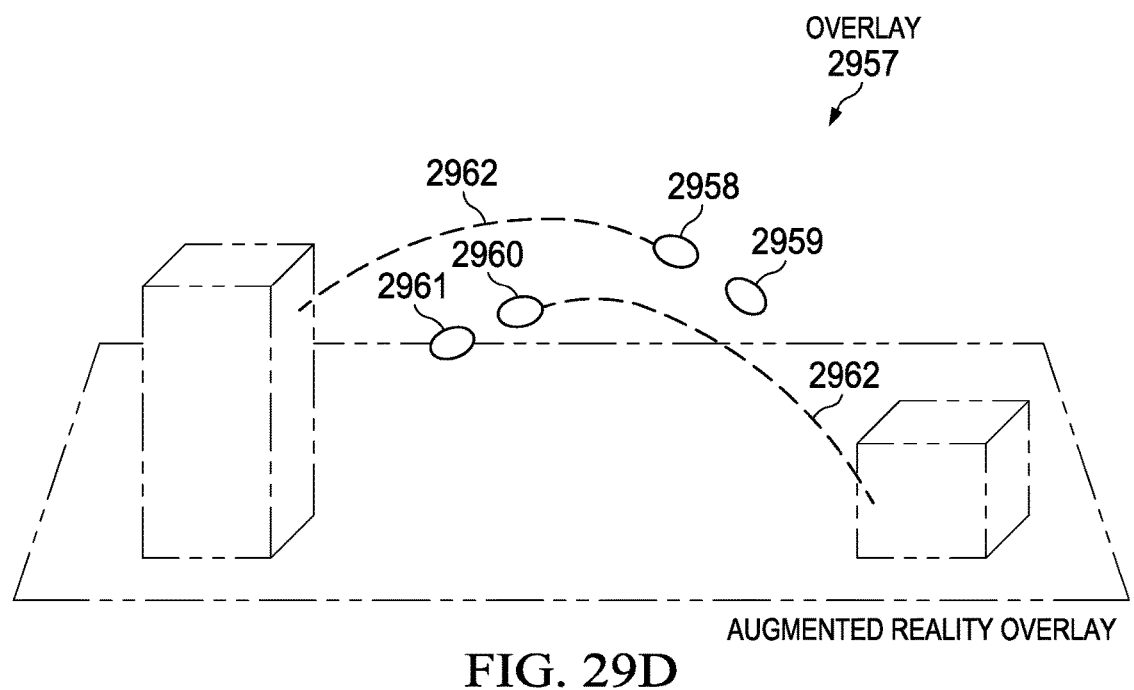
FIG. 29D is a diagram of a spatial map from the system.

Referring to FIG. 29D, an augmented reality overlay of the simulation resulting from method 2900 is described.

Overlay 2957 is an augmented reality overlay that includes digital clay target 2958, phantom target 2959, digital clay target 2960, and phantom target 2961. Digital clay target 2958 and phantom target 2959 follow path 2962 from the high house. Digital clay target 2960 and phantom target 2961 are displayed as being launched from the low house and follow path 2962.

Preferred embodiments of the launch signal event of step 2912 and the shot signal event of step 2920 will be further described here.

In one preferred embodiment, trigger unit 2202 is attached to the weapon. Processor 2353 of the trigger unit is programmed to generate a first wireless signal indicative of a launch signal upon a first contact of the user with paddle 2210. Processor 2353 is programmed to send a second, different wireless signal, indicative of a shot signal upon a second contact with paddle 2210. When used in conjunction with the barrel clamp mechanism of FIGS. 24B and 24C, a live round may be loaded into the chamber of the weapon and discharged by pulling the trigger. In this way, the augmented reality system can be used in conjunction with actual clay targets and live ammunition on an actual shooting field in order to alternate practice scenarios in real time.

In another embodiment, the trigger unit is attached to the weapon and the electronic cartridge of FIG. 25B is loaded into the chamber. In this embodiment, processor 2353 is programmed to send a wireless signal indicative of a launch signal to wireless interface 2108 upon a first contact with paddle 2210. Upon physical release of the hammer by the trigger of the weapon, the trigger impacts micro switch 2512 whereby processor 2516 sends a wireless signal indicative of a shot signal to wireless interface 2108.

In another embodiment, the sensor arbor of FIG. 25F is secured in the muzzle of the weapon. Micro slide switch 2611 of the electrical cartridge of FIG. 25C is activated thereby instructing processor 2616 to activate laser diode 2622. The electronic cartridge is then chambered in the weapon. Laser diode 2622 sends beam 2626 down the barrel of the weapon which is received by photo sensor 2596 of the sensor arbor. Upon receipt of the signal the processor activates LED 2595 to a "green" state thereby illuminating the indicator shield to indicate system ready.

Upon a trigger pull of the weapon, the hammer (not shown) impacts micro switch 2612 of the electronic cartridge. A signal generated by the micro switch is sensed by processor 2616. Upon sensing the signal, the processor is programmed to send a signal from the wireless interface of the electronic cartridge, indicative of a shot signal to wireless interface 2108. In an alternate embodiment, upon sensing the signal, the processor is programmed to change the signal sent by laser diode 2622 using a digital coding. When the digitally coded signal is received by photo sensor 2596 of the sensor arbor, processor 2616 activates Bluetooth module 2598 to send a shot signal 2569 from antenna 2599, to wireless interface 2108. At the same time, processor 2590 sends a second signal to LED 2595 to eliminate "red" indicating a live fire condition. In this embodiment, the launch signal is generated automatically without warning to the shooter.

In another embodiment, the electronic cartridge of FIG. 25D is activated and chambered in the weapon. The sensor arbor of FIG. 25F is secured in the muzzle of the weapon. Activation of the electronic cartridge is accomplished by moving micro slide switch 2712 to an "on" position. The micro switch thereby activates laser diode 2722. Laser diode 2722 generates beam 2726 which is incident upon photo sensor 2596. Photo sensor 2596 sends a signal to processor 2590 which activates LED 2595 to illuminate "green".

In another embodiment, the electronic cartridge of FIG. 25D is activated and chambered in the weapon. The mounting arbor of FIGS. 24A and 24B are secured in the muzzle of the weapon. Activation of the electronic cartridge is accomplished by moving micro slide switch 2712 to an "on" position. Micro switch thereby activates laser diode 2722. Laser diode 2722 generates beam 2726 which is incident upon photo cell 2437. Photo cell 2437 sends signal to connector 2438 and then to positioning detector 2204. Positioning detector 2204 then activates itself and sends a "ready" signal to dongle 2109. Dongle 2109 communicates the "ready" signal to system computer 2101.

Sensor thimble 2560 and USB tether 2566 are connected to USB port 2224 of positioning detector 2204. A first impact of the thimble on the trigger of the weapons sends a first signal to positioning detector which forwards it to the dongle and then on to the system computer. This first signal is interpreted as a "launch" signal. In the same way, a second impact of the thimble on the trigger of the weapon sends a signal to positioning detector which forwards it again to the dongle and the system computer. The second signal is interpreted as "shot" signal.

In this embodiment, sensor thimble 2560 is attached by USB tether 2566 to USB port 2573 of the sensor arbor. Upon impact of the ring cylinder against the trigger of the weapon, impact sensor sends a signal through USB tether 2566 to the sensor arbor. The signal is sensed first by processor 2590 which activates Bluetooth module 2598. Bluetooth module 2598 sends a wireless signal to wireless interface 2108, indicative of a launch signal. Upon a second impact of the ring cylinder on the trigger of the weapon, impact sensor 2562 sends a second signal through USB tether 2566 to USB port 2573. The signal is received by processor 2590 which sends a second signal to LED 2595 to eliminate "red" indicating a live condition. Processor 2590 also activates Bluetooth module 2598 to send a second different wireless signal to wireless interface 2108. The second wireless signal is indicative of a shot signal.

Figure 30:
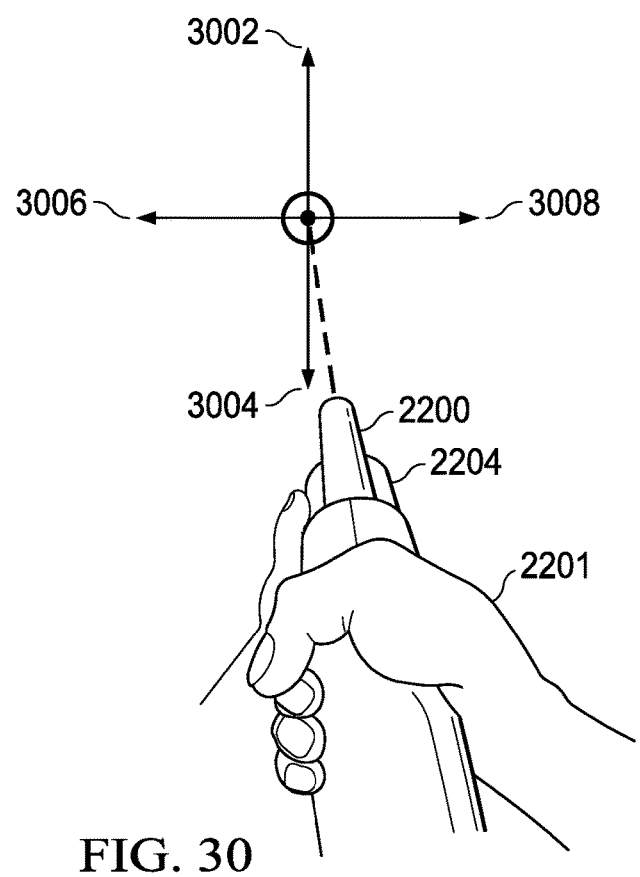
FIG. 30 is a diagram control movements in a preferred embodiment.

Referring to FIG. 30, weapon movements can be used in the place of controller movements. In a preferred embodiment, the hardware used in a virtual reality simulation includes weapon 2200, positioning detector 2204, and a sensor thimble (not shown) worn by user 2201. After a long press of the sensor thimble, directional movements of weapon 2200 are interpreted as controller commands or specific actions in the simulation, an example of which is shown in the table below.

| Direction | Action |
|---|---|
| Up 3002 | Launch target |
| Down 3004 | Laser toggle |
| Left 3006 | Turn point of view within simulation to the left |
| Right 3008 | Turn point of view within simulation to the right |

In preferred embodiment, a long or slow press by the sensor thimble uses a threshold duration of 0.5 seconds and the movement has a minimum threshold of 0.5 inches. After holding the sensor thimble down for 0.5 seconds and moving the end of the barrel of the weapon up 3002 by at least 0.5 inches, the system registers a launch target command, e.g., launch signal 29112, and will launch a target after a random delay of up to two seconds. A long press of the sensor thimble followed by a downward movement 3004 of the end of the barrel of weapon 2200 will toggle on or off the display of a laser that emanates from the end of weapon 2200 during the simulation and identifies the orientation of weapon 2200 in the simulation, such as one or more of beams 1906, 1912, 1916, 1920, 1924, 1928, 1932, and 1936 of FIG. 19. Moving the barrel left 3006 or right 3008 after holding the sensor thimble for a long press rotates the point of view of the user within the simulation left or right until the sensor thimble is released. Different movements, different actions, and different mappings between movements and actions can be used.

In an alternative embodiment, voice commands are used to perform the actions listed in the table above. For example, when the user says "pull!", the system recognizes the word, identifies that the word is mapped to the launch target action, and initiates launching the target based on the recognized voice command by activating the launch signal, such as in step 29112 of FIG. 29C. Additional voice commands can be mapped to the actions performed by the system and multiple voice commands can be mapped to the same action. The table below enumerates several voice commands that are mapped with system actions.

| Voice Command | Action |
|---|---|
| "Pull" or "Launch" | Launch target |
| "Toggle" | Laser toggle |
| "Turn left" or "Look left" | Turn point of view within simulation a fixed number of degrees to the left |
| "Turn right" or "Look right" | Turn point of view within simulation a fixed number of degrees to the right |

Figure 31:
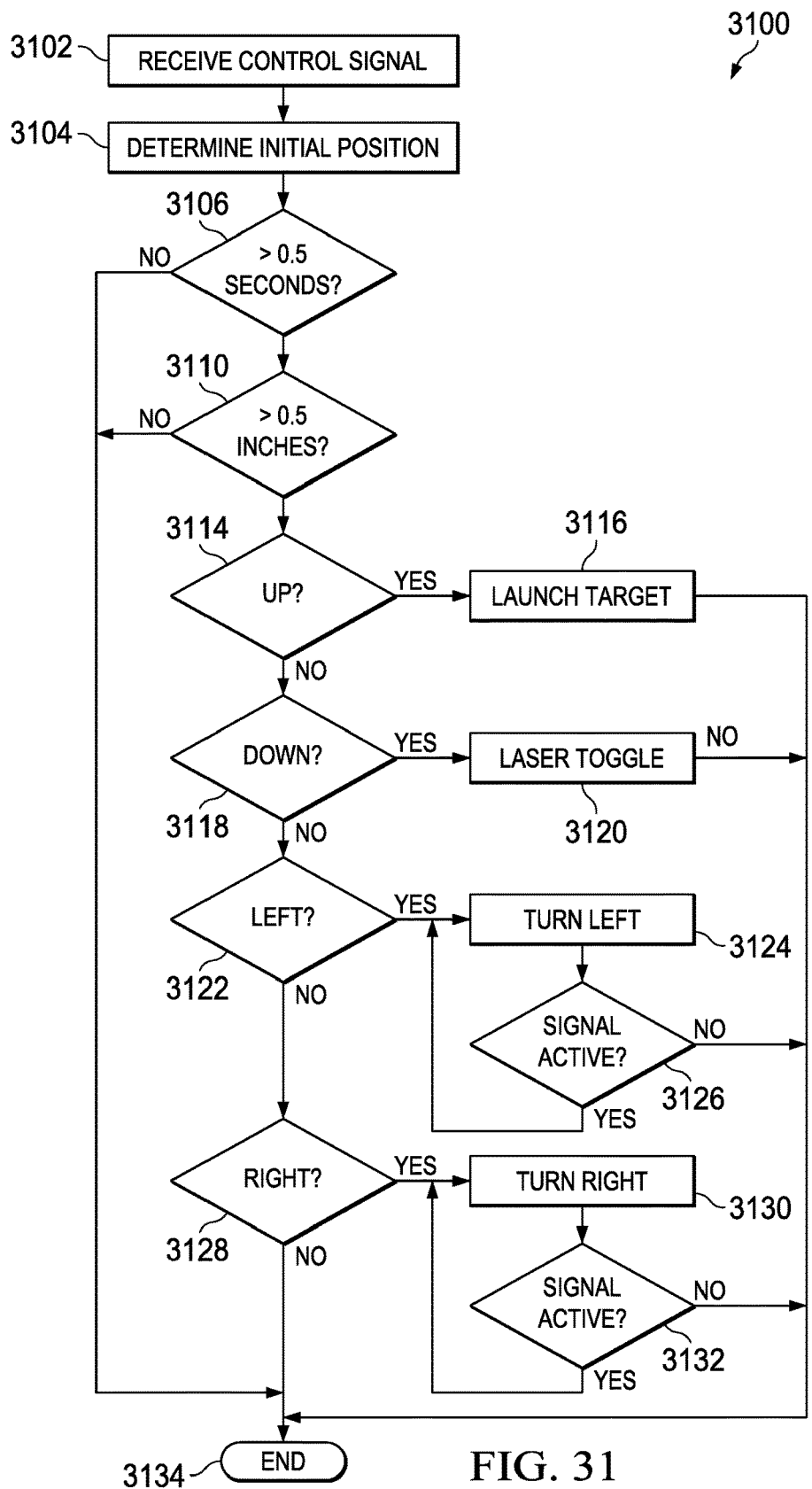
FIG. 31 is a flowchart of a method for processing control signals in a preferred embodiment.

Referring to FIG. 31, computer implemented method 3100 is a further description of step 29107 from FIG. 29C for processing a control signal.

At step 3102, the system receives a control signal from a peripheral attached to the weapon. In a preferred embodiment, the control signal is the press of a sensor thimble connected to a positioning detector.

At step 3104, after receiving the control signal, the method determines the initial position of the weapon. In a preferred embodiment, the system stores the current position (location and orientation) of the weapon with the current time.

At step 3106, it is determined whether or not the control signal has been active for longer than a threshold amount of time. In a preferred embodiment, the threshold amount of time is 0.5 seconds and is referred to as a "long press" or "long touch" of the sensor thimble. The current time is compared to the time stored at step 3104. If the control signal has been active for longer than the threshold amount of time, then the method proceeds to step 3110, otherwise the method proceeds to step 3134, and ends.

At step 3110, it is determined if the weapon has moved a threshold distance. In a preferred embodiment, the current position of the weapon is compared to the initial position stored at step 3104 and a difference is calculated. If the distance is greater than the threshold, then the method proceeds to step 3114. If the difference is not greater than the threshold, then the method proceeds to step 3134, and ends.

At step 3114, it is determined if the movement of the weapon is in the up direction. If so, the method proceeds to step 3116. If not, then the method proceeds to step 3118.

At step 3116, the method triggers the launch of a clay target in the simulation in response to the movement of the weapon by the user. Afterwards, the method for handling control signals ends at step 3134.

At step 3118, the method determines if the movement is in a "downward" direction. If so, then the method proceeds to step 3120. If not, then the method proceeds to step 3122.

At step 3120, the method toggles on or off a "laser" image that emanates from the barrel of the weapon during the simulation, such as one or more of beam images 1906, 1912, 1916, 1920, 1924, 1928, 1932, and 1936 of FIG. 19. After toggling the laser image, the method moves to step 3134, and ends.

At step 3122, if the weapon was moved to the left, then the method proceeds to step 3124. If not, then the method proceeds to step 3128.

At step 3124, the method rotates the point of view of the user within the simulation to the left.

At step 3126, the method then checks to see whether or not the control signal is active. If so, then the method returns to step 3124. If not, then the method moves to step 3134, and ends.

At step 3128, the method determines whether or not the movement of the weapon is to the right. If so, then the method moves to step 3130.

At step 3130, the method turns the point of view of the user to the right. The method then moves to step 3132.

At step 3132, a determination is made as to whether or not the control signal is active. If so, then the method returns to step 3130. If not, then the method moves to step 3134, and ends.

It will be appreciated by those skilled in the art that the described embodiments disclose significantly more than an abstract idea including technical advancements in the field of data processing and a transformation of data which is directly related to real world objects and situations in that the disclosed embodiments enable a computer to operate more efficiently. For example, the disclosed embodiments transform positions, orientations, and movements of a user device and a weapon into a graphical representations of the user and the weapon in a simulation environment.

It will be appreciated by those skilled in the art that modifications can be made to the embodiments disclosed and remain within the inventive concept, such as by omitting various described features, rearranging features, and using features from one embodiment in another embodiment. Therefore, this invention is not limited to the specific embodiments disclosed, but is intended to cover changes within the scope and spirit of the claims.

The invention claimed is:

1. A method for simulation of a launcher, a target, and a weapon, the method comprising the steps of:
    deriving a trajectory of the target from the launcher;
    creating a phantom at a lead distance from the target;
    surrounding the phantom with a hit sphere;
    simulating a launch of the target and the phantom along the trajectory;
    receiving a shot signal from a peripheral associated with the weapon;
    generating a ray in response to the shot signal;
    determining an intersection of the ray and the hit sphere; and,
    determining a hit event based on a shot distribution probability and the intersection.

2. The method of claim 1, further comprising:
    selecting a set of target settings;
    selecting a set of weapon settings;
    selecting a set of ammunition settings; and,
    determining a hit radius based on the target settings, the weapon settings, and the ammunition settings.

3. The method of claim 2, further comprising:
    determining a radius of the hit sphere based on the weapon settings and the ammunition settings.

4. The method of claim 1, further comprising:
    generating an updated position of the target, an updated position of the phantom, and an updated size of the hit sphere based on a time step of the simulation;
    rendering the target based on the updated position of the target; and,
    rendering the phantom based on the updated position of the phantom.

5. The method of claim 4, further comprising:
    determining a current location and a current orientation of the weapon upon receipt of the shot signal.

6. The method of claim 5, wherein the step of generating a ray further comprises:
    generating the ray based on the current location and the correct orientation.

7. The method of claim 1, wherein the step of determining an intersection further comprises:
    determining a point of impact; and,
    displaying a virtual explosion at the point of impact when the target reaches the point of impact.

8. A system that simulates a target shooting scenario, comprising:
    a computer comprising a processor operatively connected to a memory;
    the memory further comprising instructions that when executed by the processor cause the computer to execute the steps of:
    deriving a trajectory of the target from a launcher;
    creating a phantom at a lead distance from the target;
    surrounding the phantom with a hit sphere;
    simulating a launch of the target and the phantom along the trajectory;
    receiving a shot signal from a peripheral associated with a weapon;
    generating a ray in response to the shot signal;
    determining an intersection of the ray and the hit sphere; and,
    determining a hit event based on a shot distribution probability and the intersection.

9. The system of claim 8, wherein the instructions further cause the computer to execute the steps of:
    selecting a set of target settings;
    selecting a set of weapon settings;
    selecting a set of ammunition settings; and,
    determining a hit radius based on the target settings, the weapon settings, and the ammunition settings.

10. A shooting simulator system comprising:
    an electronic cartridge chambered in a weapon;
    an electronic arbor, enabled by the electronic cartridge, fixed in a barrel of the weapon, for generating an enable signal;
    a positioning detector fixed to the weapon;
    a computer system comprising a first processor operatively connected to a first memory;

the first memory further comprising instructions that when executed by the first processor cause the computer system to execute the steps of:
  enabling a shooting simulation upon receipt of the enable signal;
  deriving a trajectory of a target from a launcher;
  creating a phantom at a lead distance from the target;
  surrounding the phantom with a hit sphere;
  simulating a launch of the target and the phantom along the trajectory;
  receiving a shot signal from a peripheral associated with the weapon;
  receiving a set of position data, related to the weapon, from the positioning detector;
  generating a ray in response to the shot signal and the position data;
  determining an intersection of the ray and the hit sphere; and,
  determining a hit event based on a shot distribution probability and the intersection.

11. The system of claim 10 wherein the peripheral further comprises:
  a paddle;
  the paddle held adjacent a trigger guard of the weapon by a mounting enclosure;
  the mounting enclosure fixed to the weapon; and,
  the paddle operatively connected to a switch which generates the shot signal when the paddle is moved.

12. The system of claim 10 wherein the peripheral further comprises:
  a trigger ring;
  the trigger ring further comprising a fixed sensor; and,
  the sensor electrically connected to the electronic arbor, and adapted to generate the shot signal when touched to the weapon.

13. The system of claim 10 wherein the electronic arbor further comprises a second memory operatively connected to a second processor;
  the second memory including instructions that, when executed by the second processor, cause the electronic arbor to execute the steps of:
    receiving a light signal from the electronic cartridge; and,
    transmitting the enable signal to the first processor upon receipt of the light signal.

14. The system of claim 13 wherein the positioning detector transmits the enable signal.

15. The system of claim 13 wherein the electronic arbor transmits the enable signal.

16. The system of claim 13 further comprising:
  a sensor operatively connected to the electronic arbor; and,
  the sensor generating a fourth signal indicative of a requested target launch.

17. The system of claim 16 wherein the sensor includes one of the group of a switch, a pressure sensor and an optical sensor.

18. The system of claim 13 wherein:
  the electronic cartridge further includes an infrared light source providing the light signal;
  the electronic arbor further includes a photodetector, in a path of the light signal, sending a start signal to the second processor upon receipt of the light signal; and,
  the second processor is programmed to send the enable signal upon receipt of the start signal.

19. The system of claim 18 wherein the second processor is programmed to send the enable signal to the positioning detector upon receipt of the start signal.

20. The system of claim 18 wherein the second processor is programmed to send the enable signal to the first processor upon receipt of the start signal.

21. The system of claim 10 wherein the electronic cartridge further comprises a rim section, removably connected to a shell case, and forming a hollow central chamber.

22. The system of claim 21 wherein the electronic cartridge further comprises:
  a third processor operatively connected to a third memory;
  a switch, located in the rim section at the position of a primer;
  the switch operatively connected to the third processor;
  the switch generating a closure signal when impacted by a hammer of the weapon;
  the third memory comprising instructions that cause the third processor to perform the steps of:
    receiving the closure signal; and,
    transmitting the closure signal to the electronic arbor to request a target launch.

23. The system of claim 22 wherein the electronic arbor further comprises:
  an antenna, integrally constructed with the shell case and operatively connected to the processor, for transmitting the closure signal.

24. A shooting simulator system comprising:
  a headset including a camera;
  a sight marker fixed to a weapon;
  a computer system comprising a first processor operatively connected to a first memory;
  the first memory further comprising instructions that when executed by the first processor cause the computer system to execute the steps of:
    deriving a trajectory of a target from a launcher;
    creating a phantom at a lead distance from the target;
    surrounding the phantom with a hit sphere;
    simulating a launch of the target and the phantom along the trajectory;
    receiving a shot signal from a peripheral associated with the weapon;
    generating an image that includes the sight marker with the camera;
    deriving a set of position data from the image based on the sight marker;
    generating a ray in response to the shot signal and the position data;
    determining an intersection of the ray and the hit sphere; and,
    determining a hit event based on a shot distribution probability and the intersection.

25. The system of claim 24 wherein the peripheral further comprises:
  a paddle;
  the paddle held adjacent a trigger guard of the weapon by a mounting enclosure;
  the mounting enclosure fixed to the weapon; and,
  the paddle operatively connected to a switch which generates the shot signal when the paddle is moved.

26. The system of claim 24 further comprising:
  an electronic cartridge chambered in the weapon;
  an electronic arbor, enabled by the electronic cartridge, fixed in a barrel of the weapon, for generating an enable signal;

the first memory further comprising instructions that when executed by the first processor cause the computer system to execute the step of:
  enabling a shooting simulation upon receipt of the enable signal;
wherein the peripheral further comprises:
  a trigger ring;
  the trigger ring further comprising a fixed sensor; and,
  the fixed sensor electrically connected to the electronic arbor, and adapted to generate the shot signal when touched to the weapon.

27. The system of claim 24 further comprising:
an electronic cartridge chambered in the weapon;
an electronic arbor, enabled by the electronic cartridge, fixed in a barrel of the weapon, for generating an enable signal;
the first memory further comprising instructions that when executed by the first processor cause the computer system to execute the step of:
  enabling a shooting simulation upon receipt of the enable signal;
wherein the electronic arbor further comprises a second memory operatively connected to a second processor;
the second memory including instructions that, when executed by the second processor, cause the electronic arbor to execute the steps of:
  receiving a light signal from the electronic cartridge; and,
  transmitting the enable signal to the first processor upon receipt of the light signal.

28. The system of claim 27 wherein the electronic arbor transmits the enable signal.

29. The system of claim 27 further comprising:
a sensor operatively connected to the electronic arbor; and,
the sensor generating a fourth signal indicative of a requested target launch.

30. The system of claim 29 wherein the sensor includes one of the group of a switch, a pressure sensor and an optical sensor.

31. The system of claim 27 wherein:
the electronic cartridge further includes an infrared light source providing the light signal;
the electronic arbor further includes a photodetector, in a path of the light signal, sending a start signal to the second processor upon receipt of the light signal; and,
the second processor is programmed to send the enable signal upon receipt of the start signal.

32. The system of claim 31 wherein the second processor is programmed to send the enable signal to the first processor upon receipt of the start signal.

33. The system of claim 24 further comprising:
an electronic cartridge chambered in the weapon;
an electronic arbor, enabled by the electronic cartridge, fixed in a barrel of the weapon, for generating an enable signal; and,
the first memory further comprising instructions that when executed by the first processor cause the computer system to execute the step of:
  enabling a shooting simulation upon receipt of the enable signal.

34. The system of claim 33 wherein the electronic cartridge further comprises:
a third processor operatively connected to a third memory;
a switch, located at a position of a primer;
the switch operatively connected to a third processor;
the switch generating a closure signal when impacted by a hammer of the weapon;
the third memory comprising instructions that cause the third processor to perform the steps of:
  receiving the closure signal; and,
  transmitting the closure signal to the electronic arbor to request a target launch.

* * * * *